United States Patent
He et al.

(10) Patent No.: US 12,448,658 B2
(45) Date of Patent: Oct. 21, 2025

(54) PRIMER AND PROBE SETS FOR PATHOGEN DETECTION OF INFECTION IN TRANSPLANT PATIENT, KIT AND USE THEREOF

(71) Applicant: Institute of Blood Transfusion, Chinese Academy of Medical Sciences, Chengdu (CN)

(72) Inventors: Miao He, Chengdu (CN); Shan Liang, Chengdu (CN)

(73) Assignee: Institute of Blood Transfusion, Chinese Academy of Medical Sciences, Chengdu (CN)

( * ) Notice: Subject to any disclaimer, the term of this patent is extended or adjusted under 35 U.S.C. 154(b) by 695 days.

(21) Appl. No.: 17/812,496

(22) Filed: Jul. 14, 2022

(65) Prior Publication Data

US 2023/0071792 A1    Mar. 9, 2023

(30) Foreign Application Priority Data

Jul. 14, 2021  (CN) .......................... 202110794646.1

(51) Int. Cl.
| | | |
|---|---|---|
| C12Q 1/68 | (2018.01) | |
| C12Q 1/689 | (2018.01) | |
| C12Q 1/6895 | (2018.01) | |
| C12Q 1/70 | (2006.01) | |
| C12Q 1/6818 | (2018.01) | |
| C12Q 1/6851 | (2018.01) | |

(52) U.S. Cl.
CPC .............. *C12Q 1/701* (2013.01); *C12Q 1/689* (2013.01); *C12Q 1/6895* (2013.01); *C12Q 1/705* (2013.01); *C12Q 1/6818* (2013.01); *C12Q 1/6851* (2013.01); *C12Q 2600/16* (2013.01)

(58) Field of Classification Search
None
See application file for complete search history.

(56) References Cited

U.S. PATENT DOCUMENTS

2009/0305229 A1* 12/2009 McBride ................ C12Q 1/701
 435/5
2017/0204452 A1* 7/2017 Mergemeier ........... C12Q 1/689

* cited by examiner

*Primary Examiner* — Juliet C Switzer
(74) *Attorney, Agent, or Firm* — Element IP, PLC

(57) ABSTRACT

The present disclosure relates to primer and probe sets for pathogen detection of infection in a transplant patient, a kit and use thereof, and belongs to the technical field of molecular biology detection. There are 23 primer and probe sets that can be used to jointly detect 23 kinds of pathogens with a high infection rate and a high lethality rate after transplantation, including an adenovirus type B; and two ends of a corresponding sequence of each probe have correspondingly a fluorophore and a quencher group, respectively. The present disclosure further provides a real-time fluorescence quantitative PCR kit for pathogen detection of infection in a transplant patient, including the primer and probe sets, a pathogen plasmid standard, a fluorescence quantitative PCR reaction solution, and sterile deionized water, which can simultaneously detect 23 pathogens infected by the transplant patient.

8 Claims, 47 Drawing Sheets

Specification includes a Sequence Listing.

PRIMER AND PROBE SETS FOR PATHOGEN DETECTION OF INFECTION IN TRANSPLANT PATIENT, KIT AND USE THEREOF

CROSS REFERENCE TO RELATED APPLICATION

This patent application claims the benefit and priority of Chinese Patent Application No. 202110794646.1, filed on Jul. 14, 2021, the disclosure of which is incorporated by reference herein in its entirety as part of the present application.

INCORPORATION BY REFERENCE STATEMENT

This patent application includes an XML sequence listing whose file name is 81054587-sequence-listing-3Oct2022. This XML sequence listing was created on Oct. 3, 2022, and is 105,865 bytes in size. This XML sequence listing is incorporated by reference into the present patent application.

TECHNICAL FIELD

The present disclosure relates to a primer and probe set for pathogen detection, in particular to primer and probe sets for pathogen detection of infection in a transplant patient, a kit and use thereof, and belongs to the technical field of molecular biology detection.

BACKGROUND ART

Transplantation has been widely used in clinic to treat many malignant tumors. However, with the widespread use of transplantation, immunosuppressive agents reduce a risk of immune rejection in transplant recipients, and suppress an immune level of the recipients, thereby increasing a risk of infection by pathogens in the recipients.

Post-transplant infectious complications become increasingly prominent today, and are the most common and important cause of incidence and mortality after solid organ transplantation (SOT) and hematopoietic stem cell transplantation (HSCT). In the solid transplant population, fungal infections are associated with major complications, with a candidemia-related approximate mortality rate as high as 37%. A retrospective analysis of 250 patients with infection after orthotopic liver transplantation has found that an infection rate is 65.2% and a mortality rate is 13.5%; after the HSCT, a main site of infection is the lungs, with an infection rate of as high as 40% to 60%. Moreover, it has been reported in the literatures that infection is a cause of death after allogeneic hematopoietic stem cell transplantation (HCT) in 20% of patients.

Post-transplant infection is mainly caused by three aspects: underlying disease factors, immunosuppressive state after HSCT, and graft-versus-host diseases (GVHDs); the most common infections clinically are cytomegalovirus (CMV) and bacterial infections. Controlling the occurrence of infection after HSCT and SOT from the source is of great significance to improve a success rate of transplantation and reduce a mortality rate of diseases such as hematological diseases, solid tumors, and autoimmune diseases. Therefore, it is crucial to develop a rapid and accurate detection method that can reduce the mortality rate after transplantation. However, many detection methods have limitations when a transplant recipient develops postoperative pathogen infections.

Currently, commonly-used pathogen detection methods include:

I, a culture method has a golden standard, high specificity, and simple method; however, the method has a long culture cycle, is time-consuming and labor-intensive, and is difficult to culture some pathogens;

II, a SYBR Green I method has a high sensitivity, but is prone to primer dimers and non-specific amplification, resulting in a high false positive rate and low specificity;

III, a droplet digital PCR method has a high sensitivity and specificity, but is high-cost;

IV, a next-generation sequencing method has a high sensitivity and specificity, but has a complicated operation and high cost; and V, a Taqman real-time fluorescence quantitative PCR method overcomes the defects of high false positive rate and low specificity of the SYBR Green I method, which is more suitable for the combined detection of pathogens, that is, to detect multiple pathogens at one time.

The paper "Application Research on Detection of Pathogenic Microorganisms After Organ Transplantation Based on Next-Generation Sequencing Technology Platform, Xiaochen Wang, 2020" disclosed use of multiplex PCR in detecting clinical pathogenic microorganisms, and detection of pathogens after organ transplantation by next-generation sequencing technology.

In patent "CN101351559, Multiple Quantitative Detection of Pathogens", multiple pathogens are detected simultaneously by a multiplex PCR method, but there are still the following technical problems:

1) in theory, multiple primer pairs can be added to a reaction system to detect multiple pathogens simultaneously; however, the method is very limited in practical situations, and generally 5 to 6 pathogens can be detected simultaneously;

2) the method has an extremely high requirement for primer design; since there are multiple pairs of primers in the same reaction system, it is necessary to ensure that primer dimers are not form between the primers, or non-specific amplification is not caused; and 3) the reaction system is difficult to be optimized. Since there are multiple pairs of primers in a multiplex PCR reaction system, and amplified template fragments have different lengths, each pair of primers have also different amplification efficiency and amplification speed. The multiplex PCR reaction always follows a principle of preferential amplification of smaller fragments, and optimal PCR conditions required by each pair of primers are also different (when designing multiple pairs of primers for multiplex PCR amplification, PCR amplification conditions for each primer should be as consistent as possible). Therefore, when exploring multiplex PCR amplification conditions (especially the annealing temperature and time), factors conducive to the amplification of larger fragments are selected to the greatest extent.

SUMMARY

To overcome the deficiencies of the prior art, the present disclosure provides primer and probe sets for pathogen detection of infection in a transplant patient, a kit and use thereof. In the present disclosure, combined detection is conducted on pathogens with a high infection rate and a high lethality rate after transplantation (specifically including the following 23 pathogens: an adenovirus type B, an adenovirus type C, a varicella-zoster virus (VZV), an Epstein-Barr (EB) virus, a human herpes simplex virus, a cytomegalovirus (CMV), a human herpes virus type 6, *Staphylococcus aureus, Streptococcus pneumoniae, Staphylococcus epidermidis, Pseudomonas aeruginosa, Acinetobacter baumannii, Escherichia coli*, a *Mycobacterium tuberculosis* complex, *Enterococcus faecalis, Enterococcus faecium, Clostridium difficile, Stenotrophomonas maltophilia, Haemophilus influenzae, Klebsiella pneumoniae, Cryptococcus neoformans, Candida albicans*, and *Aspergillus fumigatus*). The designed primers for PCR amplification have desirable sensitivity and repeatability and a low limit of detection, can comprehensively detect postoperative infection in the transplant patient, and has important clinical reference significance for reducing a mortality rate of the transplant patient.

To achieve the above objective, the present disclosure provides the following technical solutions.

The present disclosure provides primer and probe sets for pathogen detection of infection in a transplant patient, including the following 23 primer and probe sets:

a 1st primer and probe set for detecting an adenovirus type B, where sequences of an upstream primer, a downstream primer, and a probe are as follows:
the upstream primer: 5'-TCAGGGATAACTTTGTAGG-3' (SEQ ID NO: 1),
the downstream primer: 5'-GACAGTTCAGTAT-TTCTGTC-3' (SEQ ID NO: 2), and
the probe: 5'-TCAACCACTGCATTCAGTTGTGATG-3' (SEQ ID NO: 3), with a reporter group of carboxyfluorescein (FAM™, 3',6'-dihydroxy-3-oxospiro[2-benzofuran-1,9'-xanthene]-5-carboxylic acid) at a 5'-end and a quencher group of Black Hole Quencher™-1 (BHQ™-1, 4-[[4-[2-[2-methoxy-5-methyl-4-[2-(4-methyl-2-nitrophenyl)diazenyl]phenyl]diazenyl]phenyl]methylamino]-3-Carboxylic acid) at a 3'-end;

a 2nd primer and probe set for detecting an adenovirus type C, where sequences of an upstream primer, a downstream primer, and a probe are as follows:
the upstream primer: 5'-CAGTGGTCTTACATGCAC-3' (SEQ ID NO: 4),
the downstream primer: 5'-TGGGGTTTCTAAACTTGTTA-3' (SEQ ID NO: 5), and
the probe: 5'-ACGCCTCGGAGTACCTGAGC-3' (SEQ ID NO: 6), with a reporter group of FAM™ at a 5'-end and a quencher group of BHQ™-1 at a 3'-end;

a 3rd primer and probe set for detecting a VZV, where sequences of an upstream primer, a downstream primer, and a probe are as follows:
the upstream primer: 5'-GGTGTCTCCCTAATCTTG-3' (SEQ ID NO: 7), the downstream primer: 5'-CTCTCTTTCTGTGTGTCC-3' (SEQ ID NO: 8), and
the probe: 5'-AGGCTTCTGCTCTCGACTGG-3' (SEQ ID NO: 9), with a reporter group of FAM™ at a 5'-end and a quencher group of BHQ™-1 at a 3'-end;

a 4th primer and probe set for detecting an EB virus, where sequences of an upstream primer, a downstream primer, and a probe are as follows:
the upstream primer: 5'-CTCCCTTTACAACCTCAG-3' (SEQ ID NO: 10), the downstream primer: 5'-GACGACTCAATGGTGTAA-3' (SEQ ID NO: 11), and
the probe: 5'-CCTTGCTGTTCCACAATGTCGT-3' (SEQ ID NO: 12), with a reporter group of FAM™ at a 5'-end and a quencher group of BHQ™-1 at a 3'-end;

a 5th primer and probe set for detecting a human herpes simplex virus type 1, where sequences of an upstream primer, a downstream primer, and a probe are as follows:
the upstream primer: 5'-GGATGGCGAACATCTTAA-3' (SEQ ID NO: 13),
the downstream primer: 5'-GTTGGGTTTGTCCTTCTC-3' (SEQ ID NO: 14), and
the probe: 5'-ATGGGACCCGTGACACCCTA-3' (SEQ ID NO: 15), with a reporter group of FAM™ at a 5'-end and a quencher group of BHQ™-1 at a 3'-end;

a 6th primer and probe set for detecting a CMV, where sequences of an upstream primer, a downstream primer, and a probe are as follows:
the upstream primer: 5'-CGTGACGTGCATAAAGAG-3' (SEQ ID NO: 16),
the downstream primer: 5'-GGTGA-TAGGTGACCAGTA-3' (SEQ ID NO: 17), and
the probe: 5'-CTCGCAGAAGGACTCCAGGT-3' (SEQ ID NO: 18), with a reporter group of FAM™ at a 5'-end and a quencher group of BHQ™-1 at a 3'-end;

a 7th primer and probe set for detecting a human herpes virus type 6, where sequences of an upstream primer, a downstream primer, and a probe are as follows:
the upstream primer: 5'-GTGTGGTAATGGACTAAG-3' (SEQ ID NO: 19),
the downstream primer: 5'-CGACCAT-CAAAATATAAAGAG-3' (SEQ ID NO: 20), and
the probe: 5'-AGCTGCTACAATACACACGTAAGTAC-3' (SEQ ID NO: 21), with a reporter group of FAM™ at a 5'-end and a quencher group of BHQ™-1 at a 3'-end;

an 8th primer and probe set for detecting *Staphylococcus aureus*, where sequences of an upstream primer, a downstream primer, and a probe are as follows:
the upstream primer: 5'-GCGAATGAGCGTTTATTTAG-3' (SEQ ID NO: 22),
the downstream primer: 5'-GACCTTTAGA-TAAAGCTGTAATG-3' (SEQ ID NO: 23), and
the probe: 5'-CGCCATAACTCATACCAGAT-TGTCCTA-3' (SEQ ID NO: 24), with a reporter group of FAM™ at a 5'-end and a quencher group of BHQ™-1 at a 3'-end;

a 9th primer and probe set for detecting *Streptococcus pneumoniae*, where sequences of an upstream primer, a downstream primer, and a probe are as follows:
the upstream primer: 5'-CAGCTACCAACGACAGTC-3' (SEQ ID NO: 25),
the downstream primer: 5'-CGCAAGAAGAGTGG-GATTA-3' (SEQ ID NO: 26), and
the probe: 5'-TCTCTAACAAGGTCTCATCCAC-TACGA-3' (SEQ ID NO: 27), with a reporter group of FAM™ at a 5'-end and a quencher group of BHQ™-1 at a 3'-end;

a 10th primer and probe set for detecting *Staphylococcus epidermidis*, where sequences of an upstream primer, a downstream primer, and a probe are as follows:
the upstream primer: 5'-CGGTGCTTATACTGGAGA-3' (SEQ ID NO: 28),
the downstream primer: 5'-TCGTCAGTTTCGTG-GAAA-3' (SEQ ID NO: 29), and
the probe: 5'-ACGACGCTCTGAGTGACCAAT-3' (SEQ ID NO: 30), with a reporter group of FAM™ at a 5'-end and a quencher group of BHQ™-1 at a 3'-end;

an 11th primer and probe set for detecting *Pseudomonas aeruginosa*, where sequences of an upstream primer, a downstream primer, and a probe are as follows:
the upstream primer: 5'-TCACCACCTTCTACTTCG-3' (SEQ ID NO: 31),
the downstream primer: 5'-CAGAGCCATGTTGTACTC-3' (SEQ ID NO: 32), and
the probe: 5'-ACGACAGCTCCGACCTGAAG-3' (SEQ ID NO: 33), with a reporter group of FAM™ at a 5'-end and a quencher group of BHQ™-1 at a 3'-end;
a 12th primer and probe set for detecting *Acinetobacter baumannii*, where sequences of an upstream primer, a downstream primer, and a probe are as follows:
the upstream primer: 5'-TCCAGTTTATCAAGATT-TAGC-3' (SEQ ID NO: 34),
the downstream primer: 5'-CTTGGGTACCGATATCTG-3' (SEQ ID NO: 35), and
the probe: 5'-CATAACCAACACGCTTCACTTCCT-TAG-3' (SEQ ID NO: 36), with a reporter group of FAM™ at a 5'-end and a quencher group of BHQ™-1 at a 3'-end;
a 13th primer and probe set for detecting *Escherichia coli*, where sequences of an upstream primer, a downstream primer, and a probe are as follows:
the upstream primer: 5'-CCGCAAGAAAACTATCCC-3' (SEQ ID NO: 37),
the downstream primer: 5'-TAGCGACTGATATT-GAACTG-3' (SEQ ID NO: 38), and
the probe: 5'-CCGCCTTACTGCCGCCTGTT-3' (SEQ ID NO: 39), with a reporter group of FAM™ at a 5'-end and a quencher group of BHQ™-1 at a 3'-end;
a 14th primer and probe set for detecting *Enterococcus faecalis*, where sequences of an upstream primer, a downstream primer, and a probe are as follows:
the upstream primer: 5'-TGCCATCATTTAGTTGGG-3' (SEQ ID NO: 40),
the downstream primer: 5'-GAAGCTTTTAAGAGAT-TTGCATG-3' (SEQ ID NO: 41), and
the probe: 5'-CGGTCTAGCGACTCGTTGTACTTC-3' (SEQ ID NO: 42), with a reporter group of FAM™ at a 5'-end and a quencher group of BHQ™-1 at a 3'-end;
a 15th primer and probe set for detecting a *Mycobacterium tuberculosis* complex, where sequences of an upstream primer, a downstream primer, and a probe are as follows:
the upstream primer: 5'-GTCGAGTACGCCTTCTTG-3' (SEQ ID NO: 43),
the downstream primer: 5'-CACCTATGTGTCGACCTG-3' (SEQ ID NO: 44), and
the probe: 5'-CCTTTGTCACCGACGCCTACG-3' (SEQ ID NO: 45), with a reporter group of FAM™ at a 5'-end and a quencher group of BHQ™-1 at a 3'-end;
a 16th primer and probe set for detecting *Enterococcus faecium*, where sequences of an upstream primer, a downstream primer, and a probe are as follows:
the upstream primer: 5'-CATCCAAGATATTCTGCC-3' (SEQ ID NO: 46),
the downstream primer: 5'-CGGATTTTGTTCAATA-CAAG-3' (SEQ ID NO: 47), and
the probe: 5'-CACCATCTA-CATCGTCAGCAATAATCA-3' (SEQ ID NO: 48), with a reporter group of FAM™ at a 5'-end and a quencher group of BHQ™-1 at a 3'-end;
a 17th primer and probe set for detecting *Clostridium difficile*, where sequences of an upstream primer, a downstream primer, and a probe are as follows:
the upstream primer: 5'-GCGTAGATATTAGGAGGAA-3' (SEQ ID NO: 49),
the downstream primer: 5'-GGAGTACTTAATGCGT-TAG-3' (SEQ ID NO: 50), and
the probe: 5'-TCTCTGGACTGTAACTGACGCTG-3' (SEQ ID NO: 51), with a reporter group of FAM™ at a 5'-end and a quencher group of BHQ™-1 at a 3'-end;
an 18th primer and probe set for detecting *Stenotrophomonas maltophilia*, where sequences of an upstream primer, a downstream primer, and a probe are as follows:
the upstream primer: 5'-TCCTCCAAGGCTAAATAC-3' (SEQ ID NO: 52), the downstream primer: 5'-CGGTTTCAGGTTCTATTTC-3' (SEQ ID NO: 53), and
the probe: 5'-TGACCGACCGATAGTGAACCAG-3' (SEQ ID NO: 54), with a reporter group of FAM™ at a 5'-end and a quencher group of BHQ™-1 at a 3'-end;
a 19th primer and probe set for detecting *Haemophilus influenzae*, where sequences of an upstream primer, a downstream primer, and a probe are as follows:
the upstream primer: 5'-CGTTCAAATCTTAGACGC-3' (SEQ ID NO: 55),
the downstream primer: 5'-CGATGTTGTATTCTGGTG-3' (SEQ ID NO: 56), and
the probe: 5'-CGTTCATCAGTGTTACCTTCTACTAAT-3' (SEQ ID NO: 57), with a reporter group of FAM™ at a 5'-end and a quencher group of BHQ™-1 at a 3'-end;
a 20th primer and probe set for detecting *Klebsiella pneumoniae*, where sequences of an upstream primer, a downstream primer, and a probe are as follows:
the upstream primer: 5'-CCCGTGAACCTTTACTATA-3' (SEQ ID NO: 58),
the downstream primer: 5'-AAGGTGGTATTTCAAGG-3' (SEQ ID NO: 59), and
the probe: 5'-TGACACTGAACATTGAGCCTTGAT-3' (SEQ ID NO: 60), with a reporter group of FAM™ at a 5'-end and a quencher group of BHQ™-1 at a 3'-end;
a 21st primer and probe set for detecting *Cryptococcus neoformans*, where sequences of an upstream primer, a downstream primer, and a probe are as follows:
the upstream primer: 5'-CTGGAAGCTCATTTACCTA-3' (SEQ ID NO: 61),
the downstream primer: 5'-GGCCATGGAATTG-GAATA-3' (SEQ ID NO: 62), and
the probe: 5'-ATTCACCGTAAGCCATCAATCAGG-3' (SEQ ID NO: 63), with a reporter group of FAM™ at a 5'-end and a quencher group of BHQ™-1 at a 3'-end;
a 22nd primer and probe set for detecting *Candida albicans*, where sequences of an upstream primer, a downstream primer, and a probe are as follows:
the upstream primer: 5'-GAGGTCTAAACTTACAACC-3' (SEQ ID NO: 64),
the downstream primer: 5'-CGTTGTT-GAAAGTTTTGAC-3' (SEQ ID NO: 65), and
the probe: 5'-TCAACTTGTCACACCAGATTAT-TACTT-3' (SEQ ID NO: 66), with a reporter group of FAM™ at a 5'-end and a quencher group of BHQ™-1 at a 3'-end; and
a 23rd primer and probe set for detecting *Aspergillus fumigatus*, where sequences of an upstream primer, a downstream primer, and a probe are as follows:
the upstream primer: 5'-TCCCTCTTATCCATTTTCC-3' (SEQ ID NO: 67),
the downstream primer: 5'-GTTC-CAAAGCCGAAAGAATA-3' (SEQ ID NO: 68), and the probe: 5'-CCTCATCACTGCAACTCTAATCCTCG-3' (SEQ ID NO: 69), with a reporter group of FAM™ at a 5'-end and a quencher group of BHQ™-1 at a 3'-end.

The present disclosure further provides a real-time fluorescence quantitative PCR kit for pathogen detection of infection in a transplant patient, including the primer and probe sets, a pathogen plasmid standard, a fluorescence quantitative PCR reaction solution, and sterile deionized water.

Preferably, in a PCR amplification system, the primers and the probes for detecting the adenovirus type B, the VZV, the EB virus, the human herpes simplex virus type 1, the CMV, the human herpes virus type 6, the *Streptococcus pneumoniae*, the *Pseudomonas aeruginosa*, the *Escherichia coli*, the *Enterococcus faecalis*, and the *Klebsiella pneumoniae* may have final concentrations of 0.9 μm and 0.25 μm, respectively.

Preferably, in the PCR amplification system, the primers and the probes for detecting the adenovirus type C, the *Enterococcus faecium*, the *Staphylococcus aureus*, the *Staphylococcus epidermidis, Acinetobacter baumannii*, the *Mycobacterium tuberculosis* complex, the *Stenotrophomonas maltophilia*, the *Haemophilus influenzae*, the *Clostridium difficile*, the *Cryptococcus neoformans*, the *Candida albicans*, and the *Aspergillus fumigatus* may have final concentrations of 3.6 μm and 0.25 μm, respectively.

Preferably, the kit may have a detection sample of blood.

Preferably, target genes in the pathogen plasmid standard may include an adenovirus type B Hexon target gene, an adenovirus type C Hexon target gene, a VZV ORF62 target gene, an EB virus EBNA-1 target gene, a human herpes simplex virus type 1 US4 target gene, a CMV UL83 target gene, a human herpes virus type 6 hypothetical protein target gene, a *Staphylococcus aureus* target gene, a *Streptococcus pneumoniae* Ply target gene, a *Staphylococcus epidermidis* target gene, a *Pseudomonas aeruginosa* pal target gene, an *Acinetobacter baumannii* target gene, an *Escherichia coli* β-D-galactosidase target gene, an *Enterococcus faecalis* 16SrRNA target gene, a *Mycobacterium tuberculosis* complex target gene, an *Enterococcus faecium* GroL target gene, a *Clostridium difficile* 16SRNA target gene, a *Stenotrophomonas maltophilia* 23SrRNA target gene, a *Haemophilus influenzae* 23SrRNA target gene, a *Klebsiella pneumoniae* 23SrRNA target gene, a *Cryptococcus neoformans* LACI target gene, a *Candida albicans* 18SrRNA target gene, and an *Aspergillus fumigatus* Cyp51a target gene.

Preferably, the kit may adopt a 96-well plate or a TAC microfluidic chip when conducting PCR.

The present disclosure further provides use of the primer and probe sets in preparation of a kit for pathogen detection of infection in a transplant patient.

The present disclosure has the following beneficial technical effects:

1) In the present disclosure, primers and probes are individually designed for each pathogen with high infection rate and high lethality rate after transplantation (23 pathogens such as the adenovirus type B), and each pathogen is detected in a separate well. That is, the multiple pathogens can be detected simultaneously (for example: a total nucleic acid sample is extracted from the blood of a transplant patient, and the corresponding primers and probe and a same nucleic acid sample (2 μL to 5 μL) are added to each well of a 96-well plate. After fluorescence quantitative PCR, a well with a CT value is determined to be positive, indicating that the transplant patient is infected with a corresponding pathogen; otherwise, it is determined to be negative);
2) in the present disclosure, the primers and probe are designed for a single pathogen, with a high specificity, effectively avoiding primer dimers and non-specific amplification;
3) in the present disclosure, the PCR amplification can be realized on a 96-well plate or a TAC microfluidic chip, which has simple operations and effective prevention of pollution, and can avoid the influence caused by manual operations;
4) in the present disclosure, each probe is labeled with fluorescence, and a certain pathogen can be quantified by generating a fluorescence signal by QPCR with a simpler operation, which does not require quantification of capillary separation after the multiplex PCR amplification (for example: patent CN101351559).

DETAILED DESCRIPTION OF THE EMBODIMENTS

Figure 1:
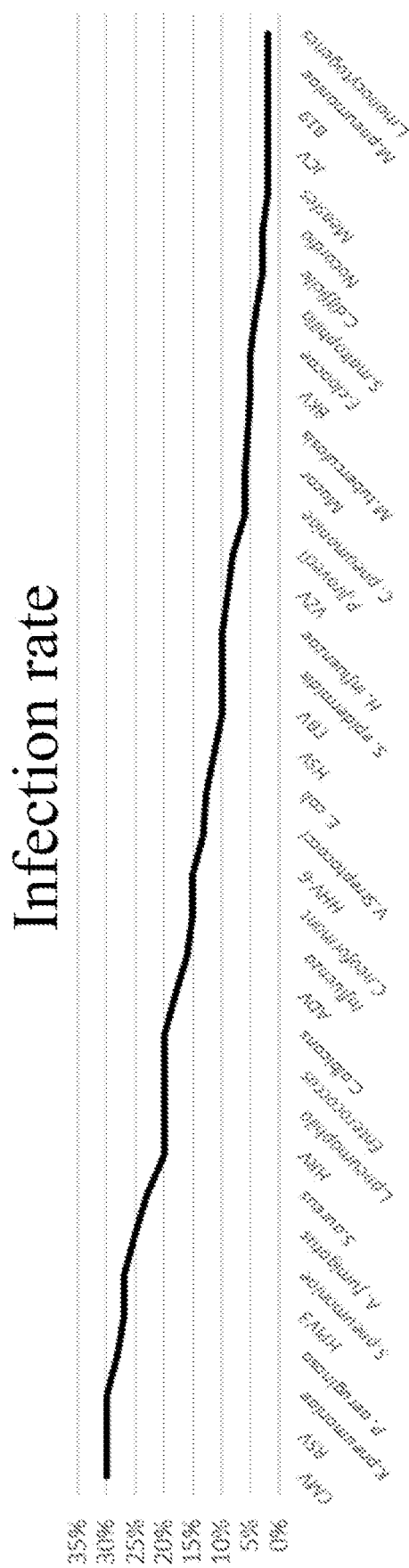
FIG. 1 shows a statistical chart of pathogens with a higher infection rate in Example 1 of the present disclosure.
Figure 2:
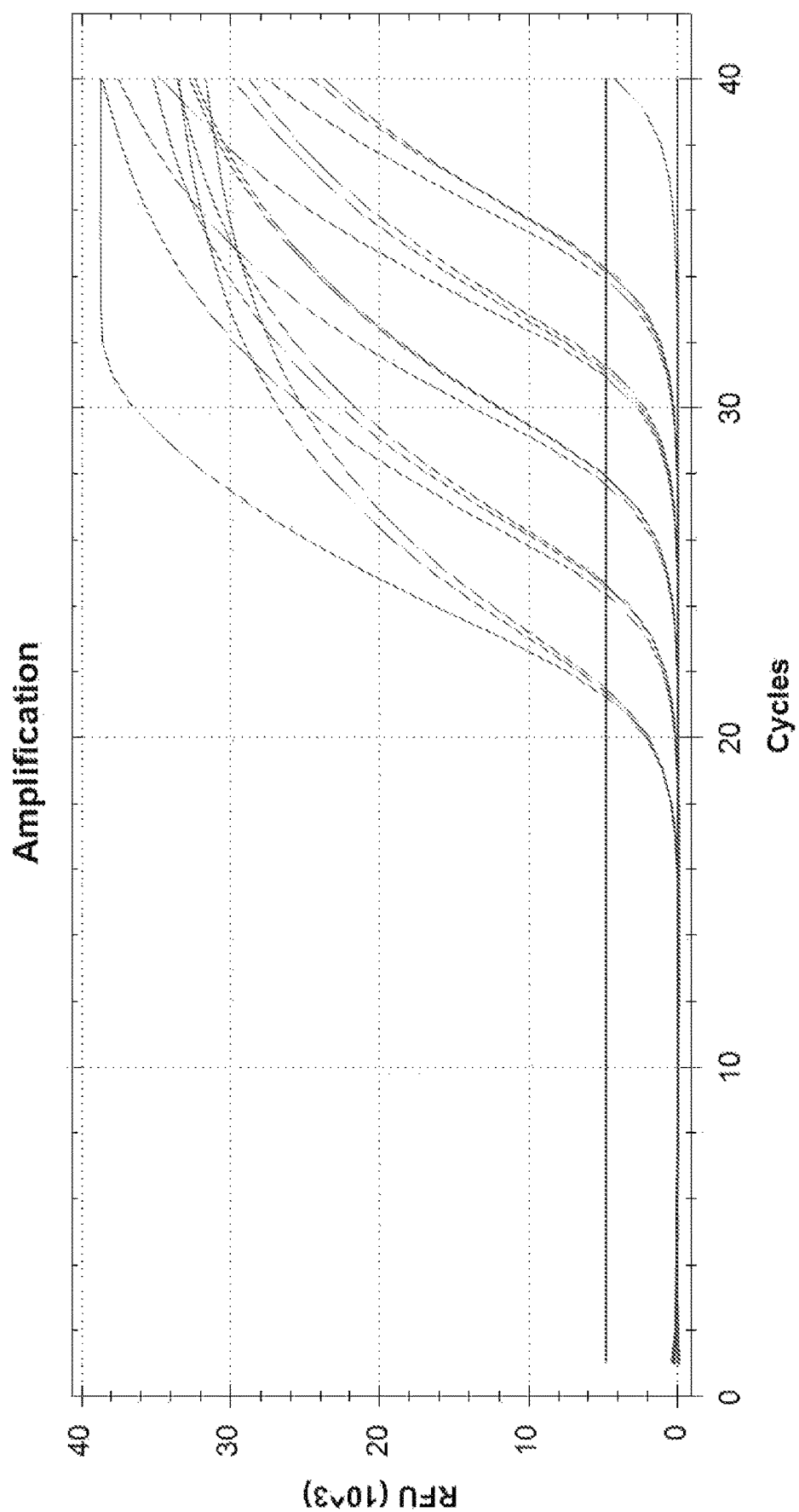
FIG. 2 shows an amplification curve of real-time fluorescence quantitative PCR on an adenovirus type B in Example 5 of the present disclosure.
Figure 3:
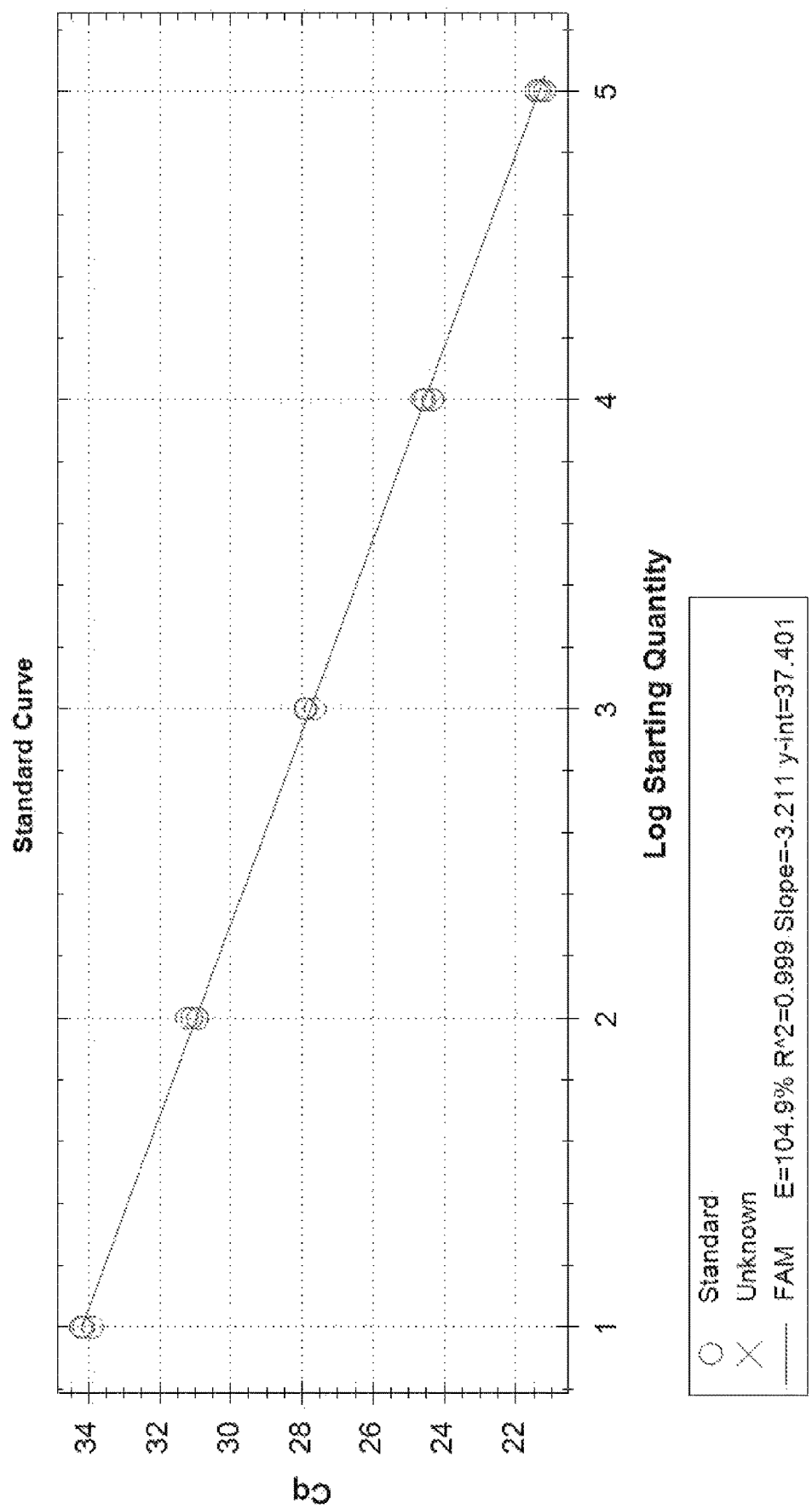
FIG. 3 shows a standard curve of real-time fluorescence quantitative PCR on the adenovirus type B in Example 5 of the present disclosure.
Figure 4:
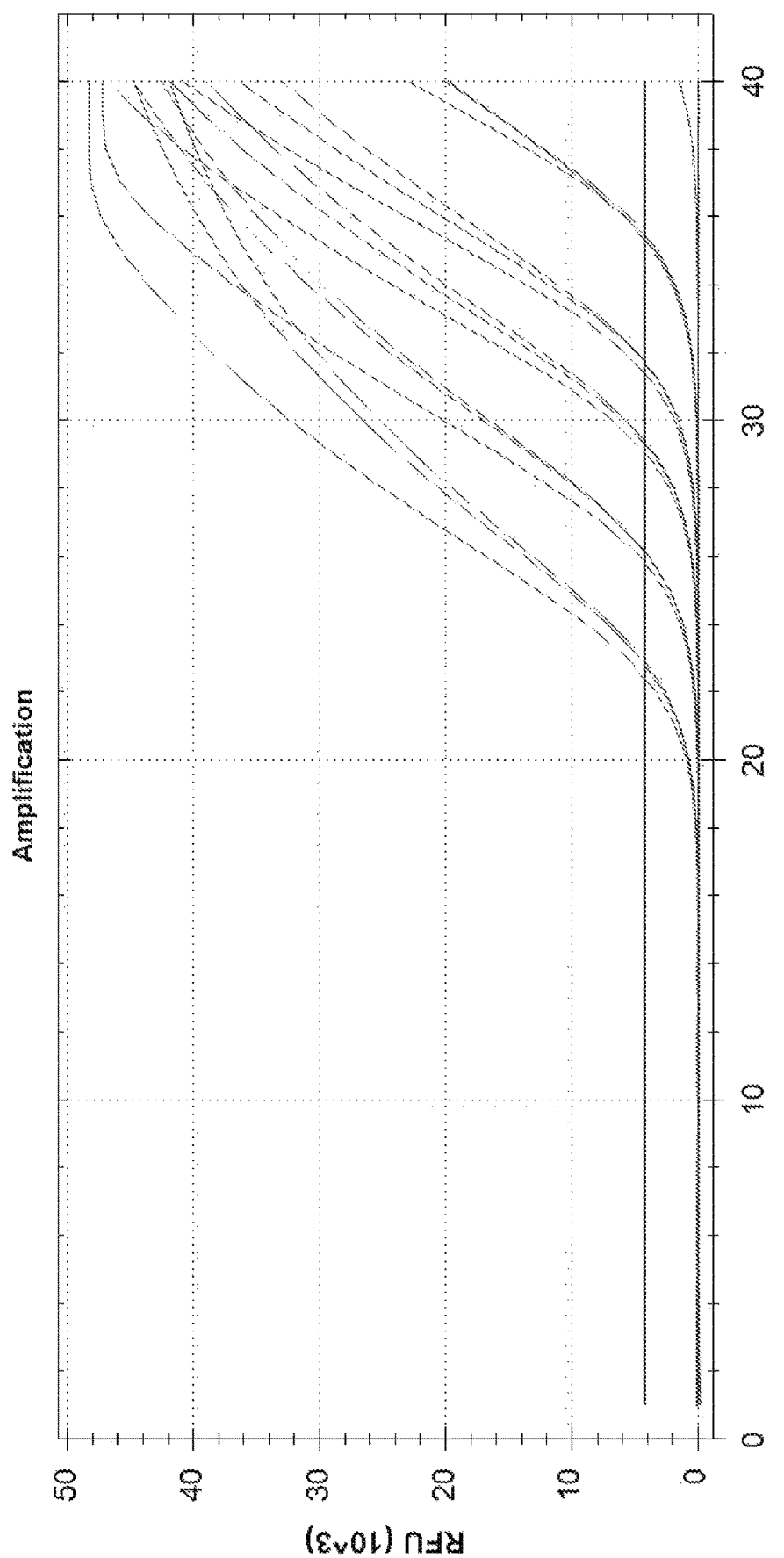
FIG. 4 shows an amplification curve of real-time fluorescence quantitative PCR on an adenovirus type C in Example 5 of the present disclosure.
Figure 5:
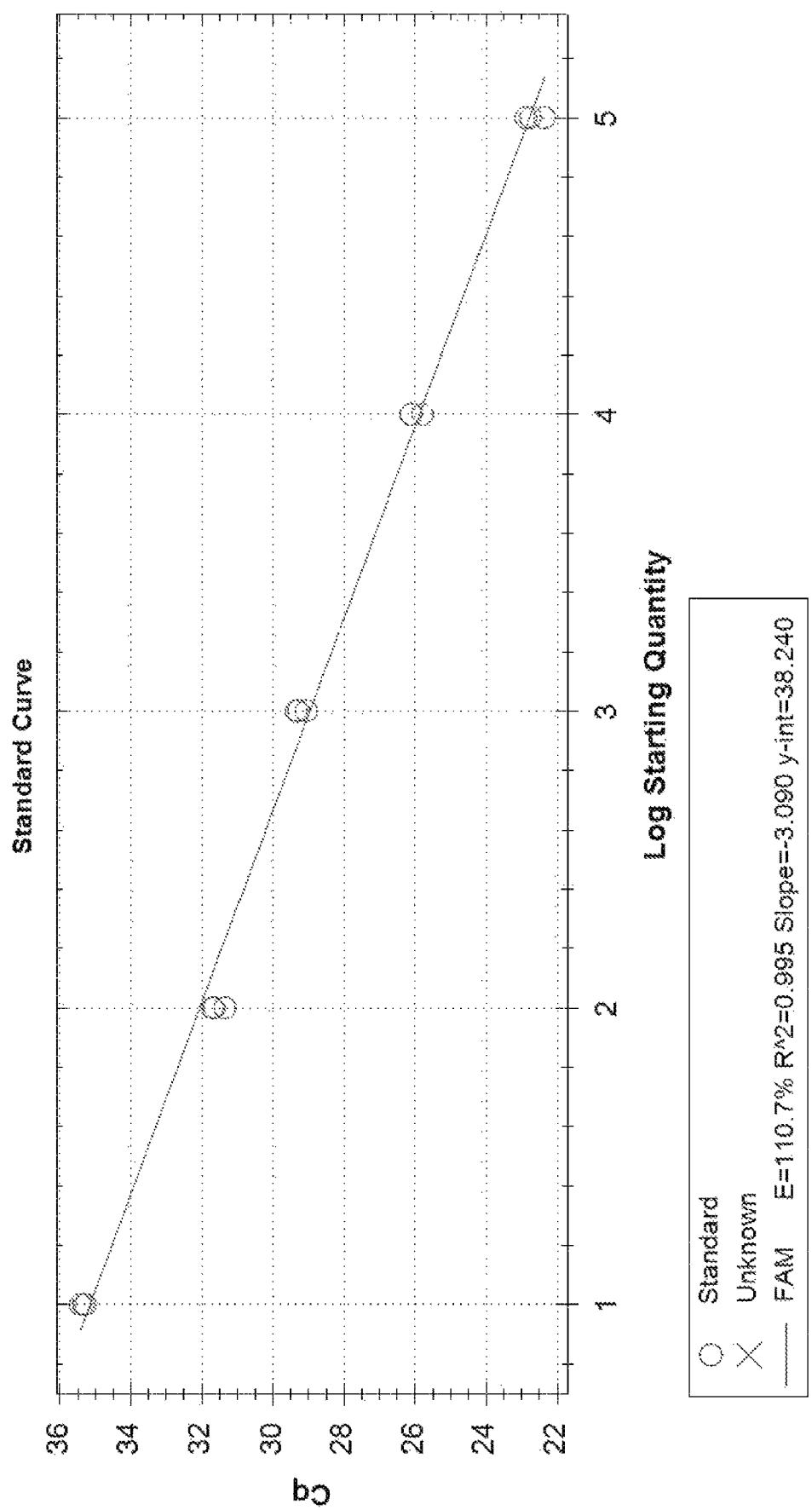
FIG. 5 shows a standard curve of real-time fluorescence quantitative PCR on the adenovirus type C in Example 5 of the present disclosure.
Figure 6:
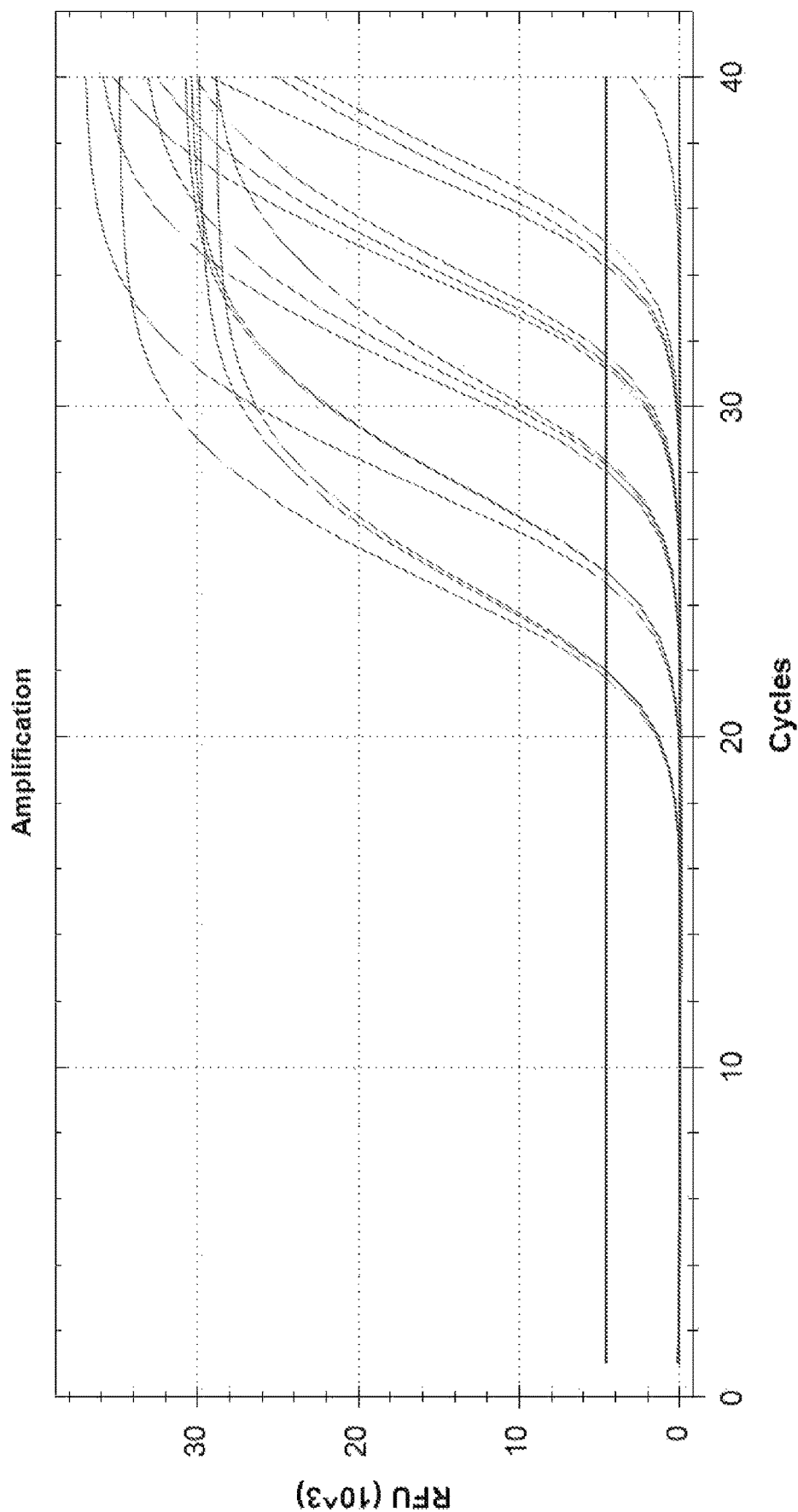
FIG. 6 shows an amplification curve of real-time fluorescence quantitative PCR on a VZV in Example 5 of the present disclosure.
Figure 7:
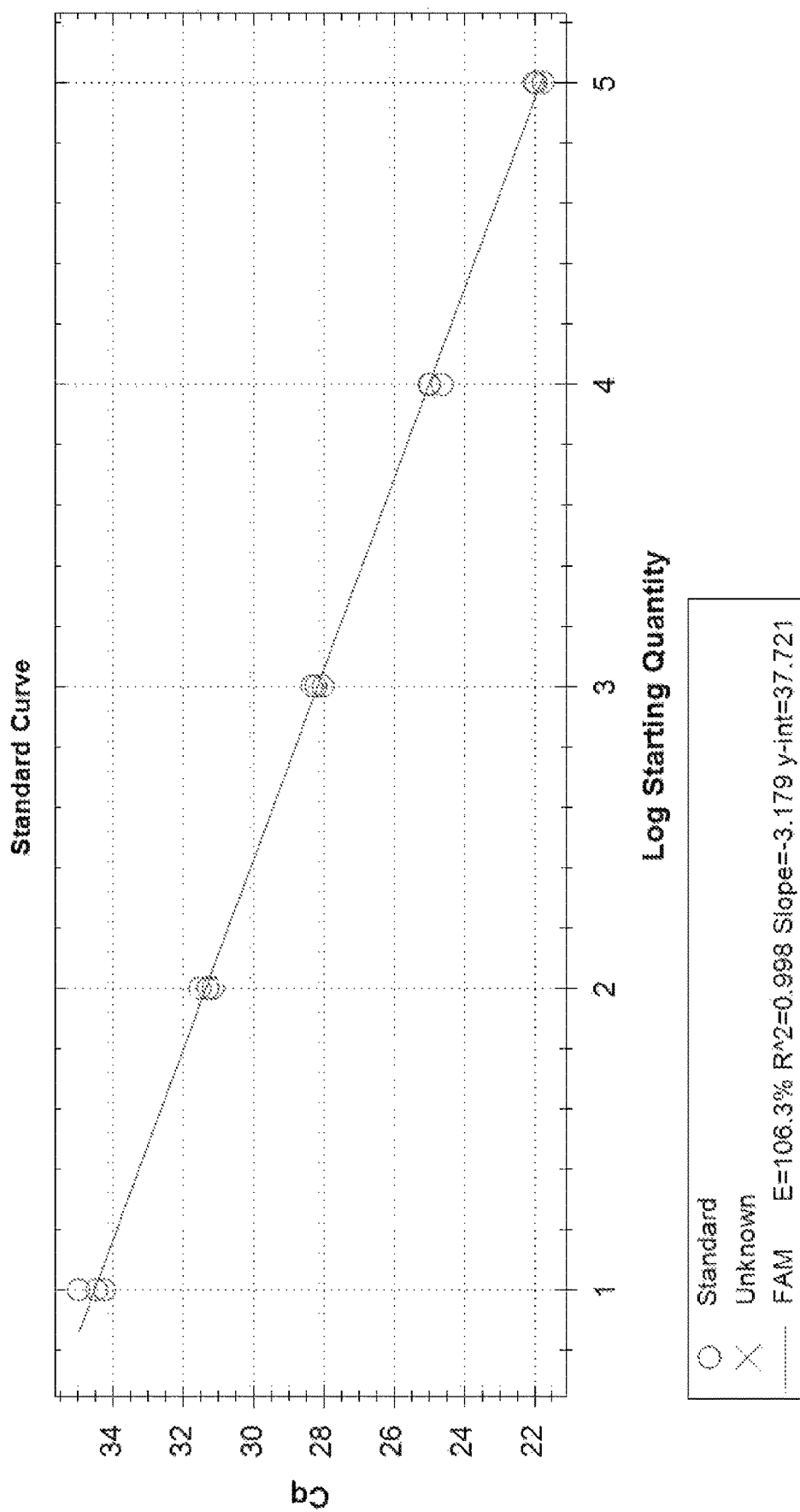
FIG. 7 shows a standard curve of real-time fluorescence quantitative PCR on the VZV in Example 5 of the present disclosure.
Figure 8:
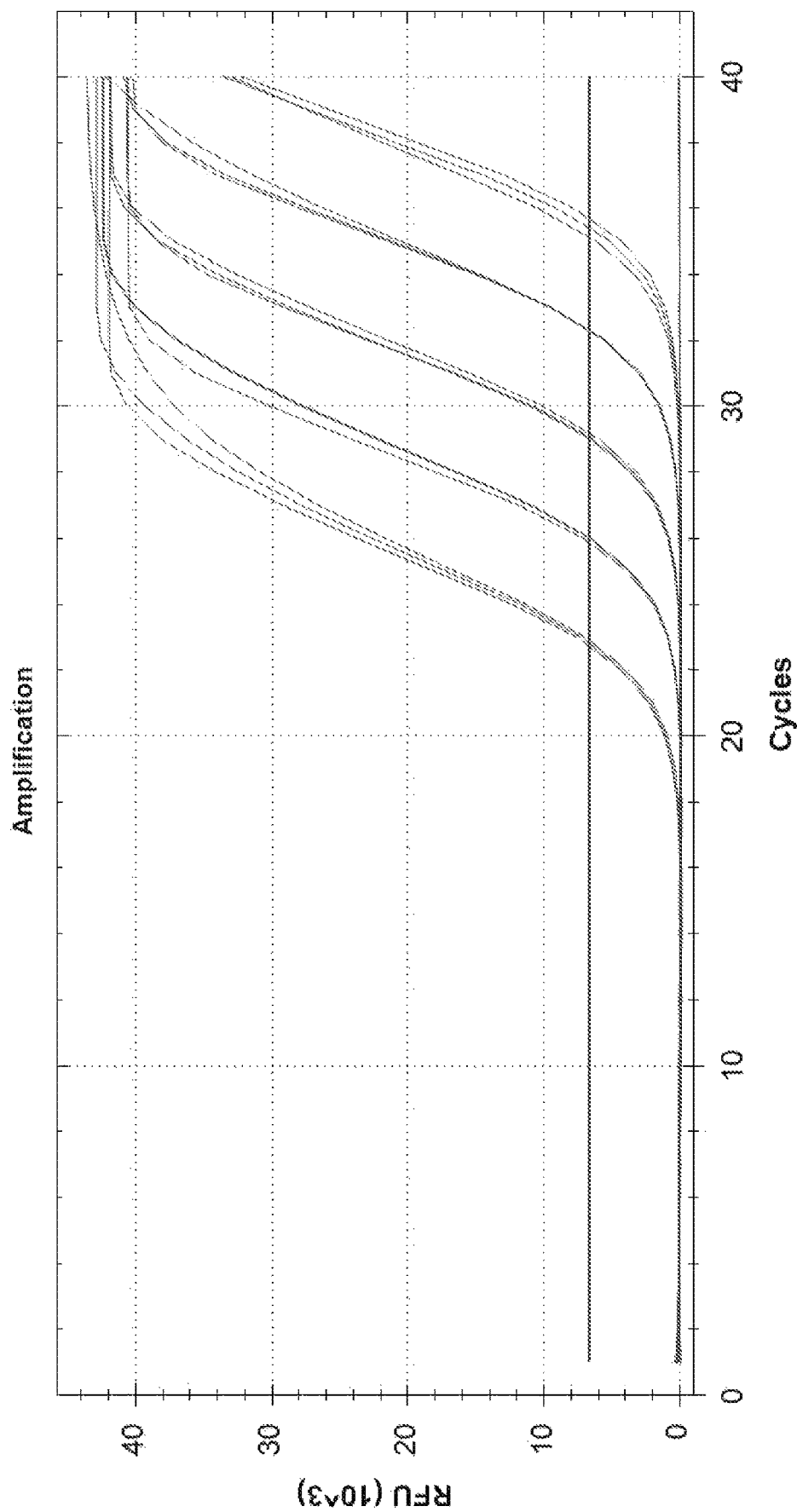
FIG. 8 shows an amplification curve of real-time fluorescence quantitative PCR on an EB virus in Example 5 of the present disclosure.
Figure 9:
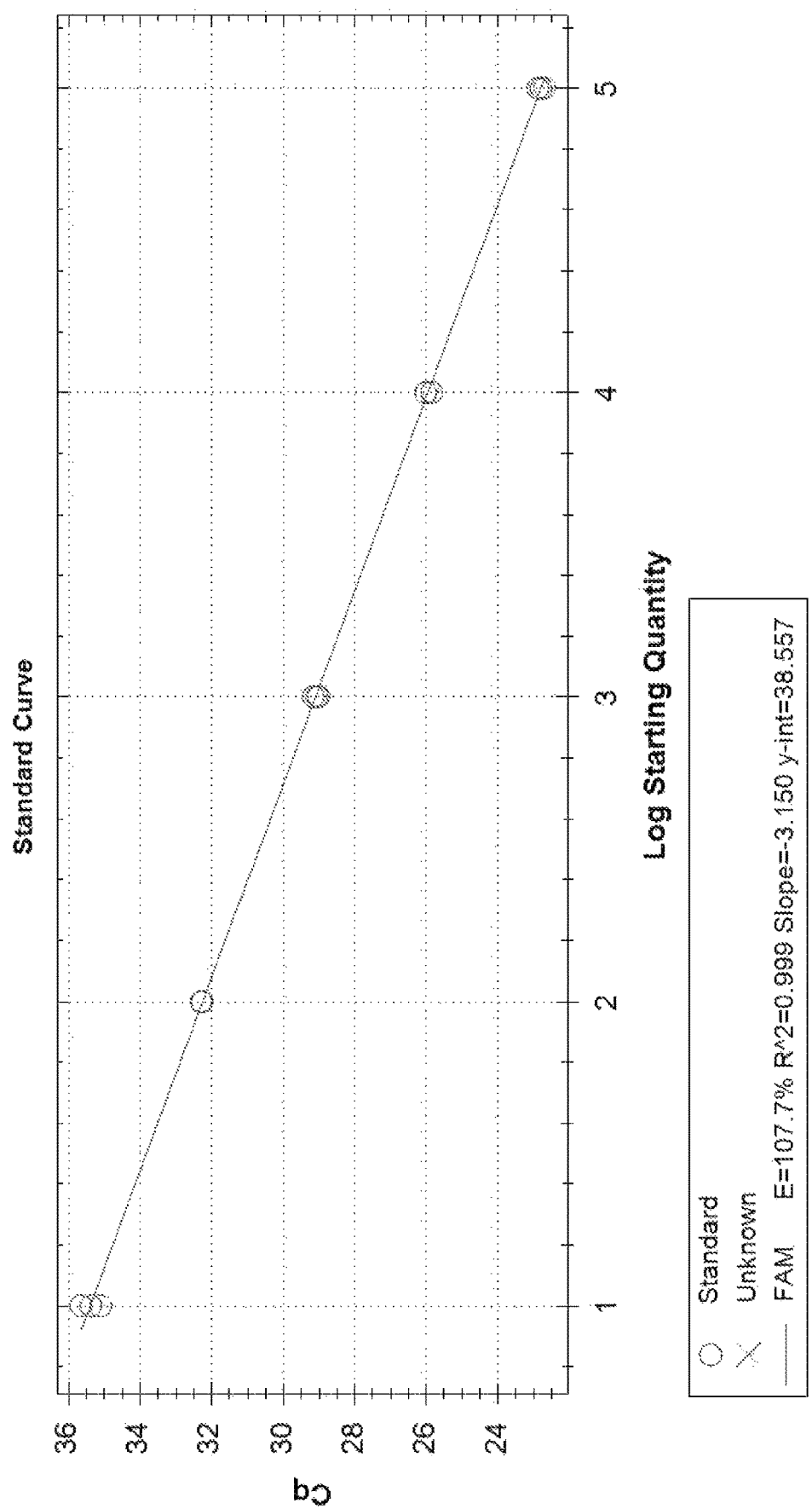
FIG. 9 shows a standard curve of real-time fluorescence quantitative PCR on the EB virus in Example 5 of the present disclosure.
Figure 10:
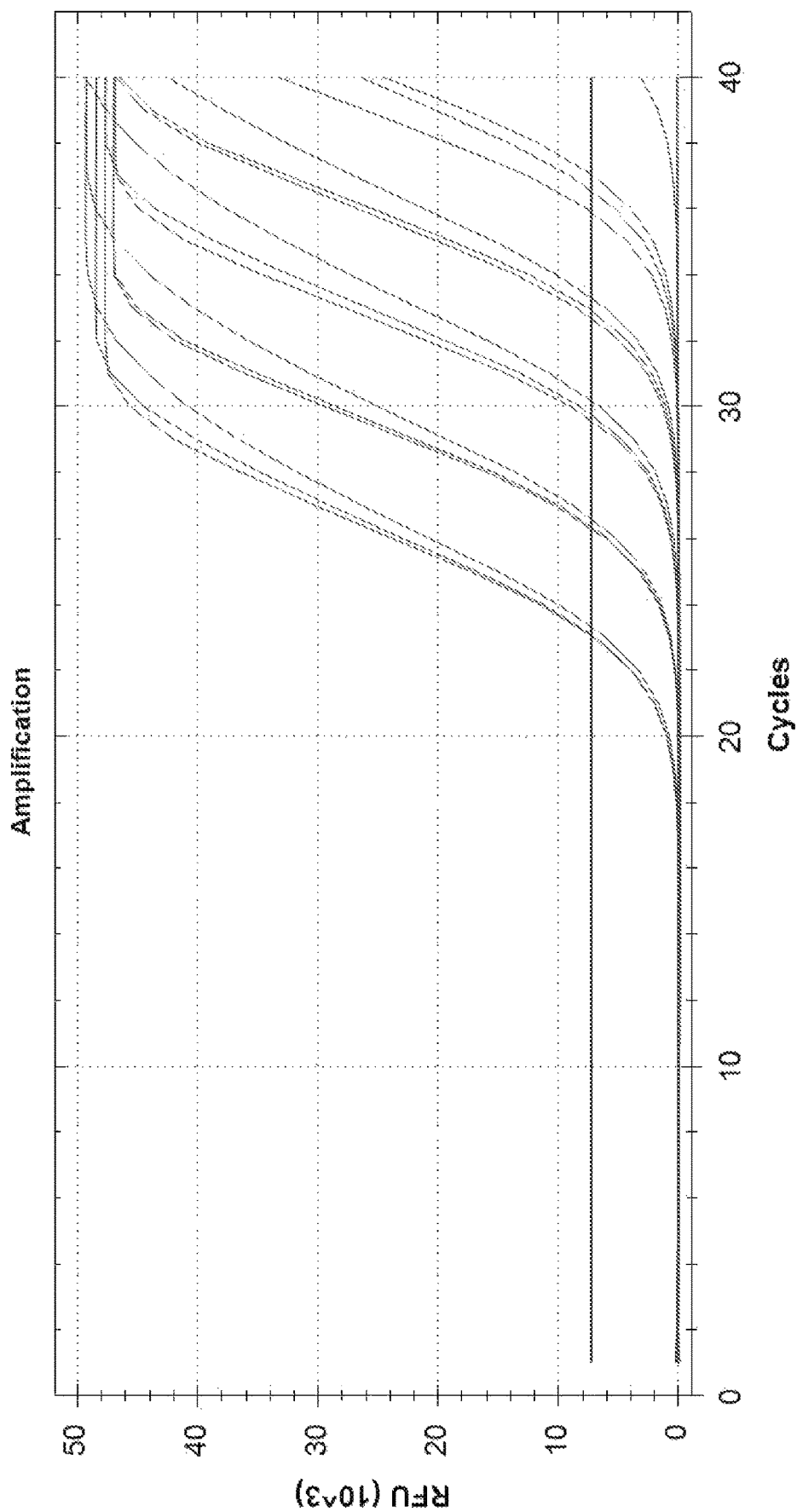
FIG. 10 shows an amplification curve of real-time fluorescence quantitative PCR on a CMV in Example 5 of the present disclosure.
Figure 11:
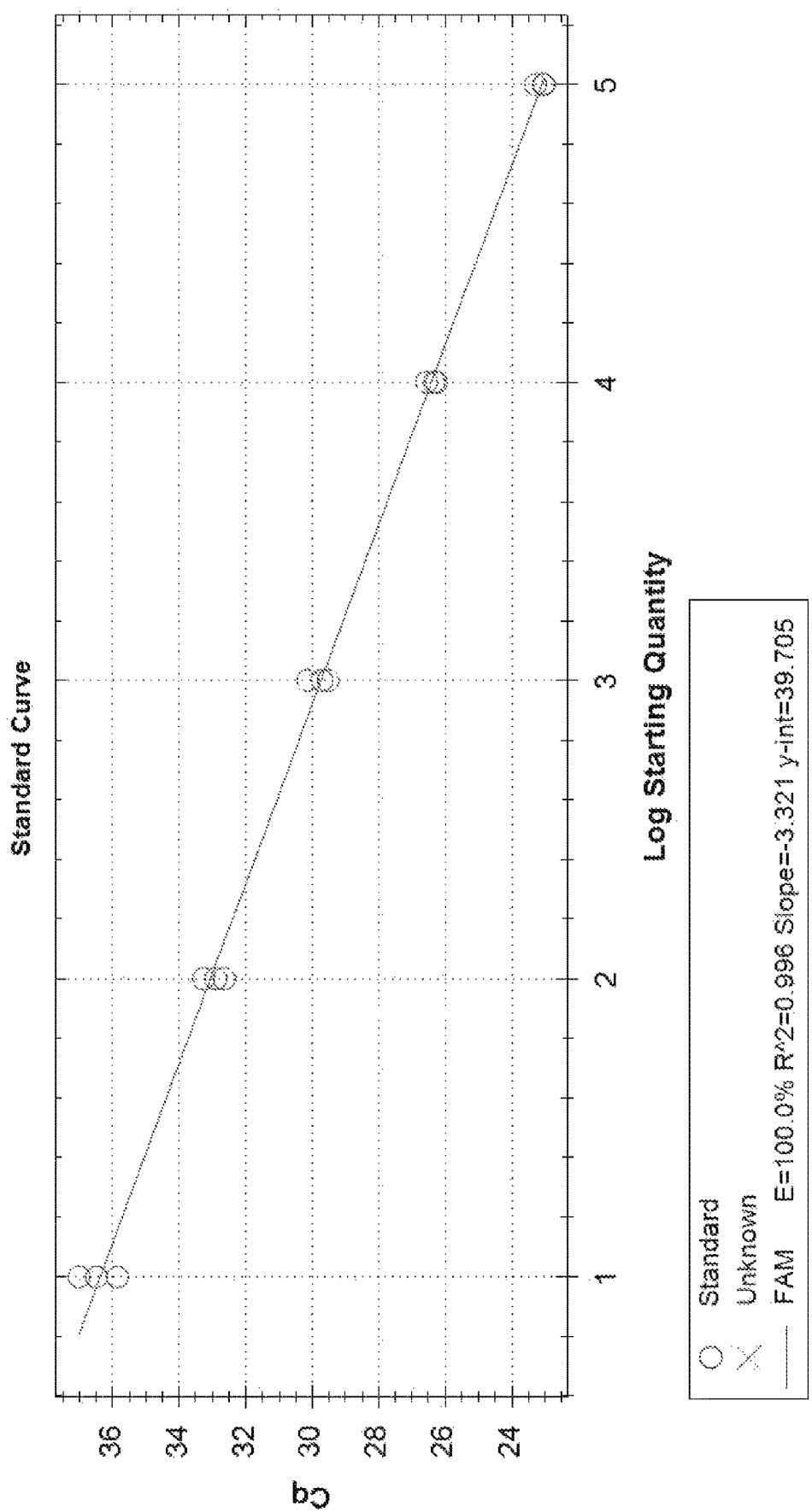
FIG. 11 shows a standard curve of real-time fluorescence quantitative PCR on the CMV in Example 5 of the present disclosure.
Figure 12:
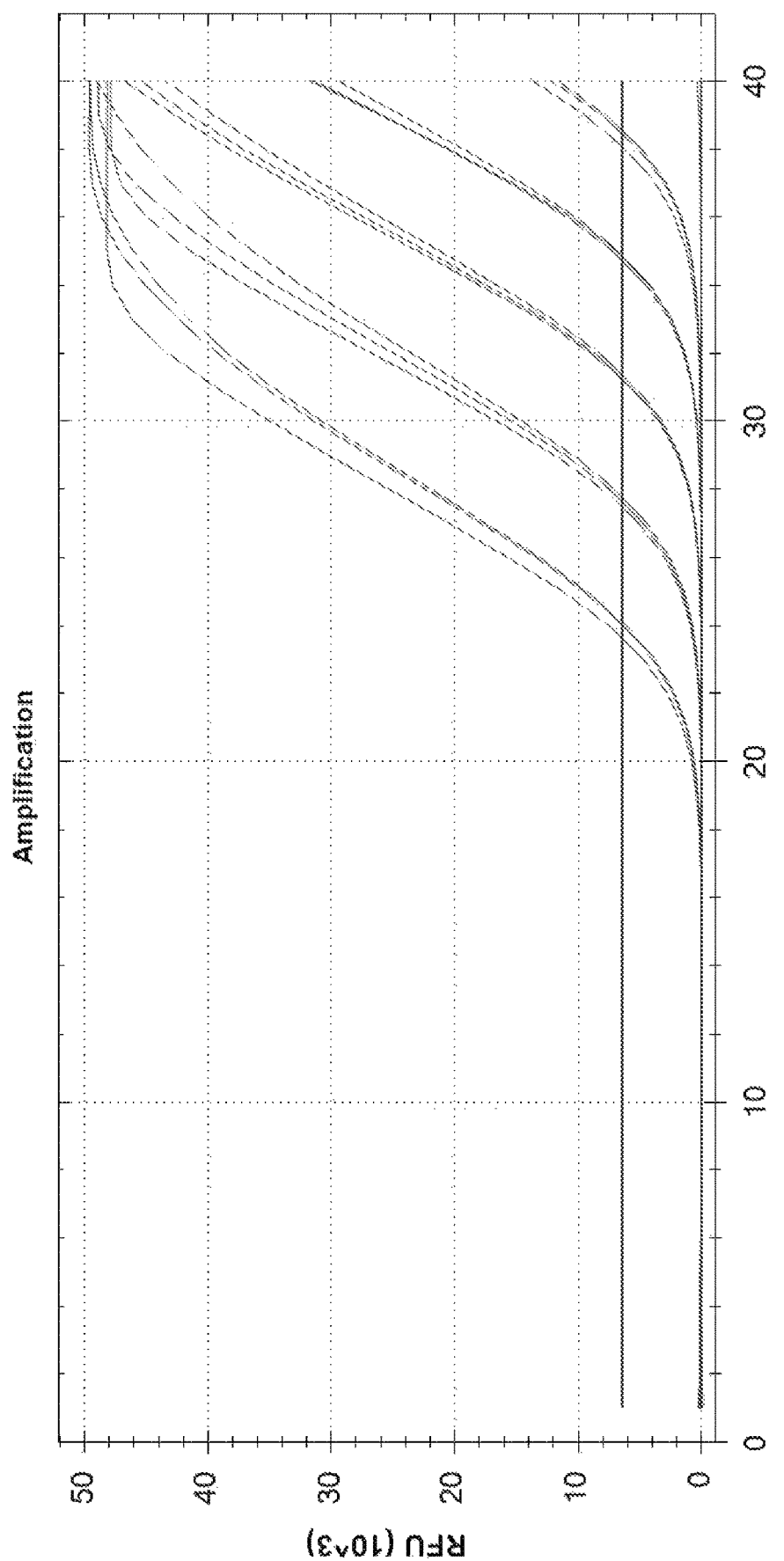
FIG. 12 shows an amplification curve of real-time fluorescence quantitative PCR on a human herpes simplex virus type 1 in Example 5 of the present disclosure.
Figure 13:
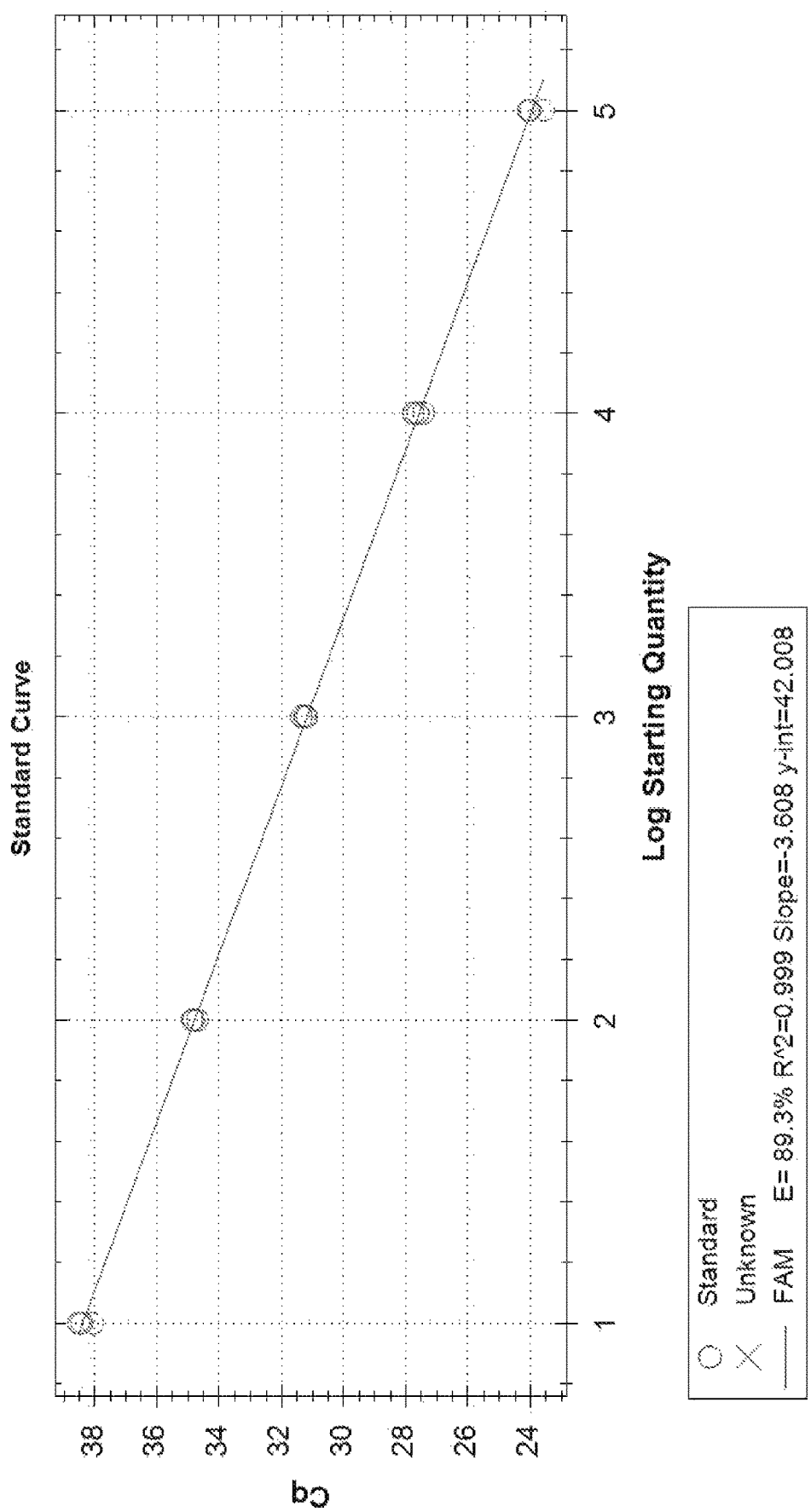
FIG. 13 shows a standard curve of real-time fluorescence quantitative PCR on the human herpes simplex virus type 1 in Example 5 of the present disclosure.
Figure 14:
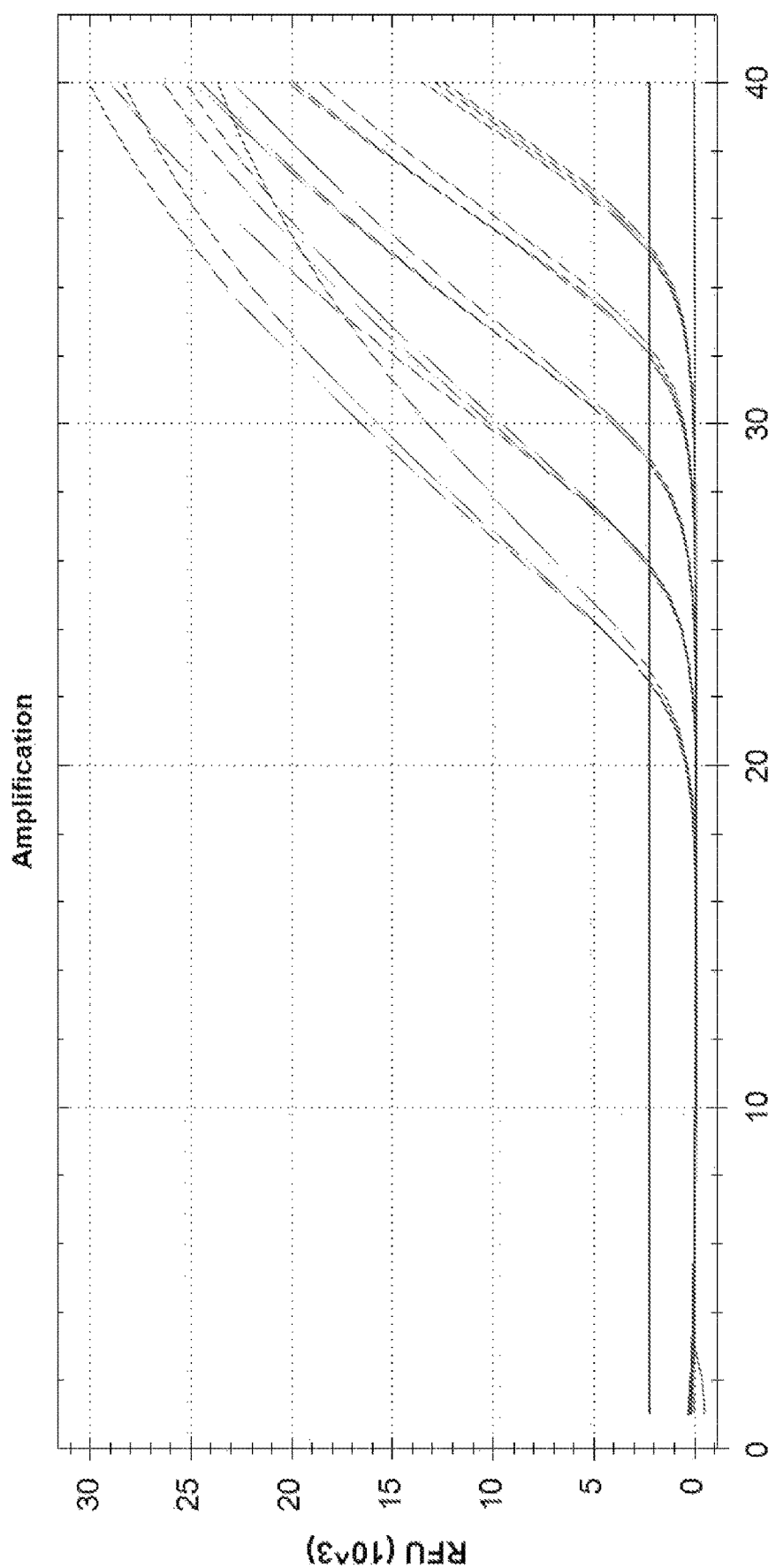
FIG. 14 shows an amplification curve of real-time fluorescence quantitative PCR on a human herpes virus type 6 in Example 5 of the present disclosure.
Figure 15:
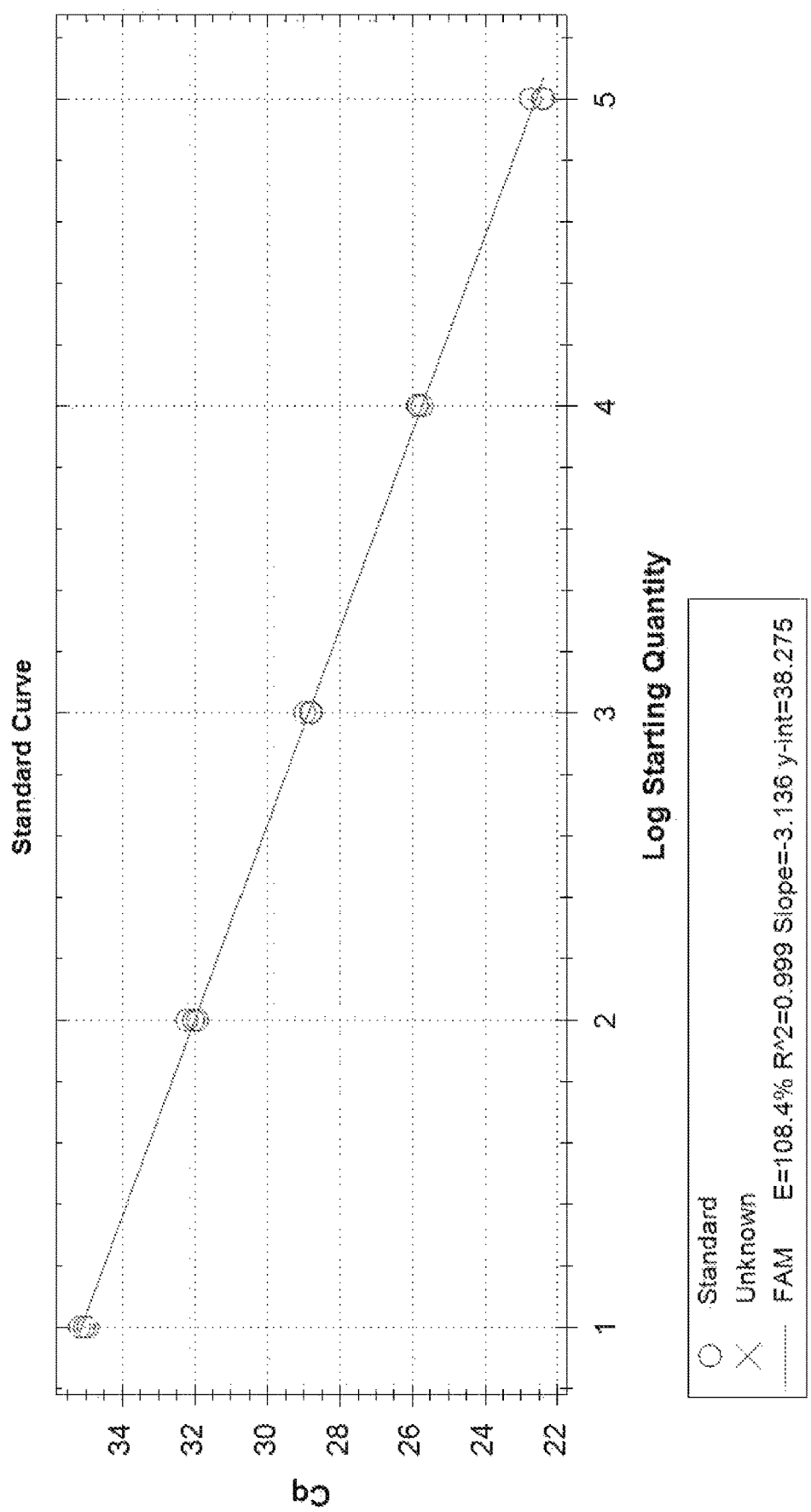
FIG. 15 shows a standard curve of real-time fluorescence quantitative PCR on the human herpes virus type 6 in Example 5 of the present disclosure.
Figure 16:
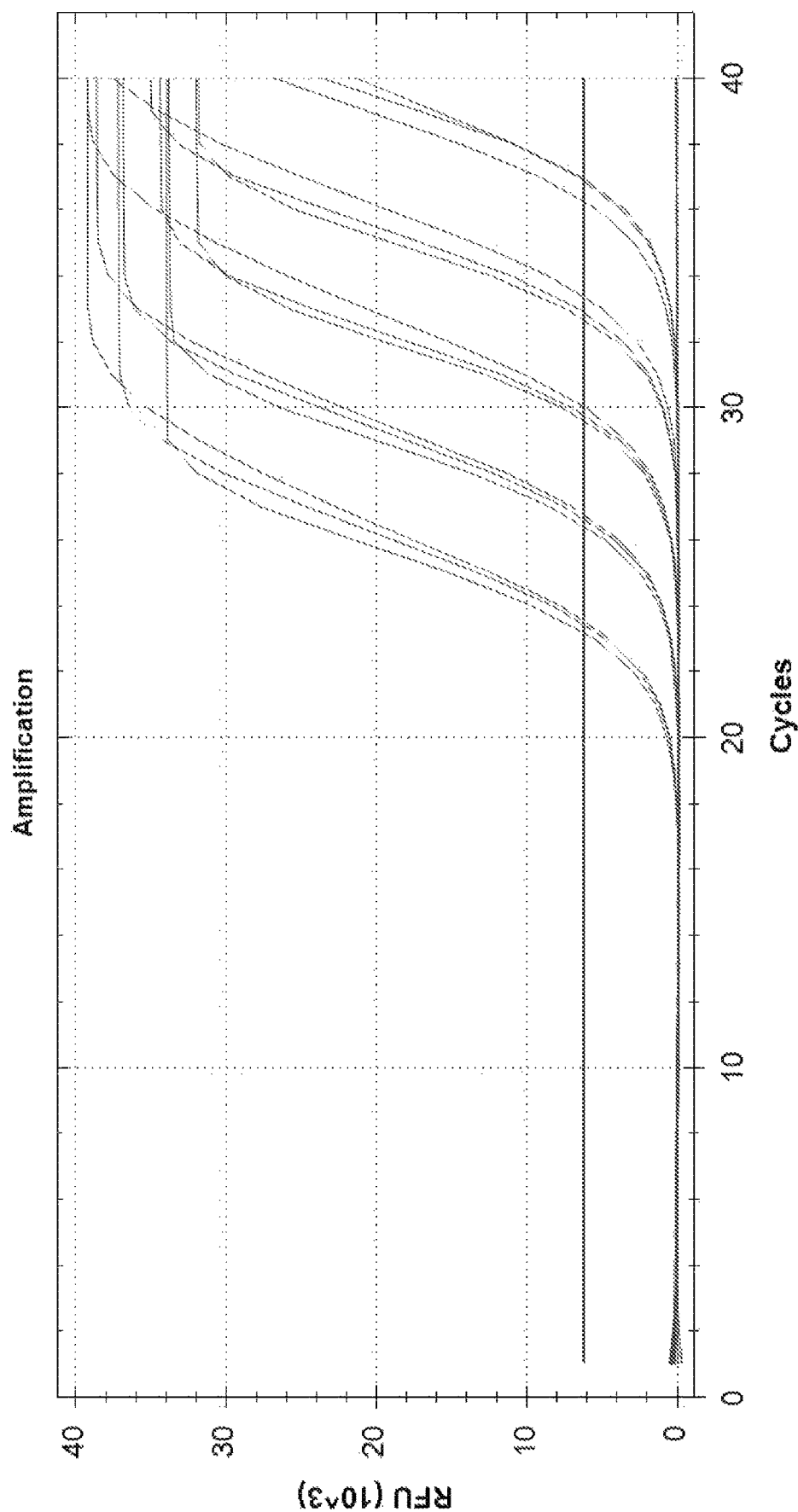
FIG. 16 shows an amplification curve of real-time fluorescence quantitative PCR on *Staphylococcus aureus* in Example 5 of the present disclosure.
Figure 17:
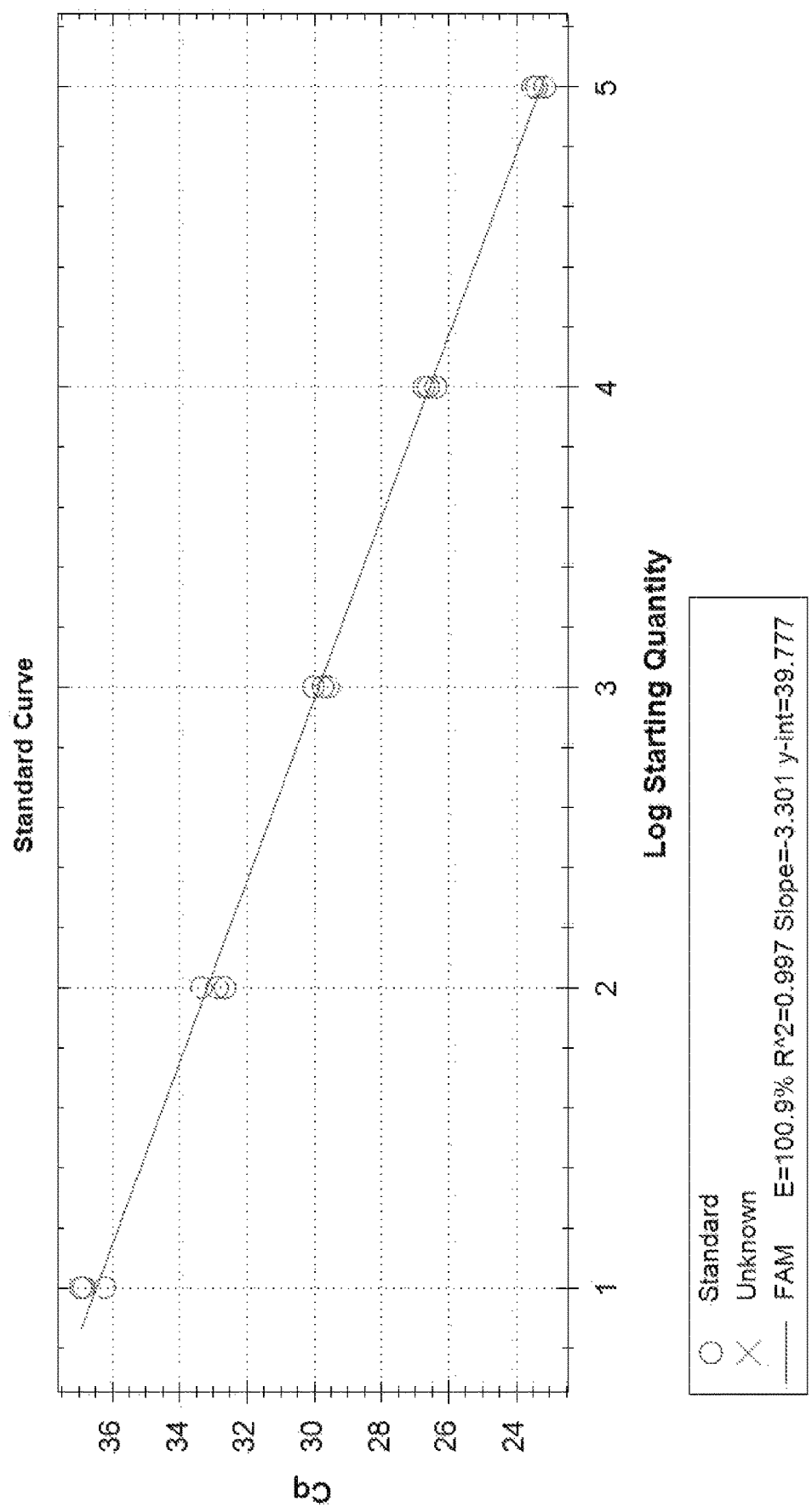
FIG. 17 shows a standard curve of real-time fluorescence quantitative PCR on the *Staphylococcus aureus* in Example 5 of the present disclosure.
Figure 18:
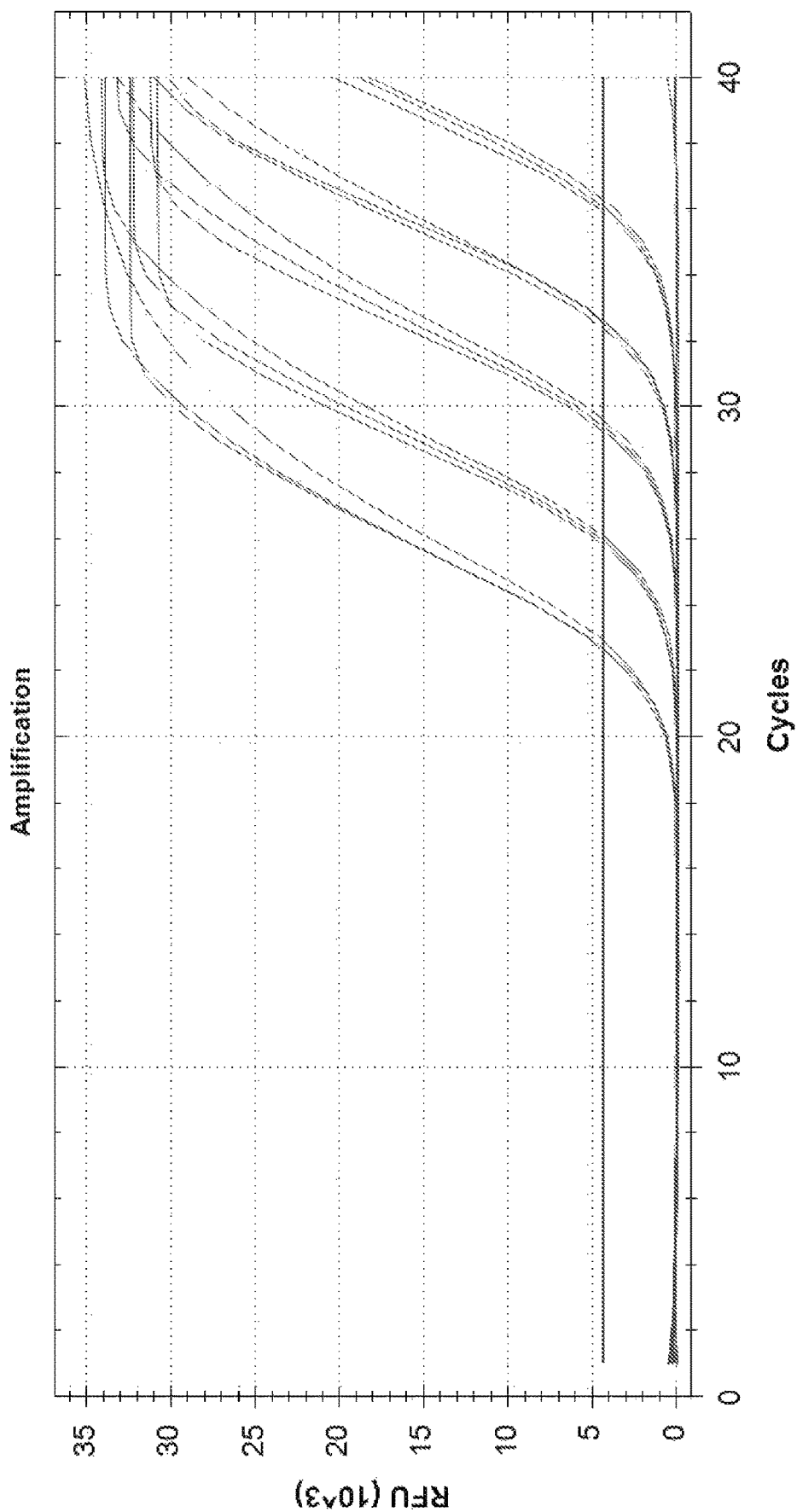
FIG. 18 shows an amplification curve of real-time fluorescence quantitative PCR on *Streptococcus pneumoniae* in Example 5 of the present disclosure.
Figure 19:
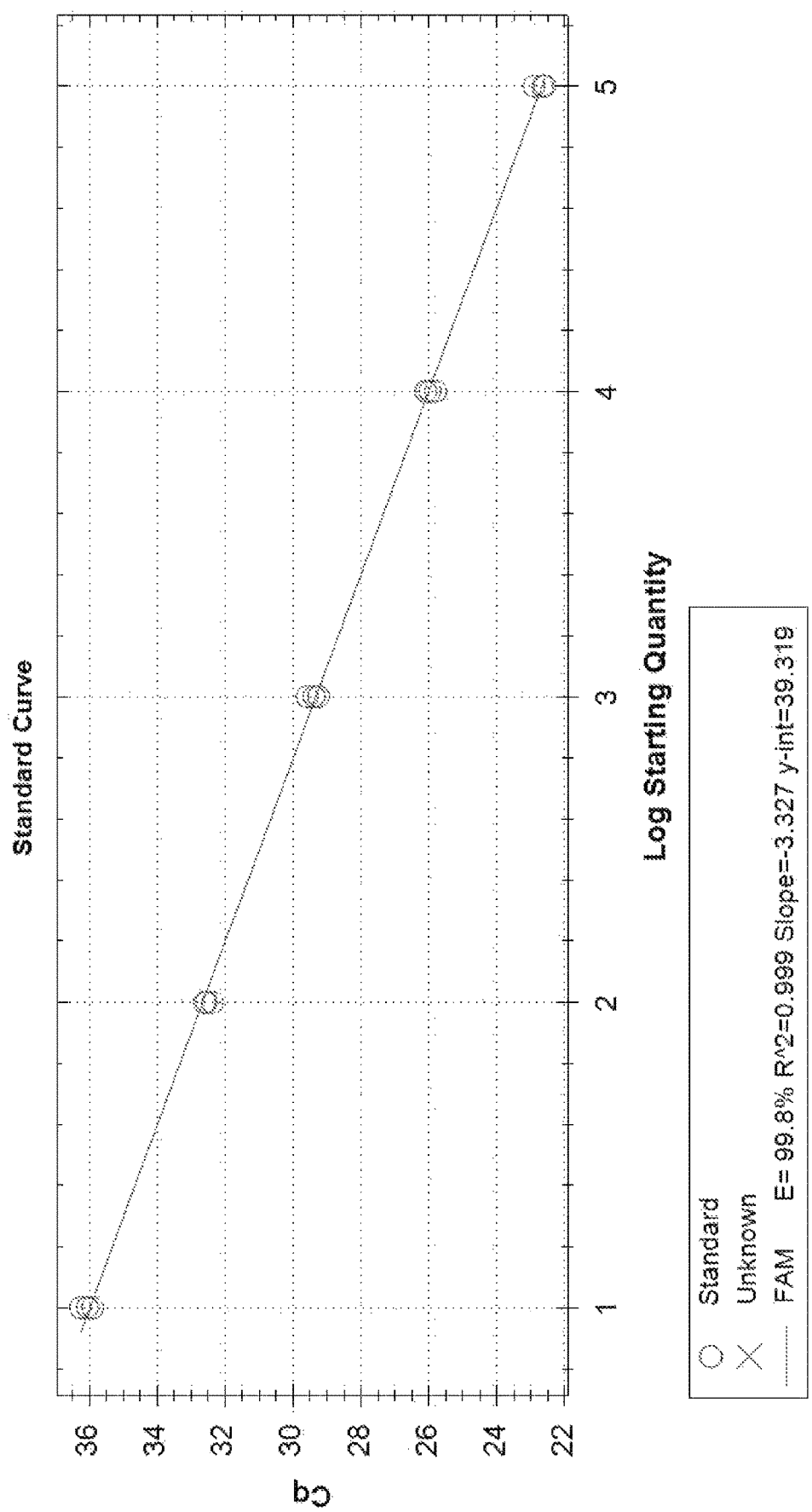
FIG. 19 shows a standard curve of real-time fluorescence quantitative PCR on the *Streptococcus pneumoniae* in Example 5 of the present disclosure.
Figure 20:
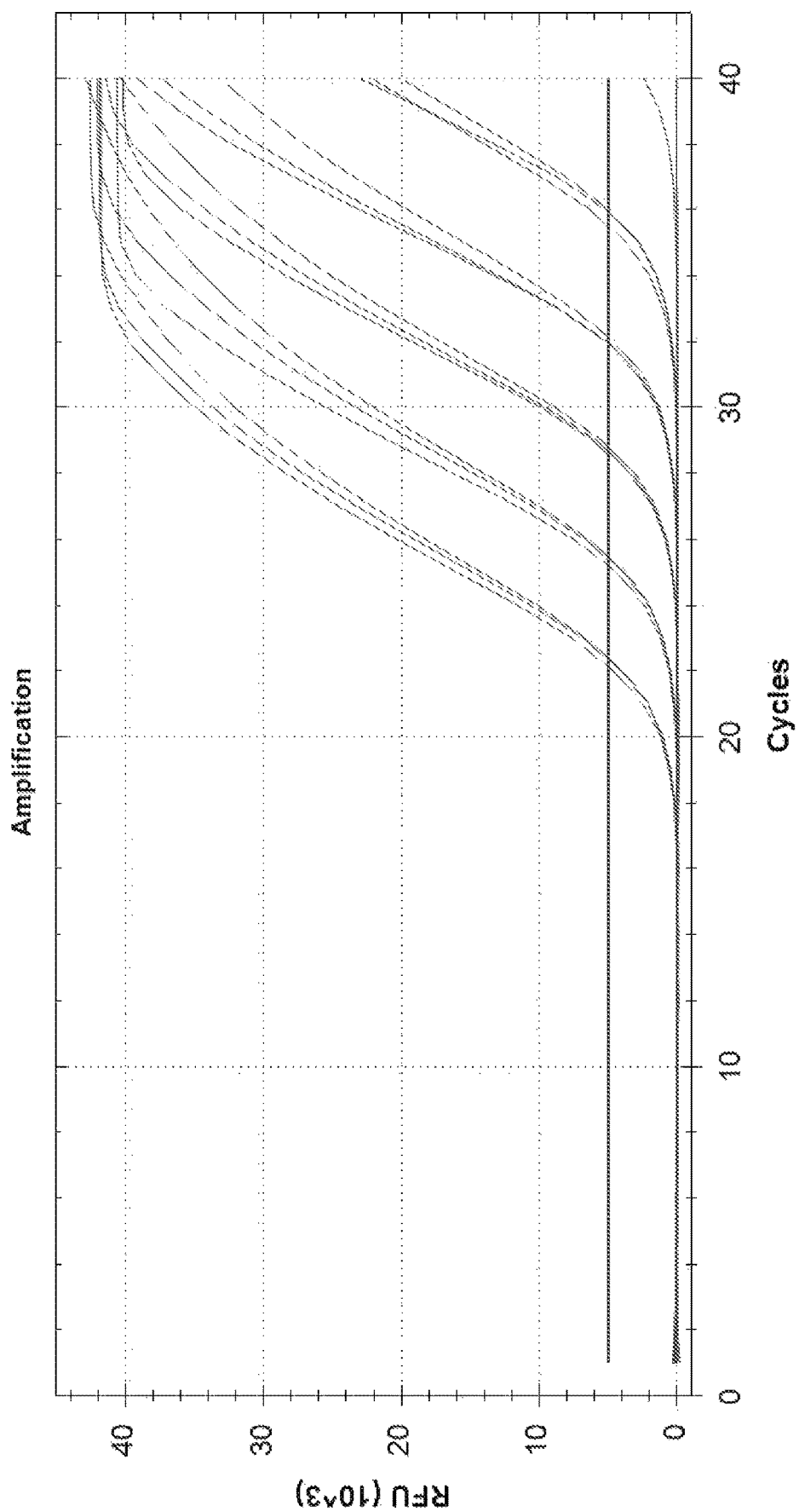
FIG. 20 shows an amplification curve of real-time fluorescence quantitative PCR on *Staphylococcus epidermidis* in Example 5 of the present disclosure.
Figure 21:
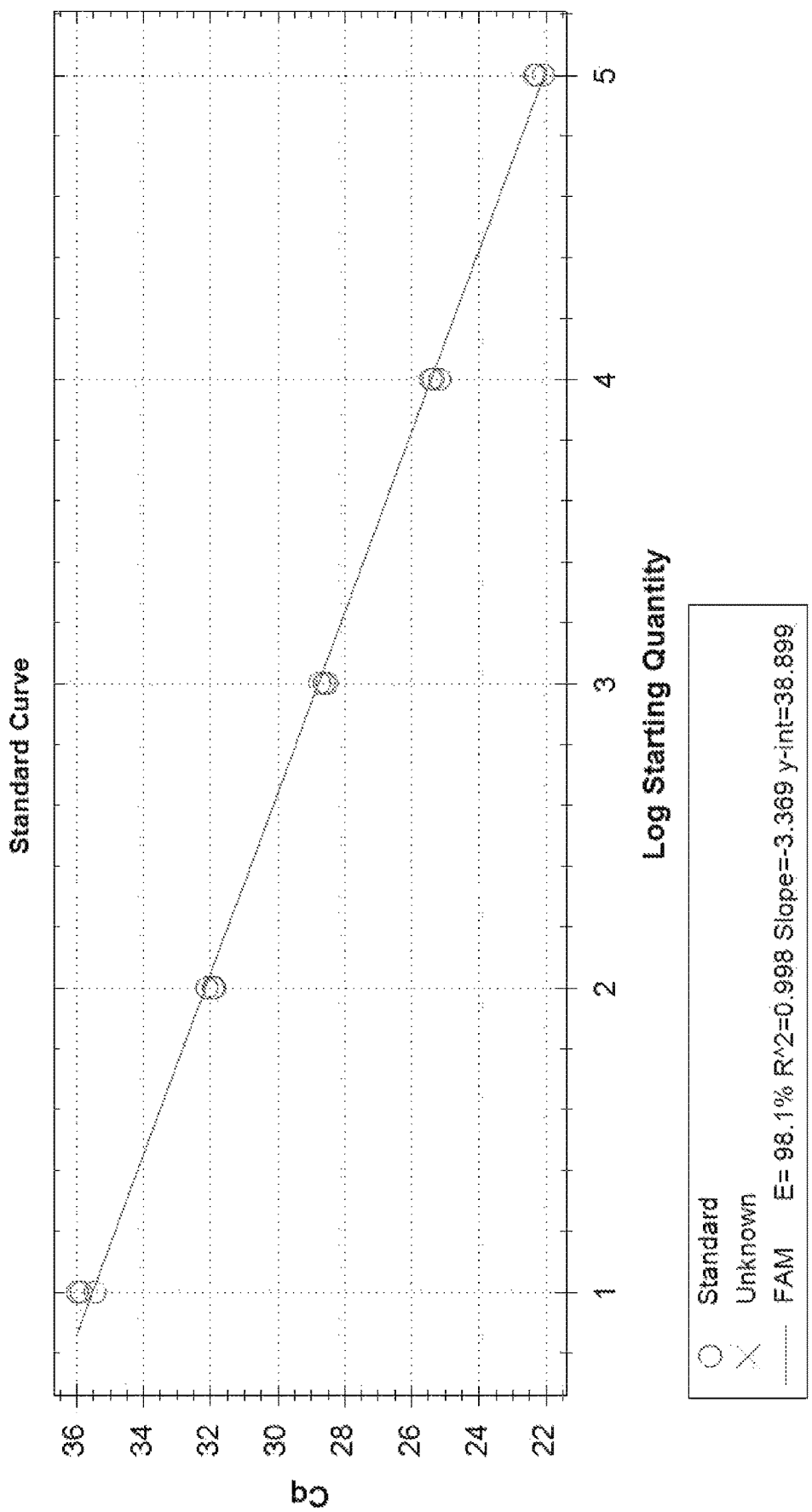
FIG. 21 shows a standard curve of real-time fluorescence quantitative PCR on the *Staphylococcus epidermidis* in Example 5 of the present disclosure.
Figure 22:
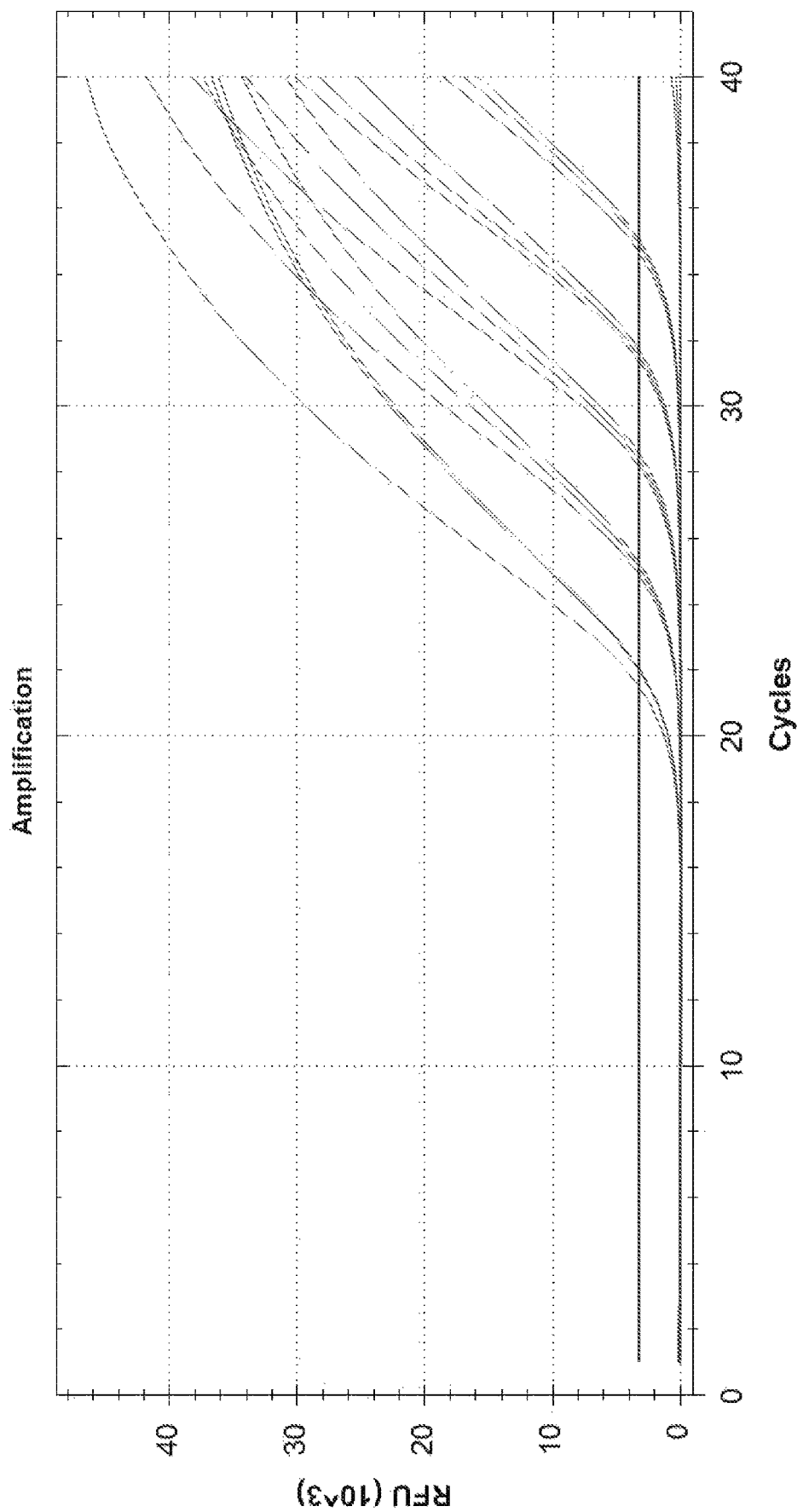
FIG. 22 shows an amplification curve of real-time fluorescence quantitative PCR on *Pseudomonas aeruginosa* in Example 5 of the present disclosure.
Figure 23:
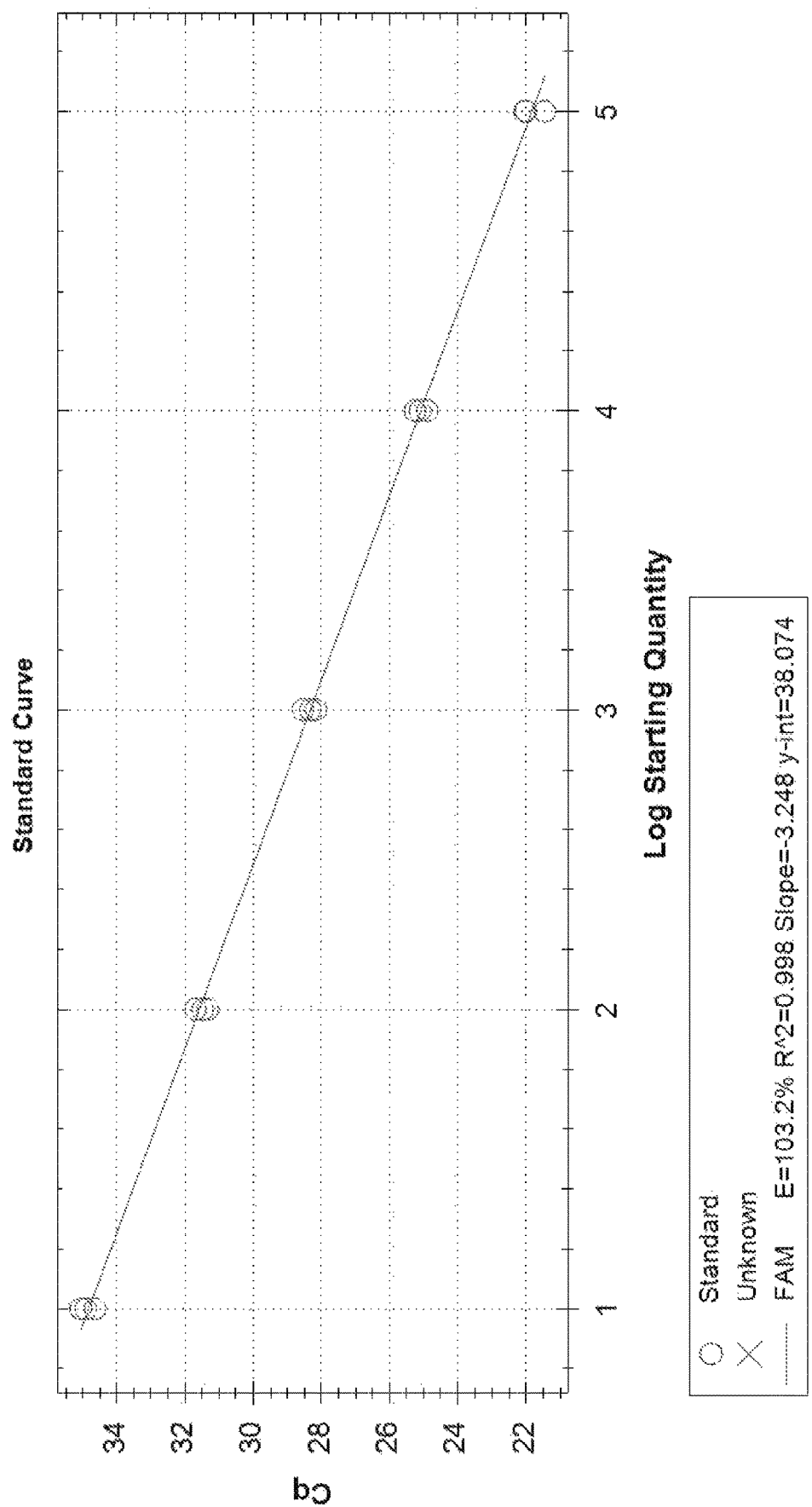
FIG. 23 shows a standard curve of real-time fluorescence quantitative PCR on the *Pseudomonas aeruginosa* in Example 5 of the present disclosure.
Figure 24:
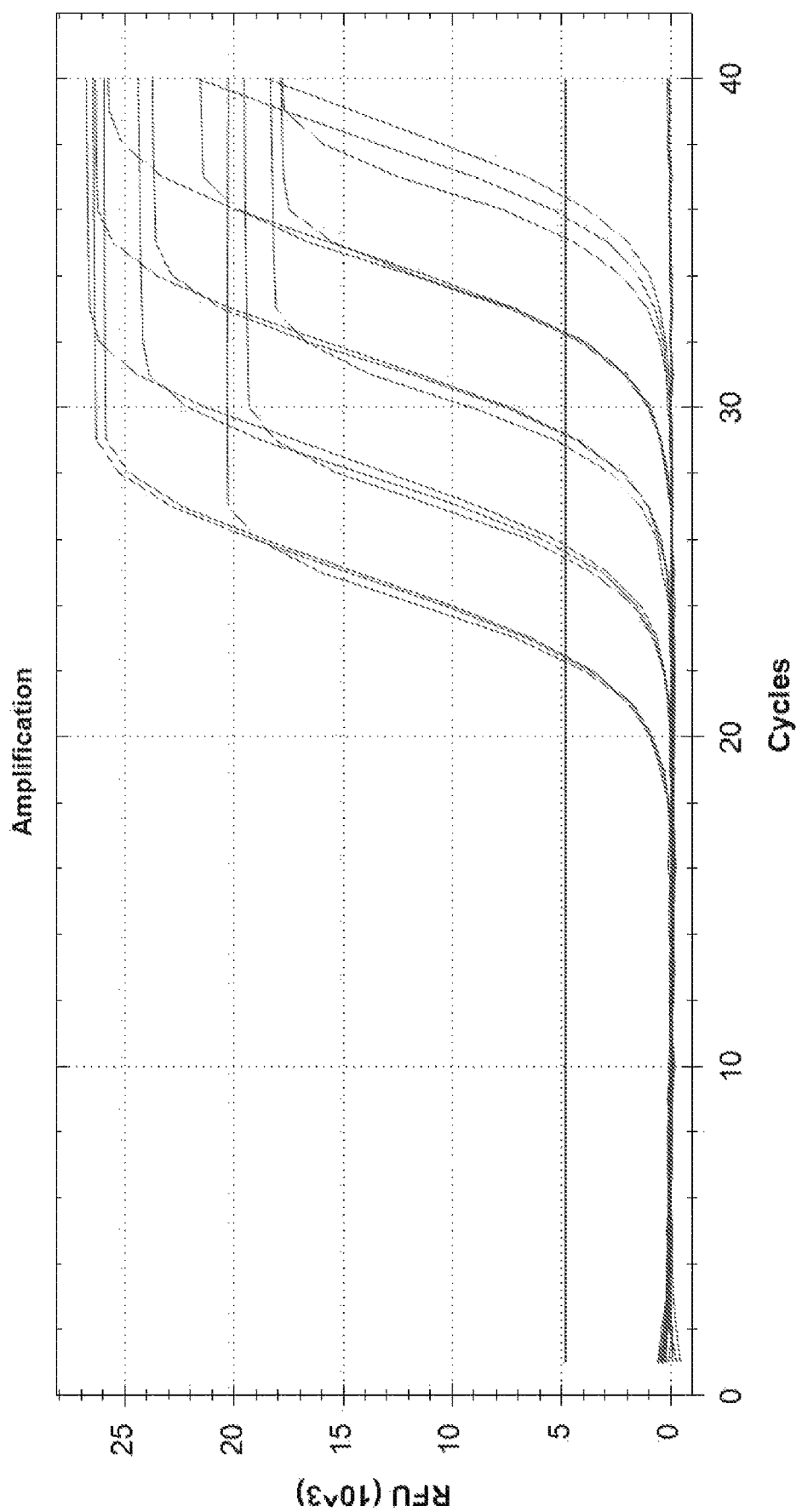
FIG. 24 shows an amplification curve of real-time fluorescence quantitative PCR on *Acinetobacter baumannii* in Example 5 of the present disclosure.
Figure 25:
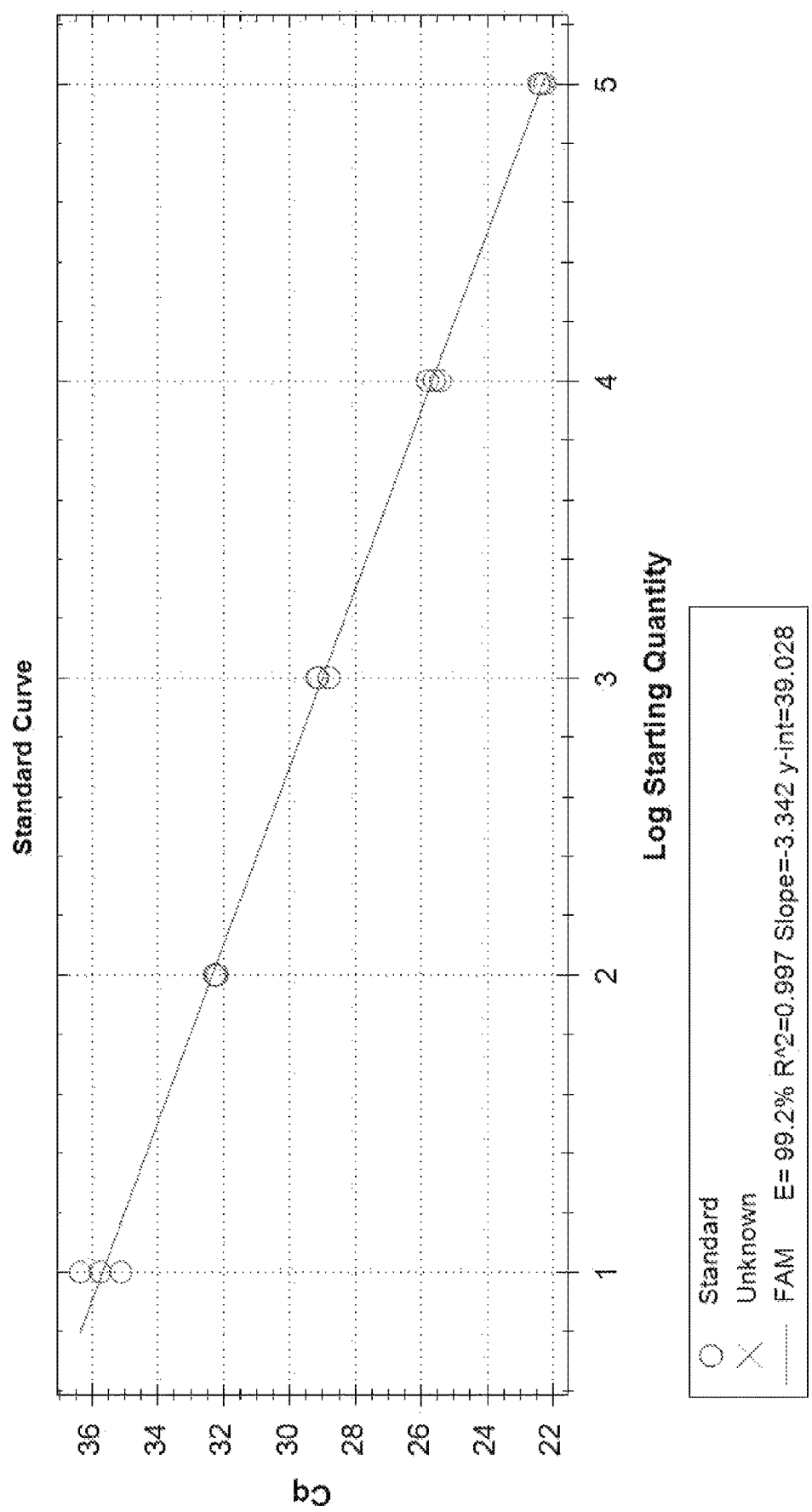
FIG. 25 shows a standard curve of real-time fluorescence quantitative PCR on the *Acinetobacter baumannii* in Example 5 of the present disclosure.
Figure 26:
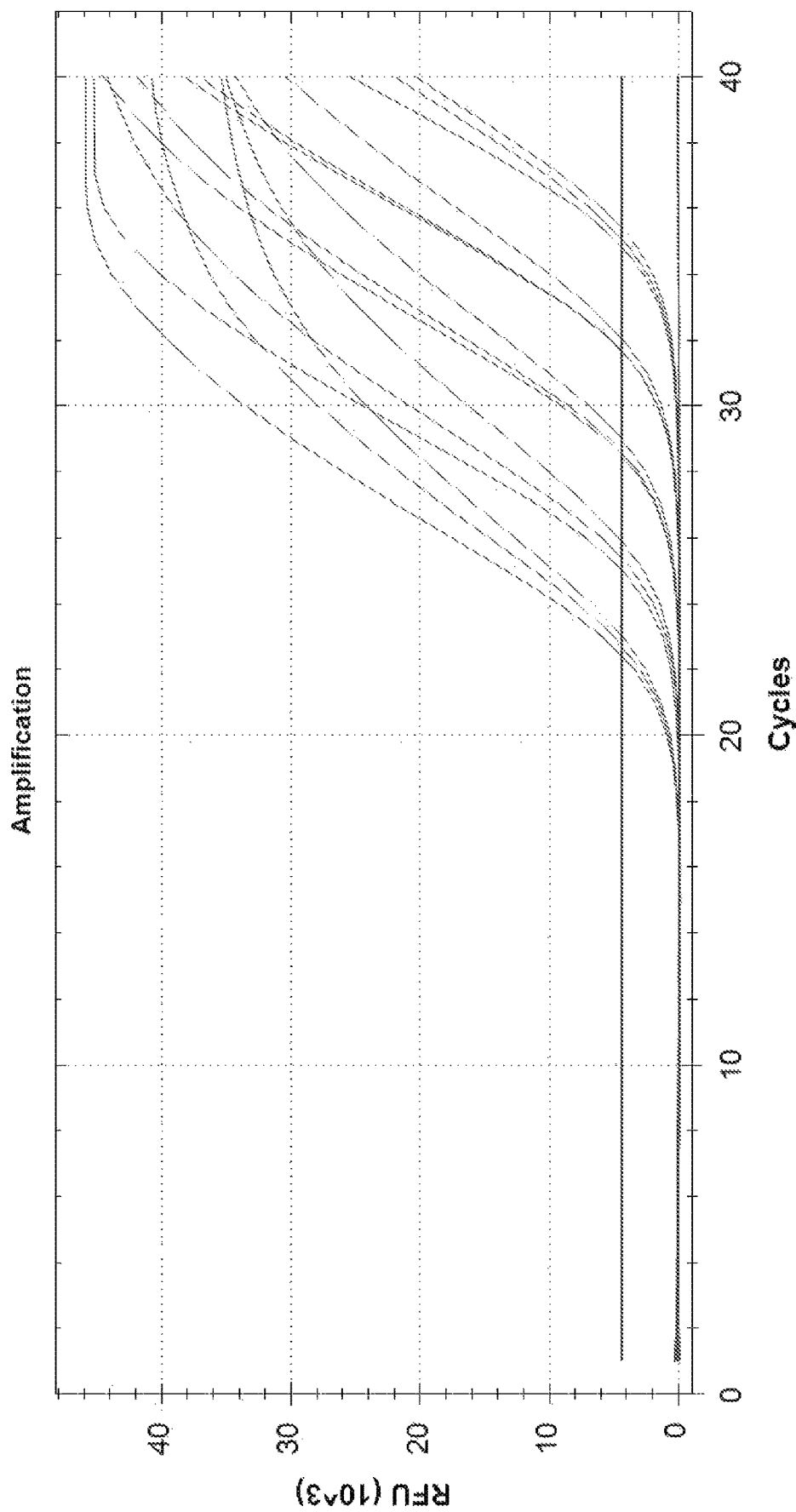
FIG. 26 shows an amplification curve of real-time fluorescence quantitative PCR on *Escherichia coli* in Example 5 of the present disclosure.
Figure 27:
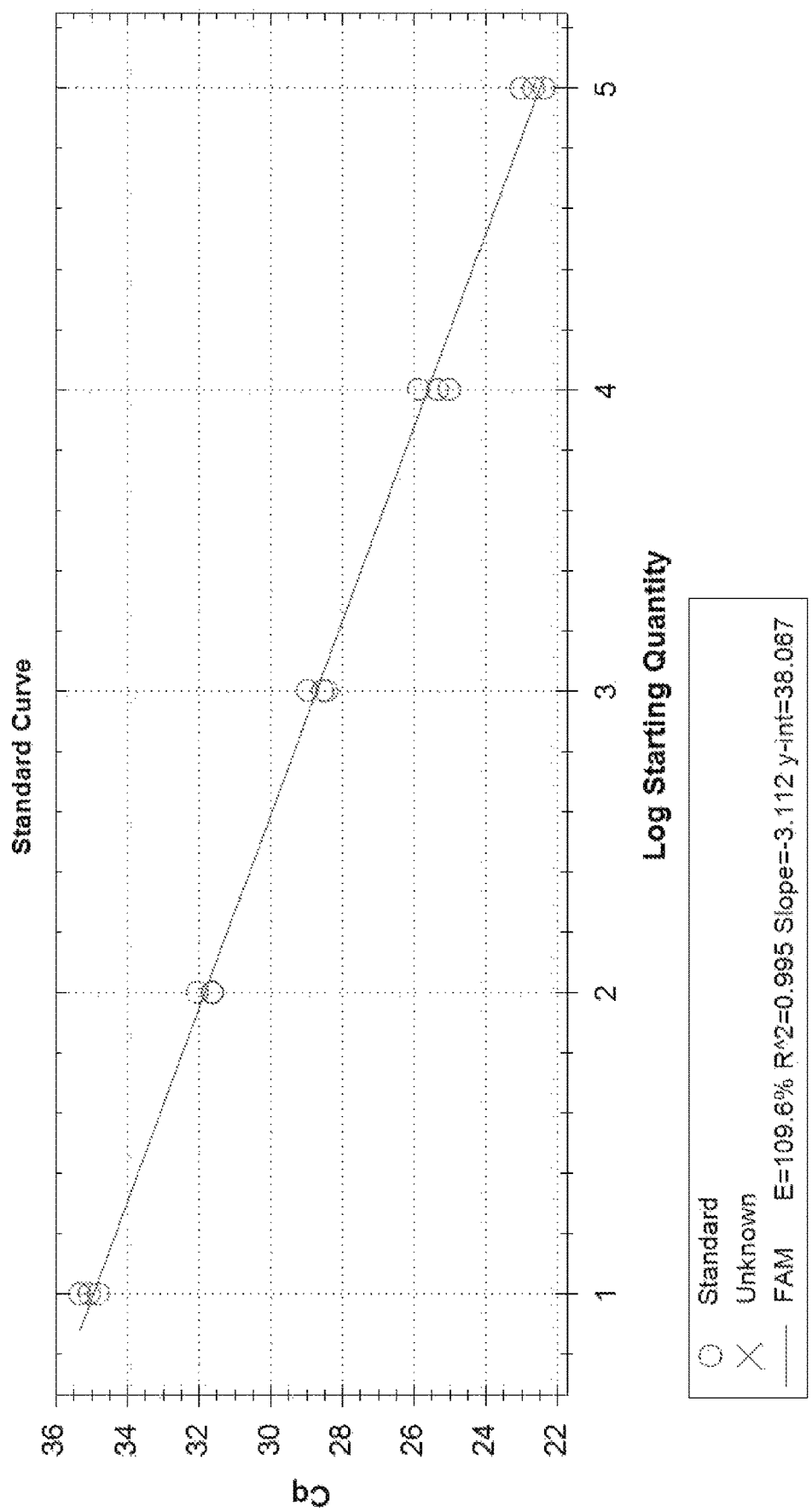
FIG. 27 shows a standard curve of real-time fluorescence quantitative PCR on the *Escherichia coli* in Example 5 of the present disclosure.
Figure 28:
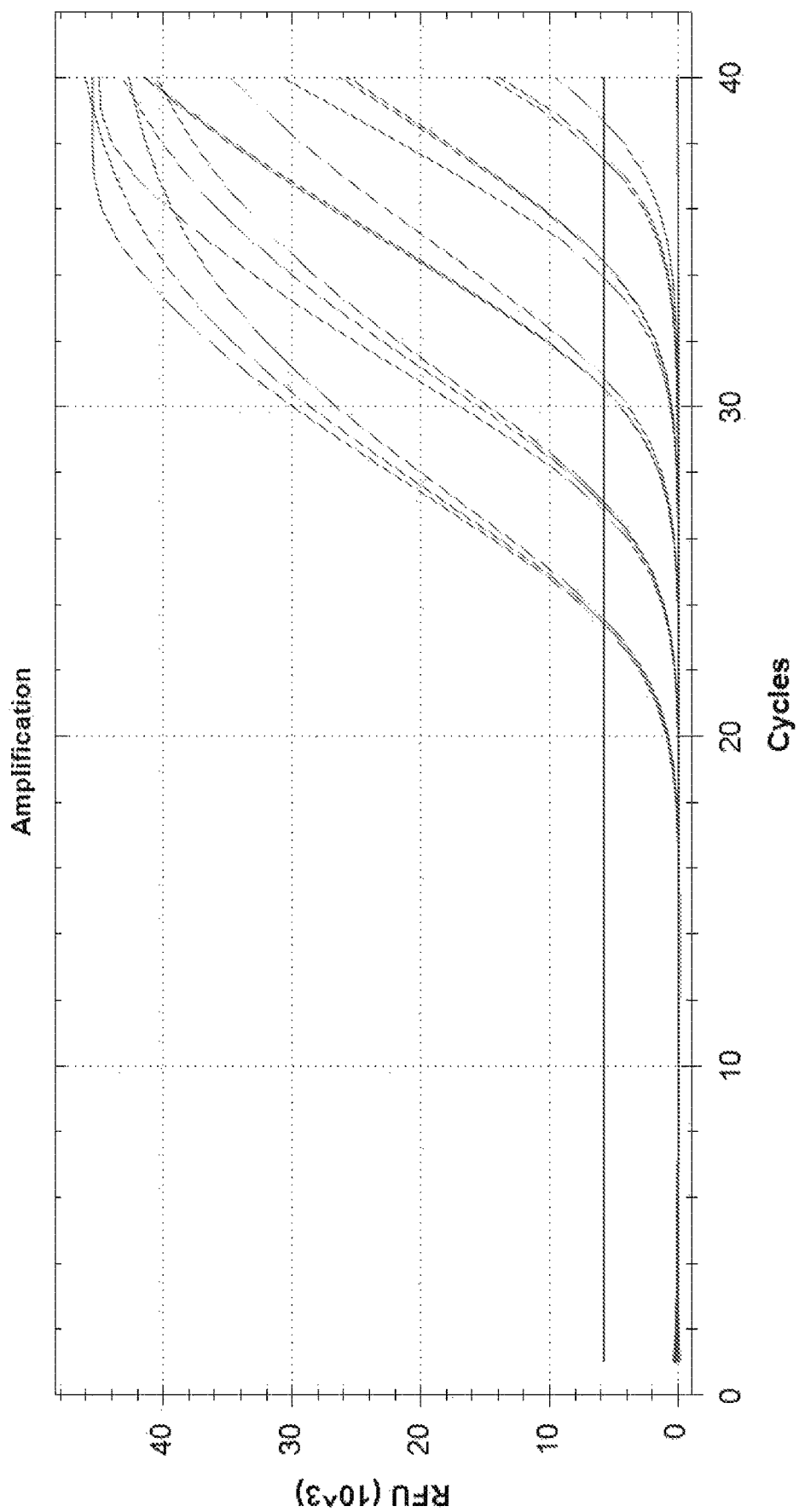
FIG. 28 shows an amplification curve of real-time fluorescence quantitative PCR on a *Mycobacterium tuberculosis* complex in Example 5 of the present disclosure.
Figure 29:
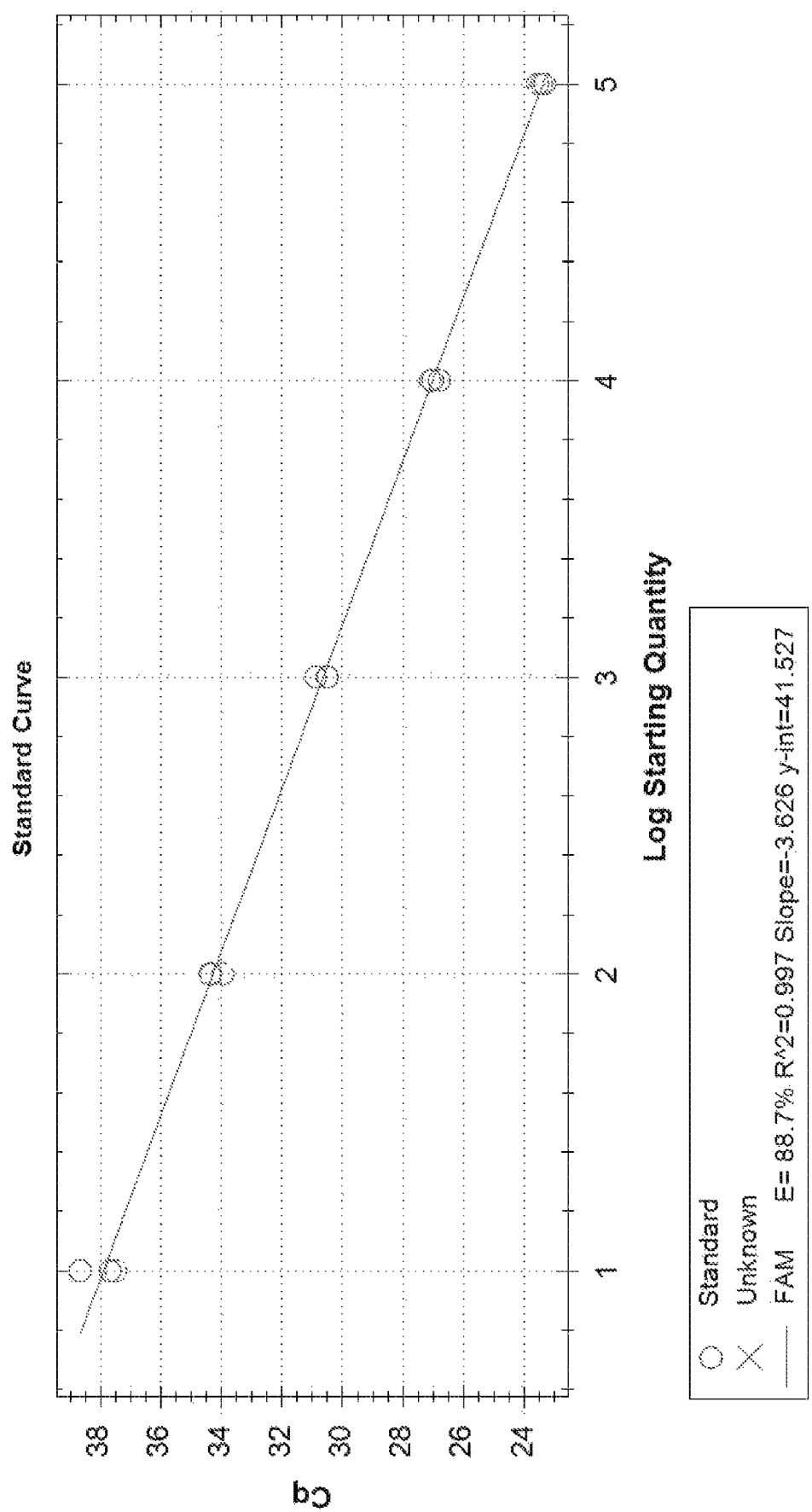
FIG. 29 shows a standard curve of real-time fluorescence quantitative PCR on the *Mycobacterium tuberculosis* complex in Example 5 of the present disclosure.
Figure 30:
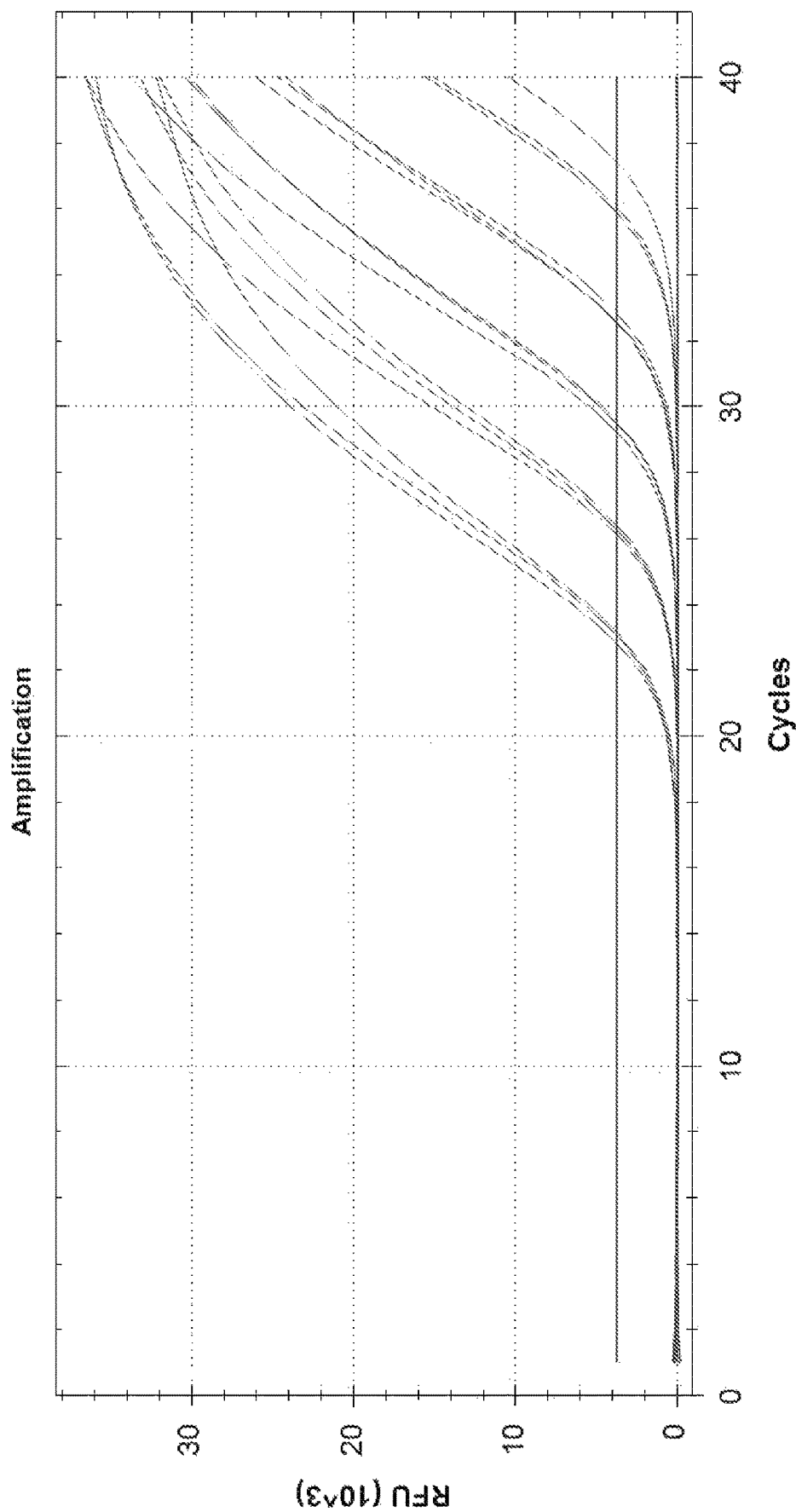
FIG. 30 shows an amplification curve of real-time fluorescence quantitative PCR on *Enterococcus faecalis* in Example 5 of the present disclosure.
Figure 31:
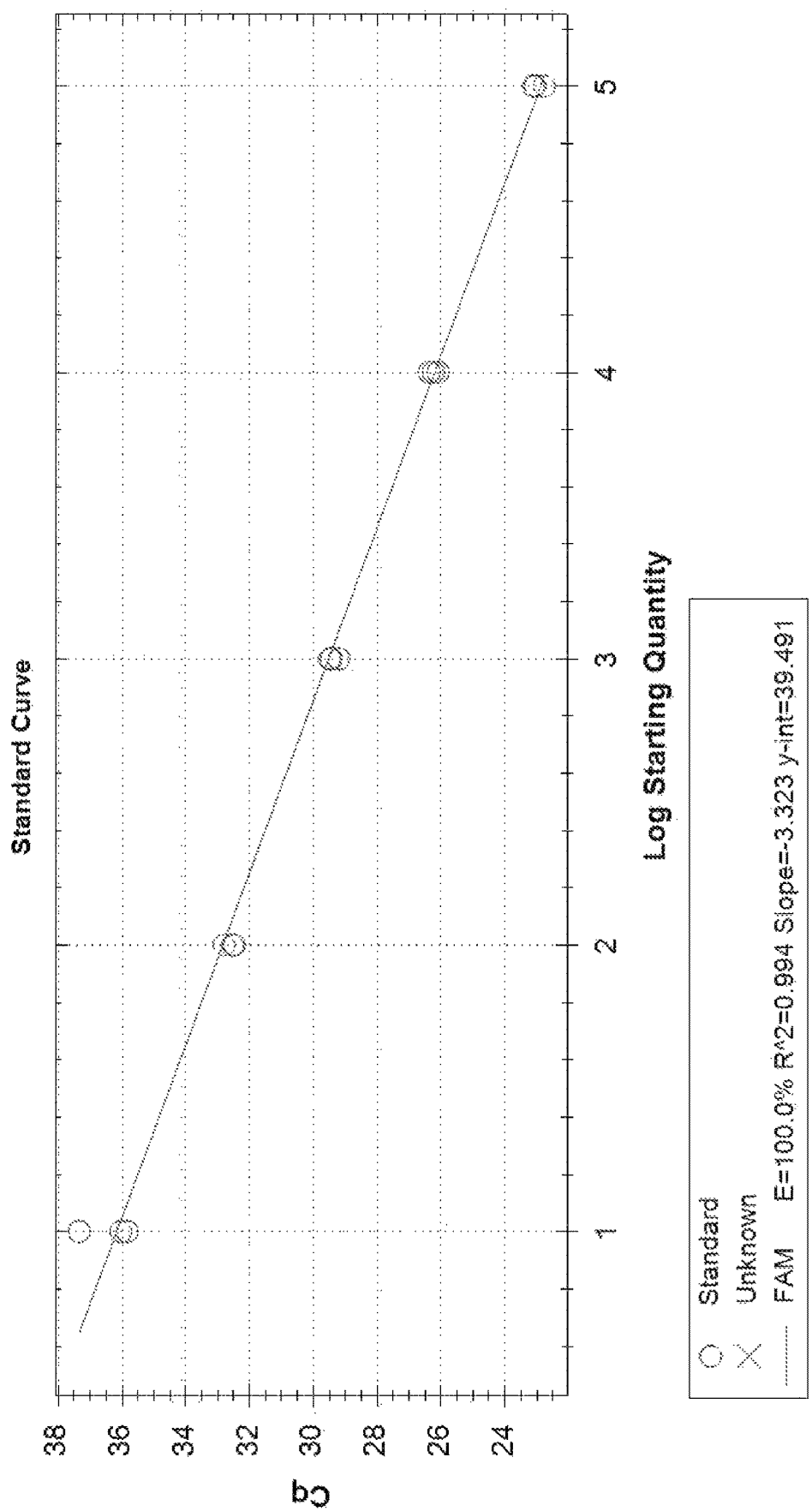
FIG. 31 shows a standard curve of real-time fluorescence quantitative PCR on the *Enterococcus faecalis* in Example 5 of the present disclosure.
Figure 32:
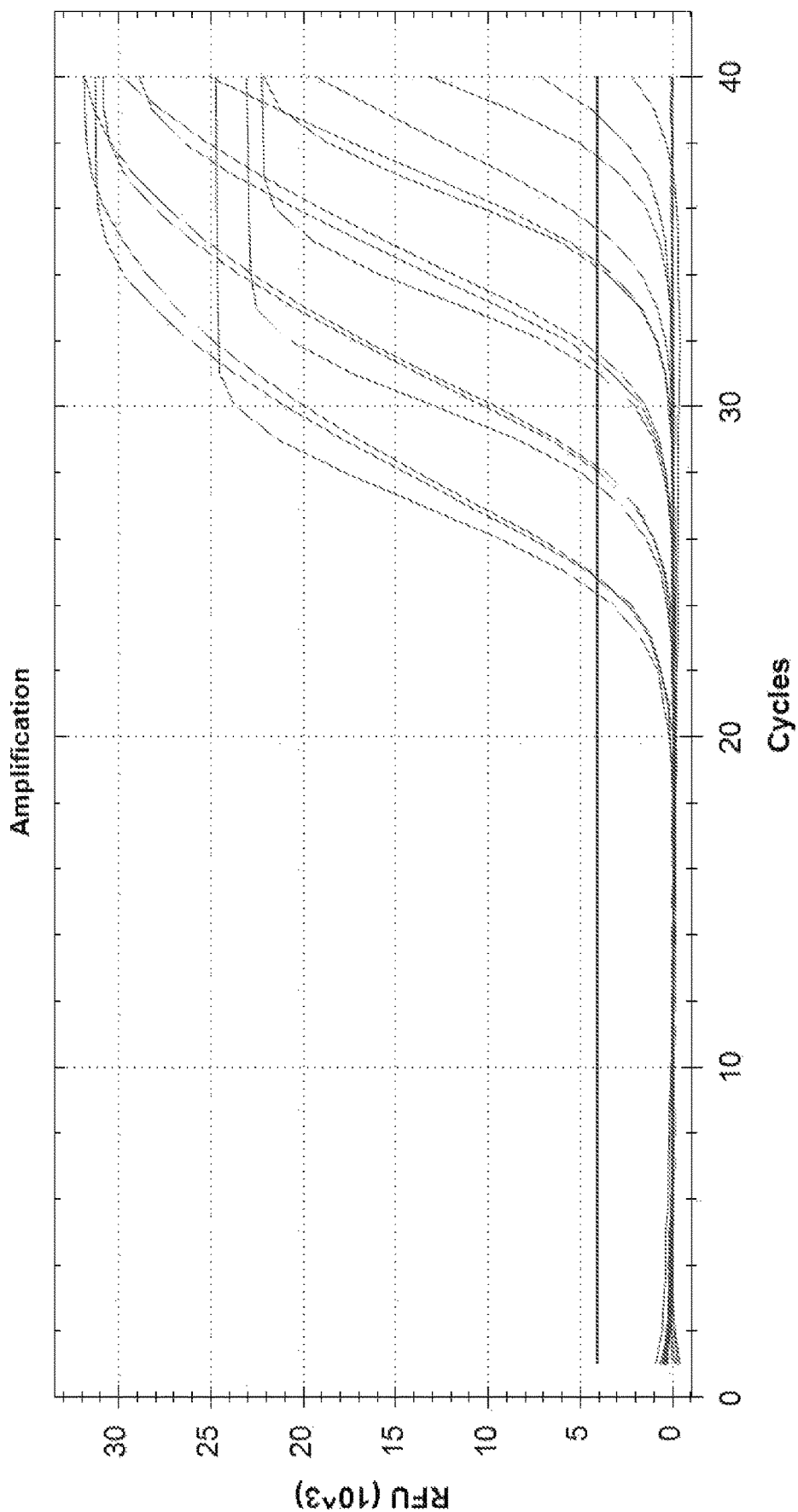
FIG. 32 shows an amplification curve of real-time fluorescence quantitative PCR on *Enterococcus faecium* in Example 5 of the present disclosure.
Figure 33:
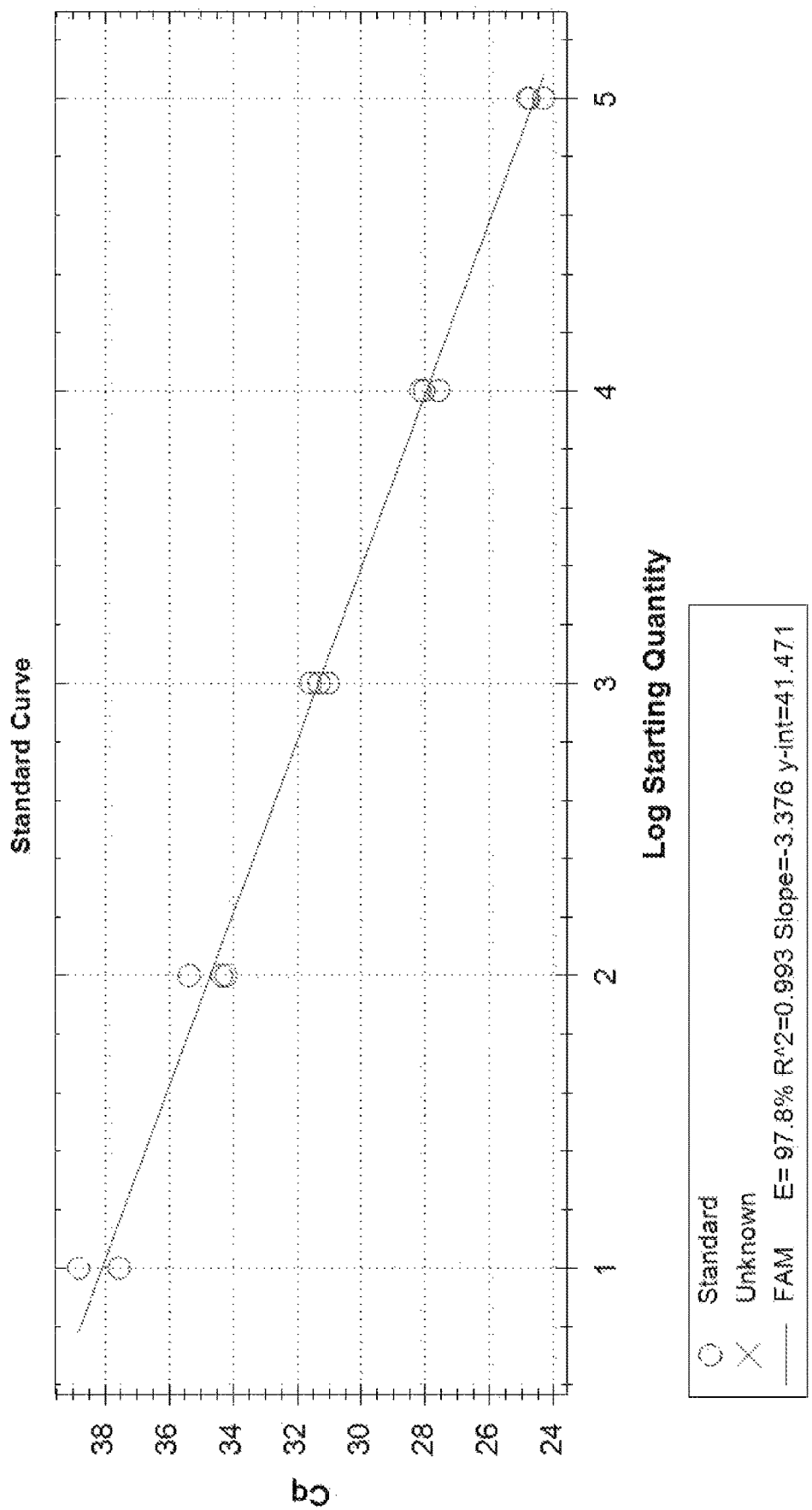
FIG. 33 shows a standard curve of real-time fluorescence quantitative PCR on the *Enterococcus faecium* in Example 5 of the present disclosure.
Figure 34:
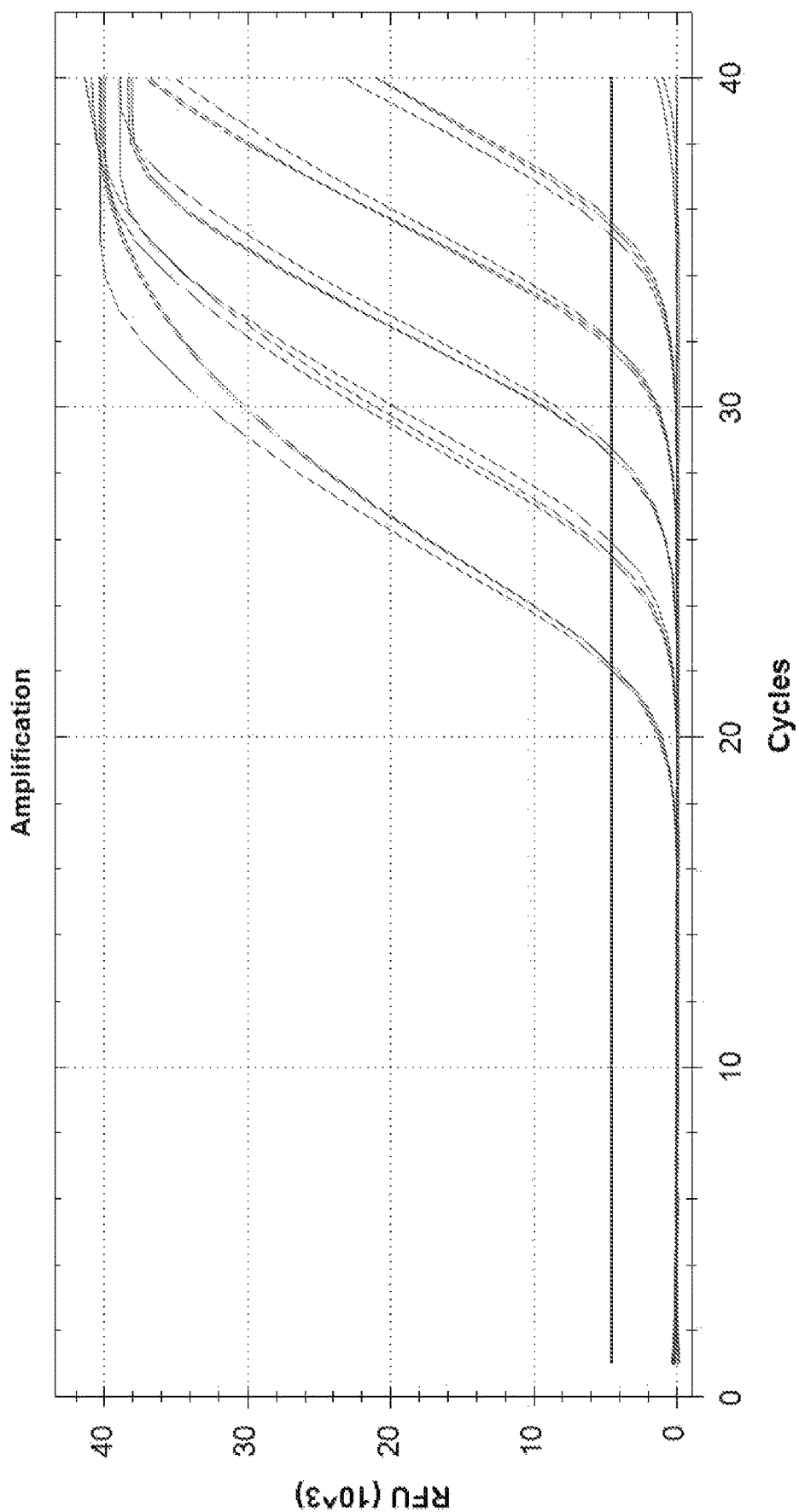
FIG. 34 shows an amplification curve of real-time fluorescence quantitative PCR on *Clostridium difficile* in Example 5 of the present disclosure.
Figure 35:
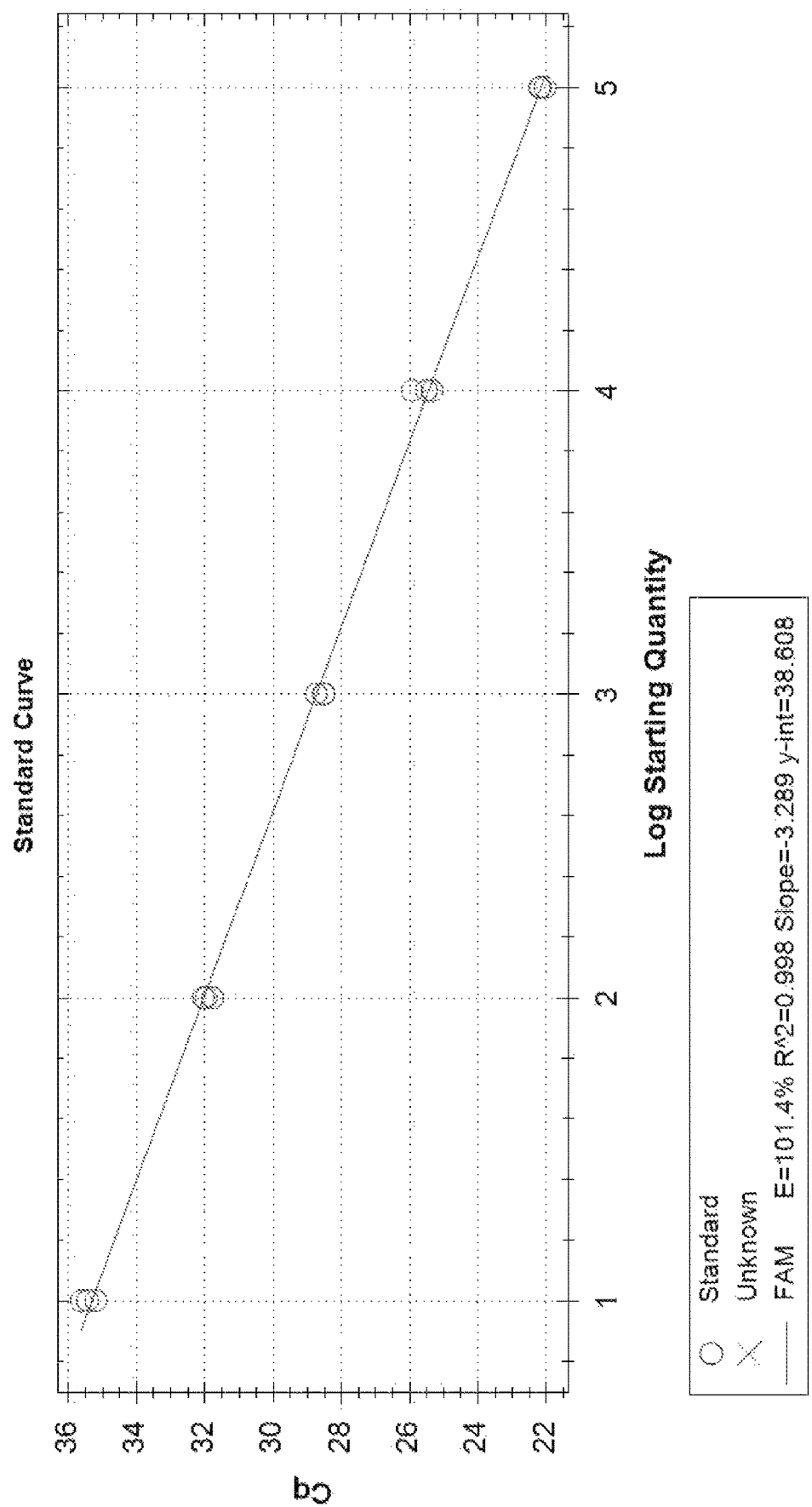
FIG. 35 shows a standard curve of real-time fluorescence quantitative PCR on the *Clostridium difficile* in Example 5 of the present disclosure.
Figure 36:
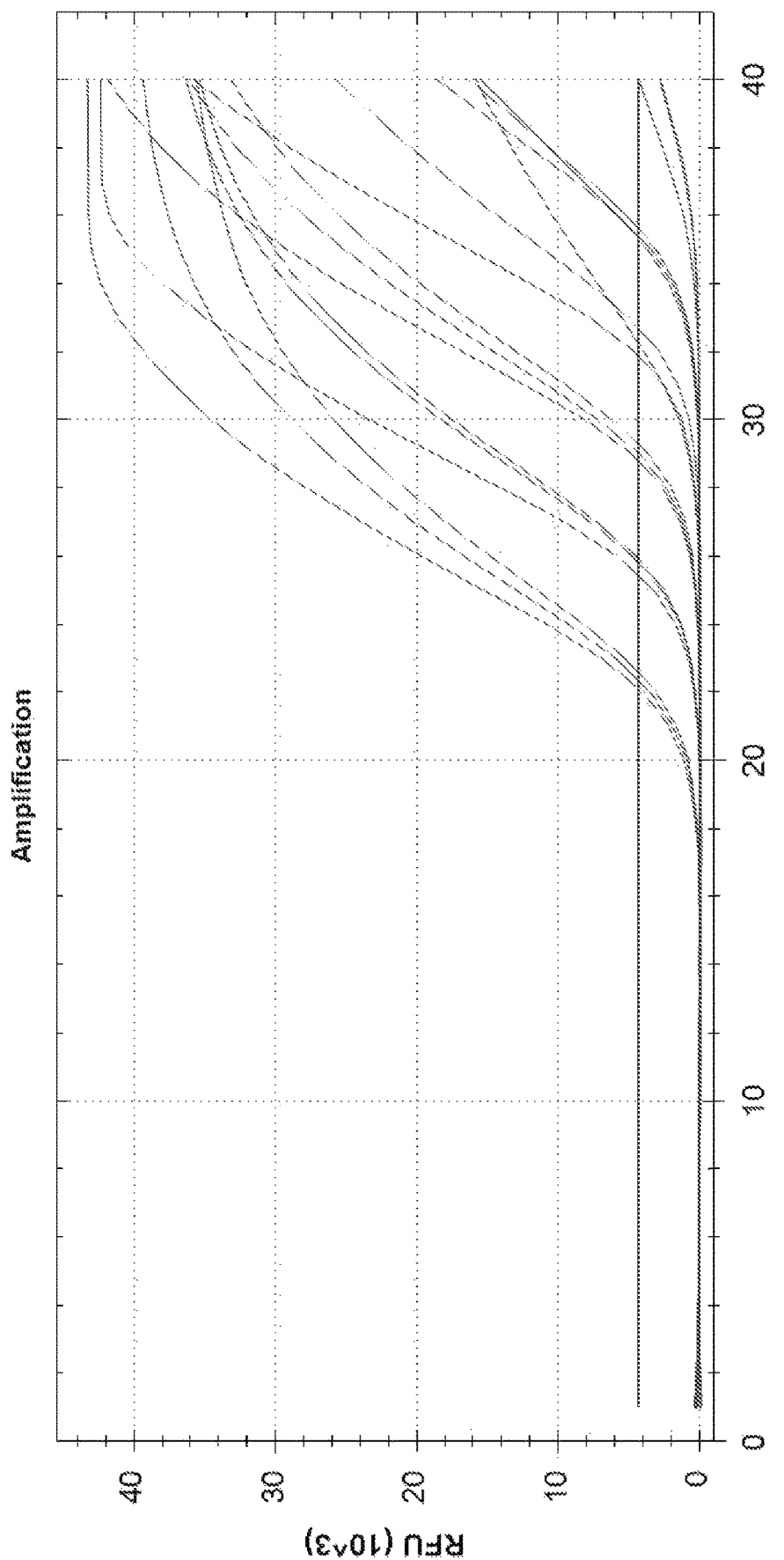
FIG. 36 shows an amplification curve of real-time fluorescence quantitative PCR on *Stenotrophomonas maltophilia* in Example 5 of the present disclosure.
Figure 37:
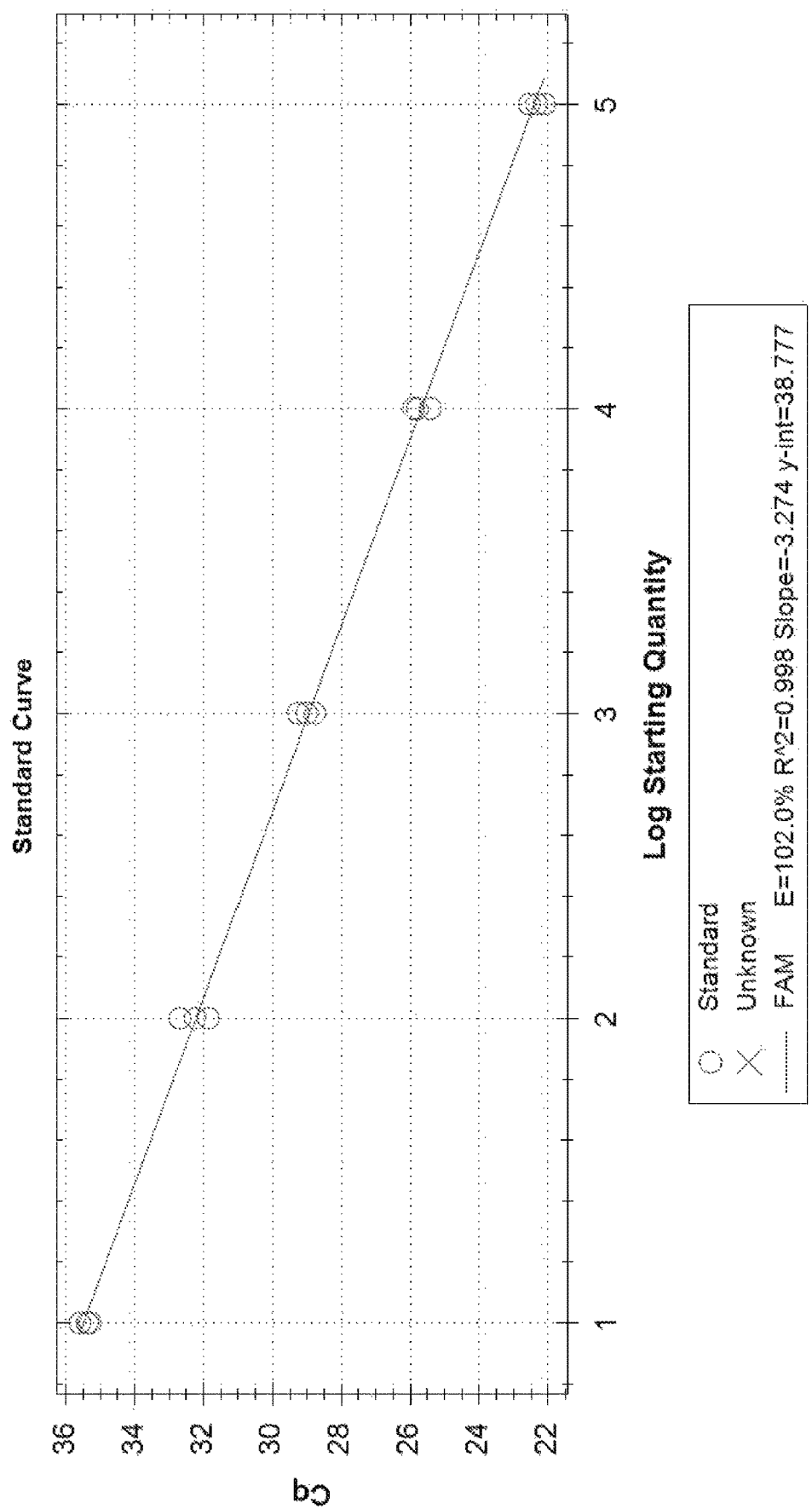
FIG. 37 shows a standard curve of real-time fluorescence quantitative PCR on the *Stenotrophomonas maltophilia* in Example 5 of the present disclosure.
Figure 38:
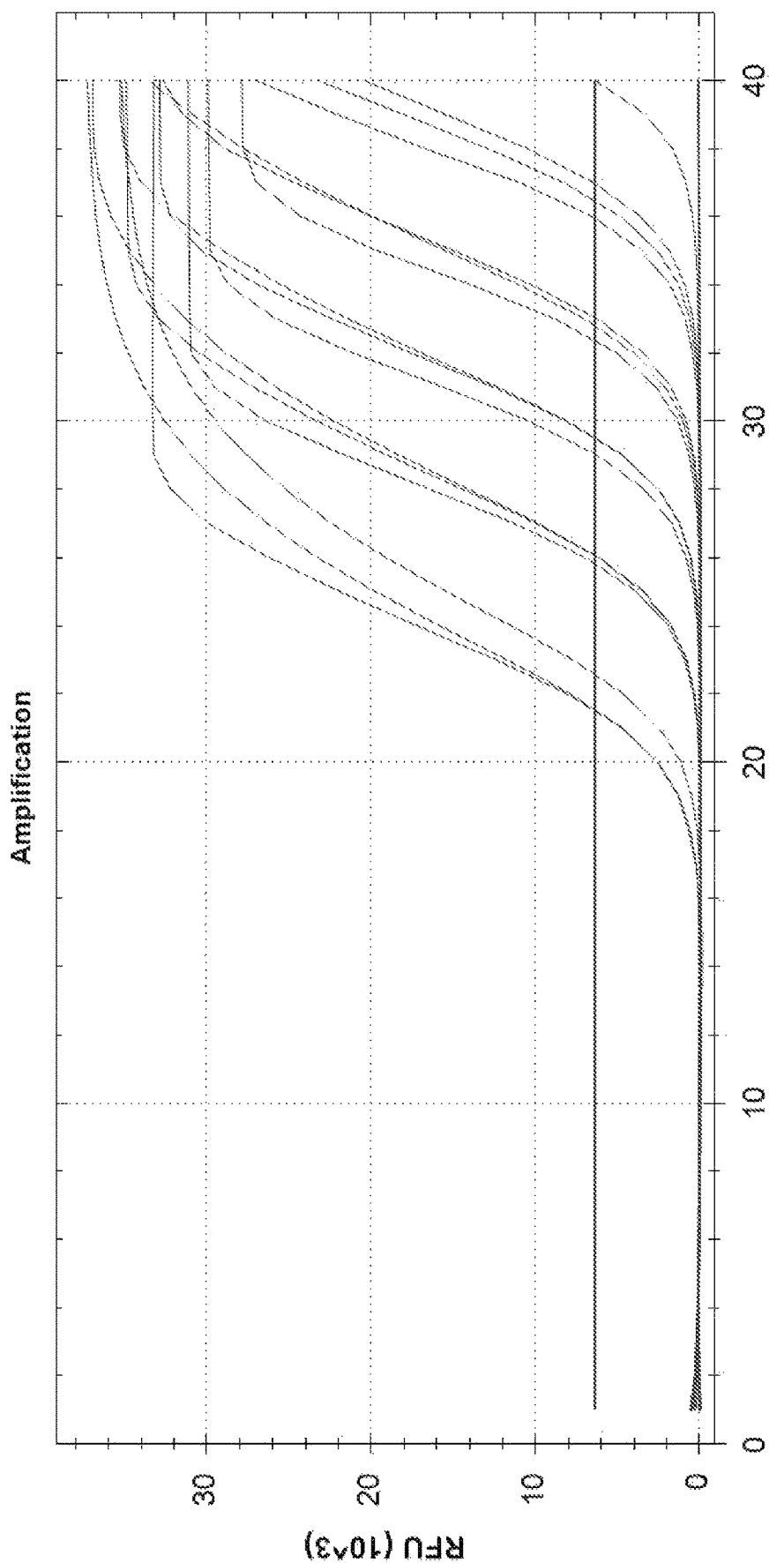
FIG. 38 shows an amplification curve of real-time fluorescence quantitative PCR on *Haemophilus influenzae* in Example 5 of the present disclosure.
Figure 39:
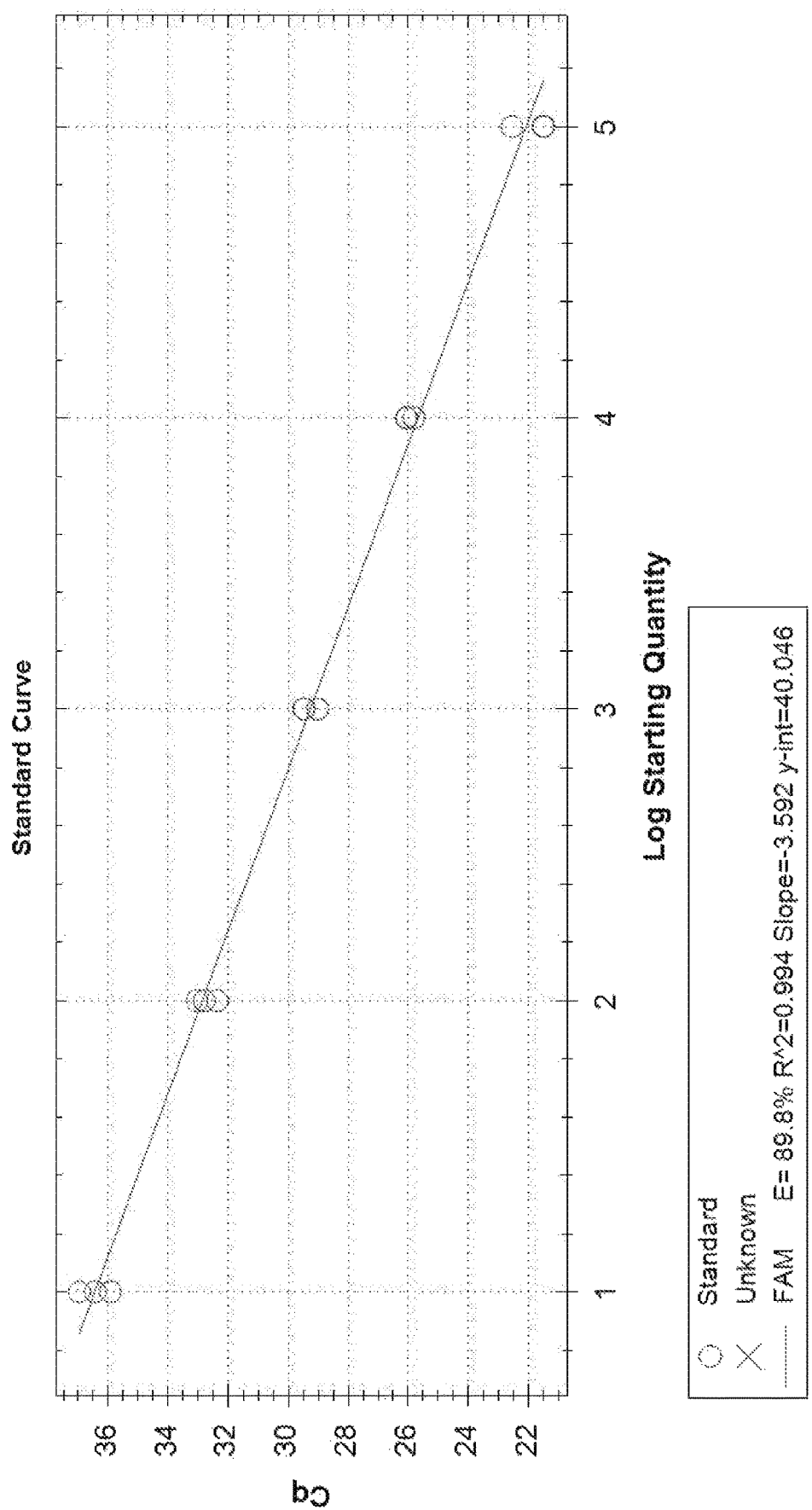
FIG. 39 shows a standard curve of real-time fluorescence quantitative PCR on the *Haemophilus influenzae* in Example 5 of the present disclosure.
Figure 40:
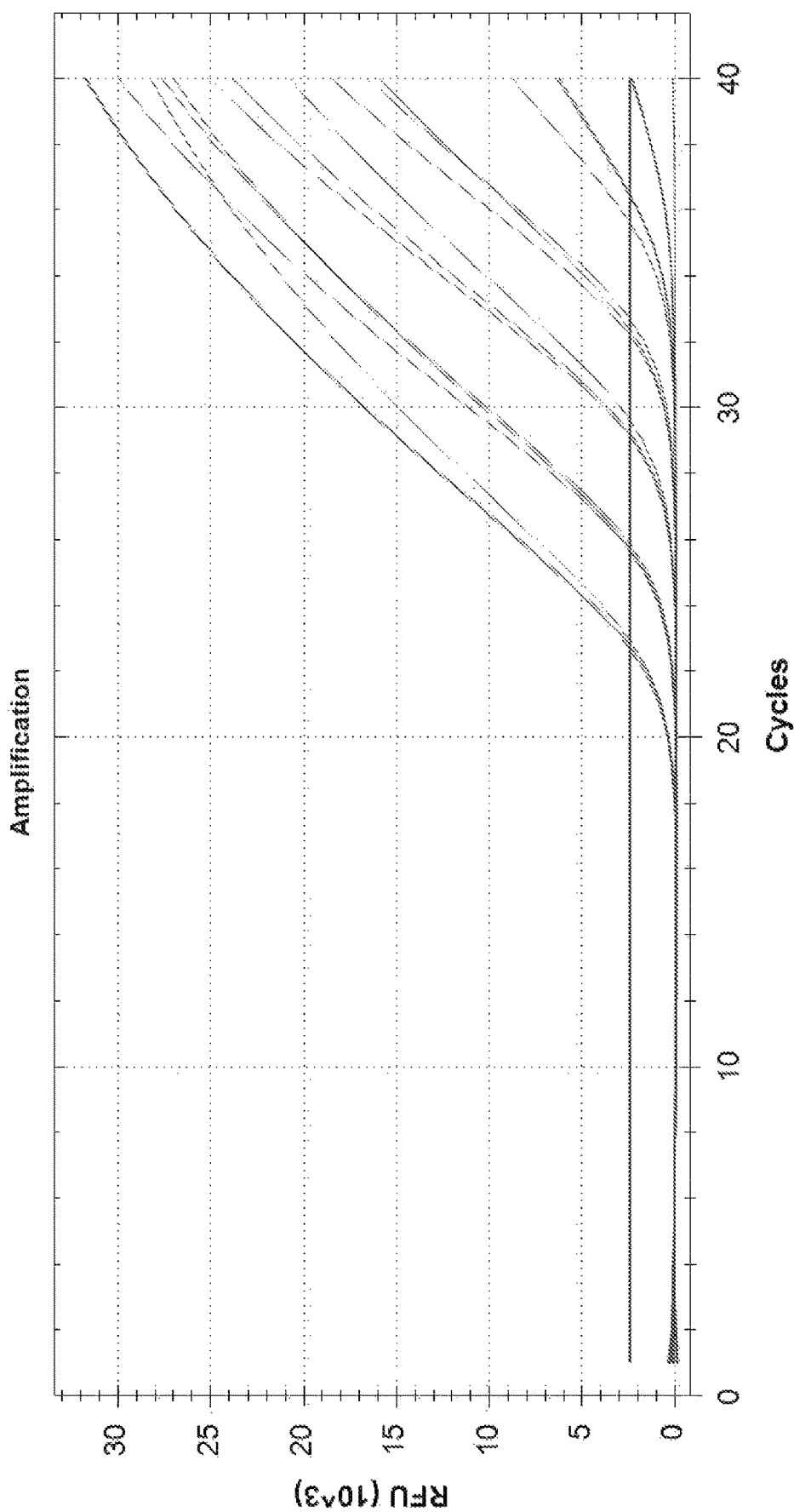
FIG. 40 shows an amplification curve of real-time fluorescence quantitative PCR on *Klebsiella pneumoniae* in Example 5 of the present disclosure.
Figure 41:
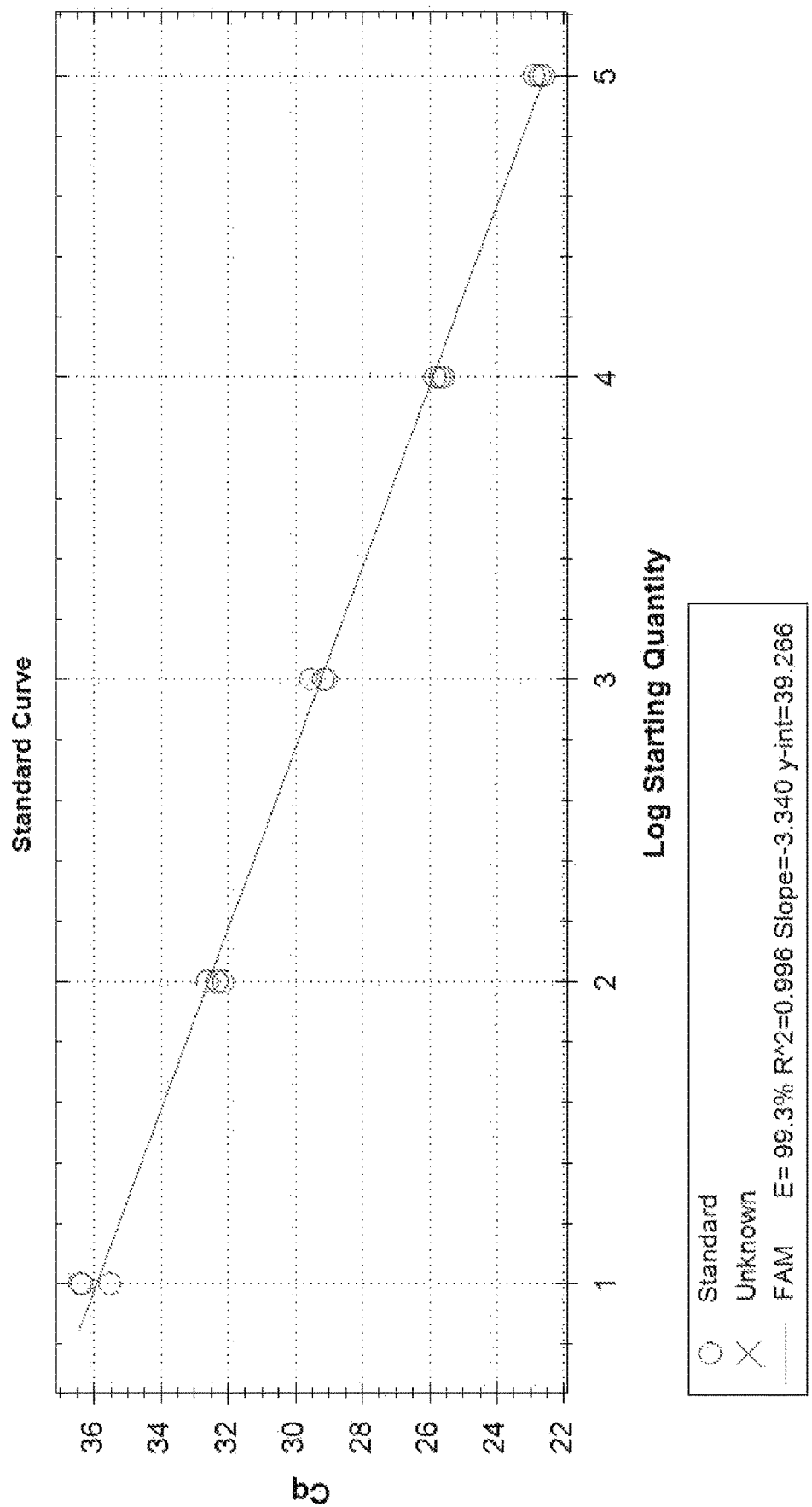
FIG. 41 shows a standard curve of real-time fluorescence quantitative PCR on the *Klebsiella pneumoniae* in Example 5 of the present disclosure.
Figure 42:
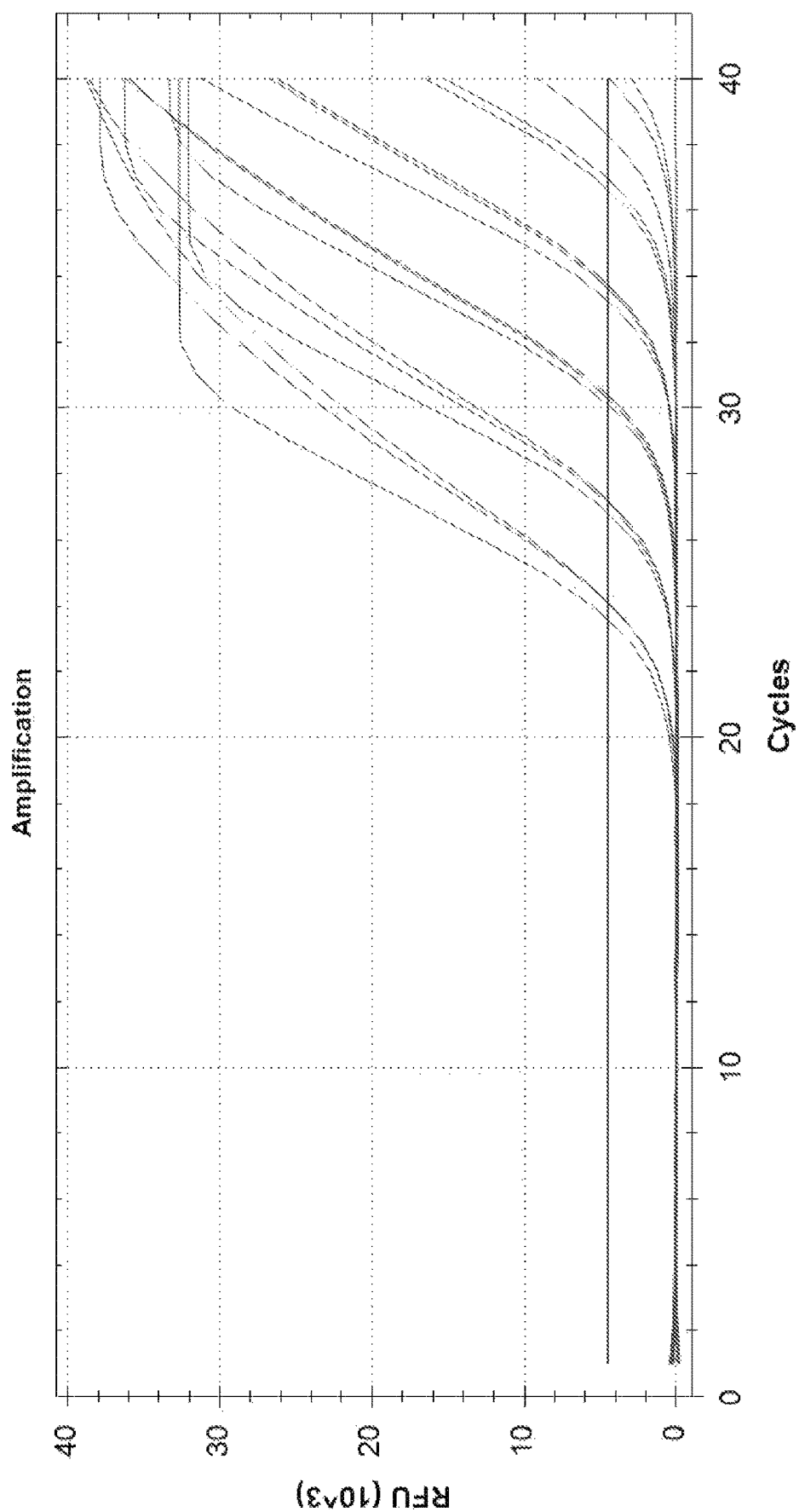
FIG. 42 shows an amplification curve of real-time fluorescence quantitative PCR on *Cryptococcus neoformans* in Example 5 of the present disclosure.
Figure 43:
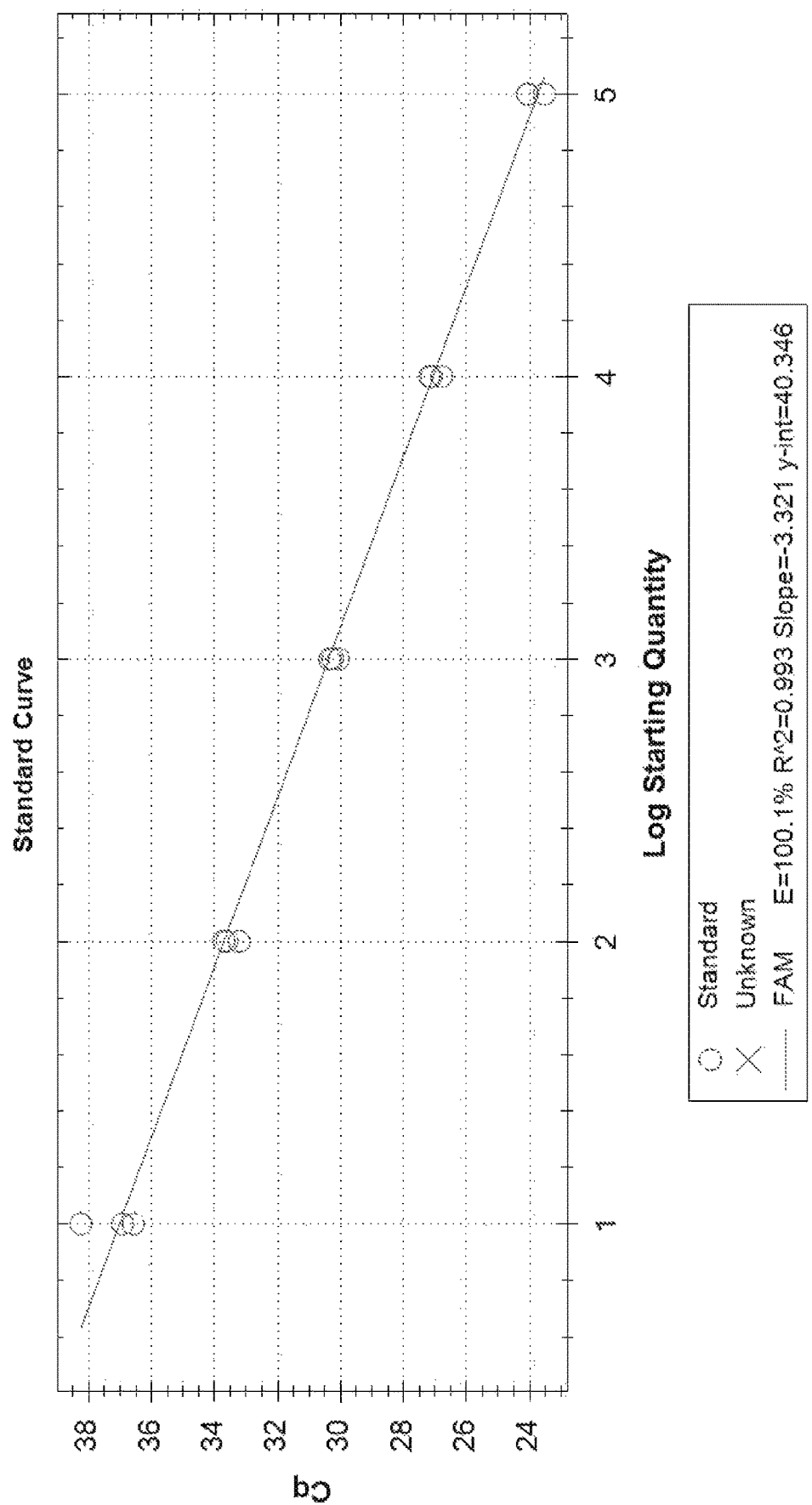
FIG. 43 shows a standard curve of real-time fluorescence quantitative PCR on the *Cryptococcus neoformans* in Example 5 of the present disclosure.
Figure 44:
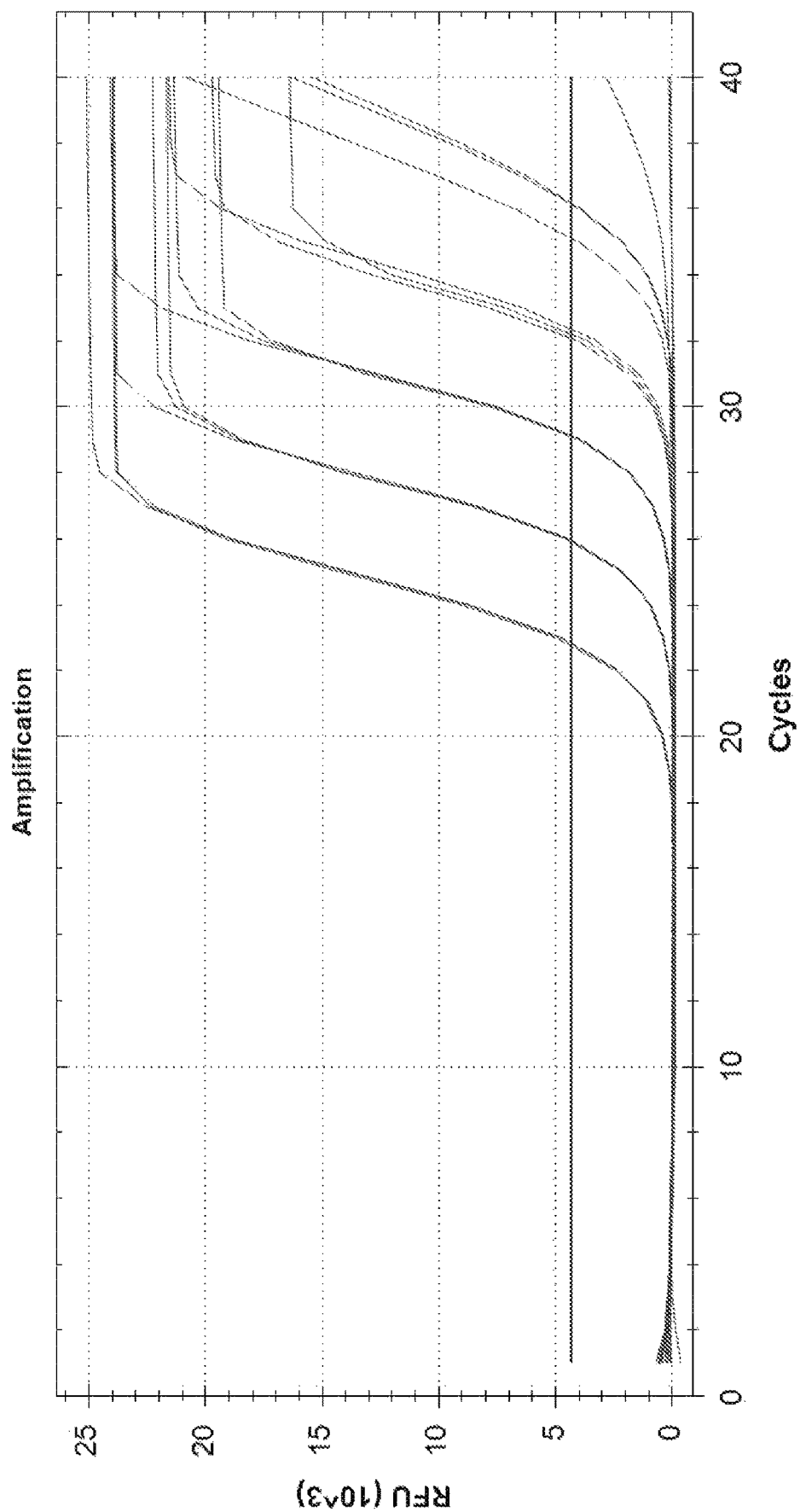
FIG. 44 shows an amplification curve of real-time fluorescence quantitative PCR on *Candida albicans* in Example 5 of the present disclosure.
Figure 45:
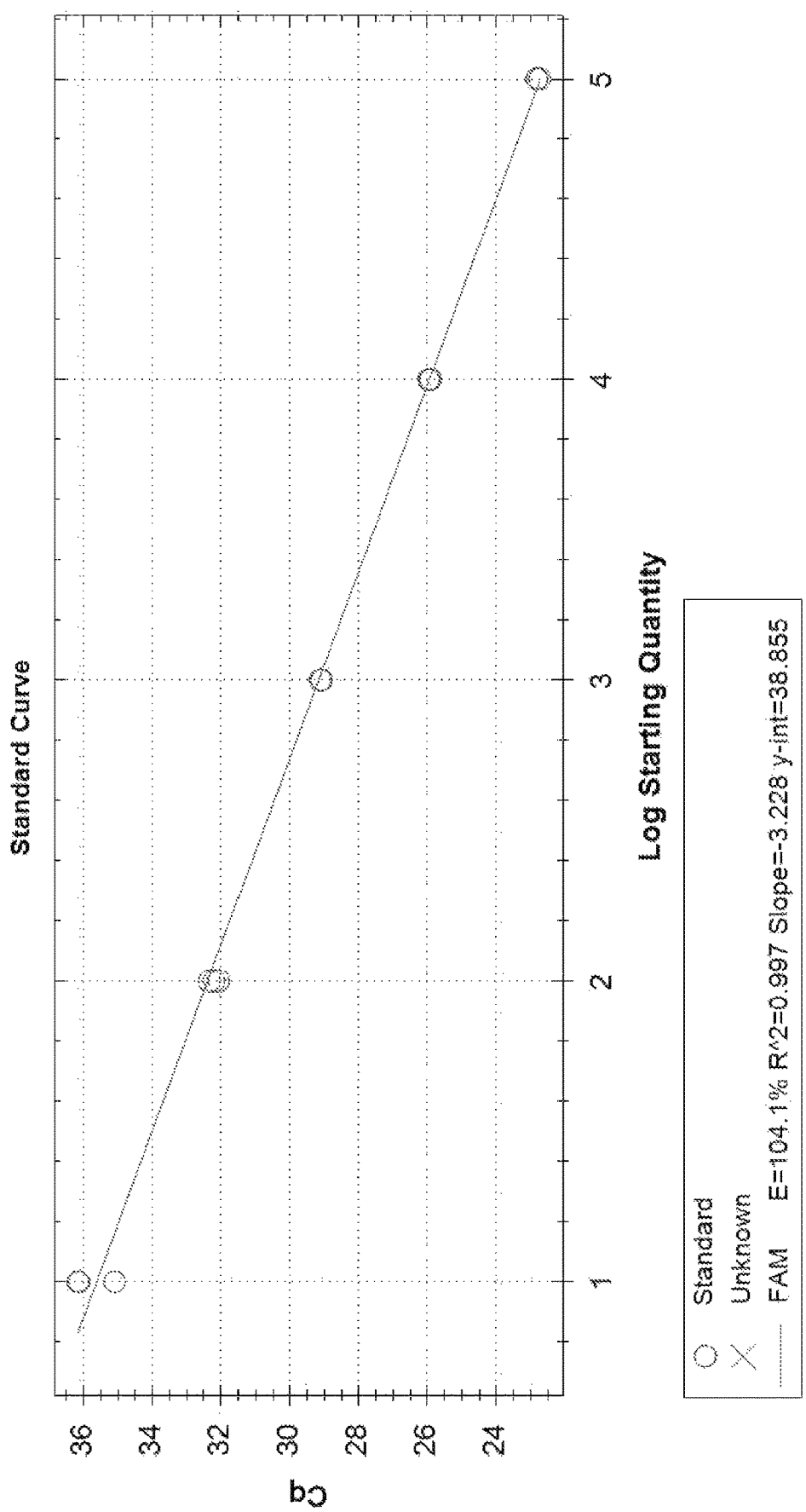
FIG. 45 shows a standard curve of real-time fluorescence quantitative PCR on the *Candida albicans* in Example 5 of the present disclosure.
Figure 46:
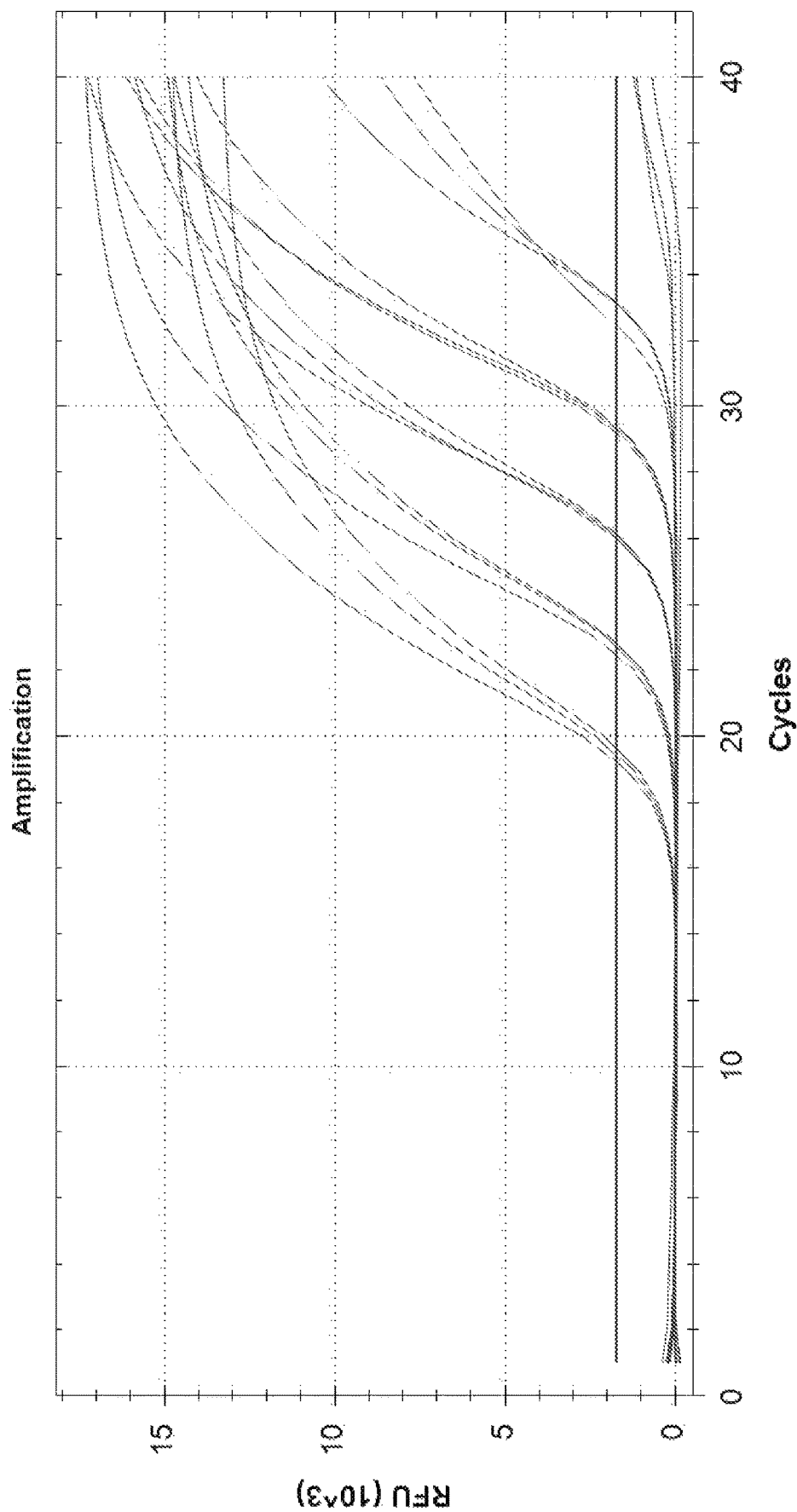
FIG. 46 shows an amplification curve of real-time fluorescence quantitative PCR on *Aspergillus fumigatus* in Example 5 of the present disclosure.
Figure 47:
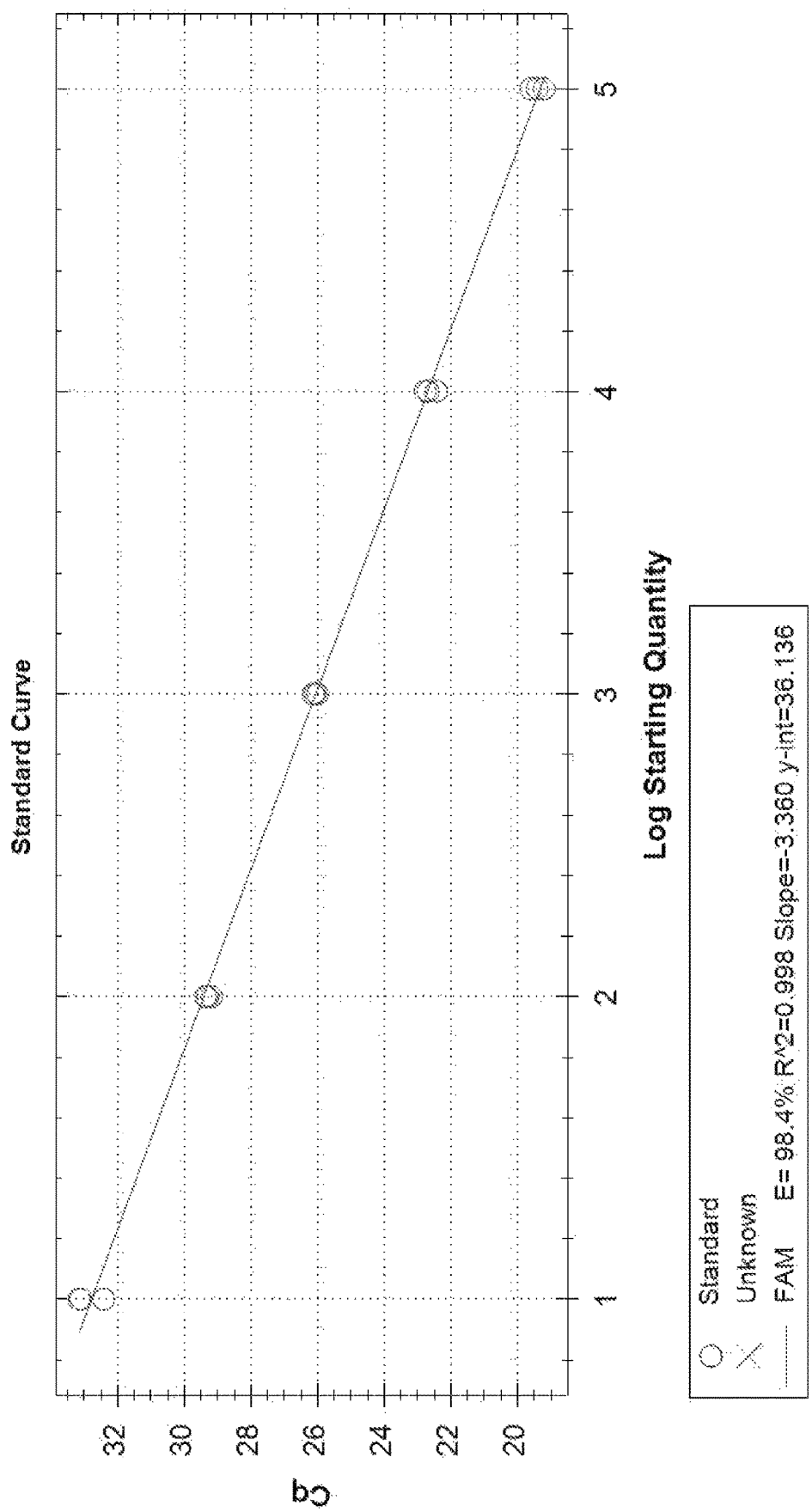
FIG. 47 shows a standard curve of real-time fluorescence quantitative PCR on the *Aspergillus fumigatus* in Example 5 of the present disclosure.

The technical solutions in the embodiments of the present disclosure are clearly and completely described below. Apparently, the described embodiments are merely some rather than all of the embodiments of the present disclosure. All other embodiments obtained by those of ordinary skill in the art based on the embodiments of the present disclosure without creative efforts should fall within the protection scope of the present disclosure.

In the following examples, each pathogen has a conserved sequences as follows:

(1) Adenovirus type B
(SEQ ID NO: 70)
ATTTGGGTCAACAAGCCATGCCTAACAGACCCAATTACATTGGATTCAGGGAT

AACTTTGTAGGCCTAATGTACTACAACAGTACTGGAAATATGGGAGTTTTGGCTGGCC

AAGCATCACAACTGAATGCAGTGGTTGACTTGCAGGACAGAAATACTGAACTGTCAT

A (2) Adenovirus type C
(SEQ ID NO: 71)
ATGGCTACCCCTTCGATGATGCCGCAGTGGTCTTACATGCACATCTCGGGCCA -continued

GGACGCCTCGGAGTACCTGAGCCCCGGGCTGGTGCAGTTTGCCCGCGCCACCGAGA

CGTACTTCAGCCTGAATAACAAGTTTAGAAACCCCACGGTGGC (3) VZV
(SEQ ID NO: 72)
CGCCTCTTGGCCTTGGAAACCACATGATCGTCTGCAACCCGGGCGTCCGCGA

CGGGTGTCTCCCTAATCTTGTCGAGGAGGCTTCTGCTCTCGACTGGCTGGGACTTGC

GCTTGCGCGGAGTTCGTAAACGATCATCCGGTGGACACACAGAAAGAGAGCGTGCG

GCGGCCGACGGCTGAGGGTCGGGAG (4) EB virus
(SEQ ID NO: 73)
CACGTAGAAAGGACTACCGAGGAAGGAAATTGGGTCGCCGGTGTGTTCGTA

TATGGAGGTAGTAAGACCTCCCTTTACAACCTCAGGCGAGGAATTGCCCTTGCTGTTC

CACAATGTCGTATTACACCATTGAGTCGTCTCCCCTTTGGAATGGCCCCTGGACCCGG

CCCA (5) Human herpes simplex virus type 1
(SEQ ID NO: 74)
GGAGGAAGAGGAGGAGGGGGCCGGGGATGGCGAACATCTTAAGGGGGGAG

ATGGGACCCGTGACACCCTACCCCAGTCCCCGGGTCCAGCCGTCCCGTTGGCCGGG

GATGACGAGAAGGACAAACCCAACCGTCCCGTAGTCCCACCCCCCGGTCCCAACAA

CTCCCCCGCGCGCCCCGAGACCAGTCGACCGAAGACACCCCCACCAGTATCGGGC

CGCTGGCAACTCGACCCACGACCCAACTCCCCTCAAAGGGGCGACCCTTGGTTCCG

ACGCCTCAACATACCCCGCTGTTCTC (6) CMV
(SEQ ID NO: 75)
AGCGTGACGTGCATAAAGAGCTTGCCGGAGGGCACGTCCTCGCAGAAGGAC

TCCAGGTACACCTTGACGTACTGGTCACCTATCACCTGCATCTTGGTTGCGCGCGTGT

TCTCCATGGAGCAAACCAGCTCGTGCGCGCACACCACGTGCCGCAGTGCCACGTCC

TTGGTGGGAAACACGAACGC (7) Human herpes virus type 6
(SEQ ID NO: 76)
TTATTTTGTCATGTCCTGTGTGTAAGCGTGTGGTAATGGACTAAGTGTGCGTT

ATTTTCTGTATTAATTTTTTGTTTCTGAAAATAAAATTGAATTGATAGTACTTACGTGTG

TATTGTAGCAGCTGGCGAAAAGTGCTGTGCTCTTTATATTTTGATGGTCGATTGTAATT

ACATTATCCAGGCATGTGATTGTCTTTTCTGGAAACATTCGGCGGCATT (8) *Staphylococcus aureus*
(SEQ ID NO: 77)
ATAAAATCGCGAATGAGCGTTTATTTAGTCGTGAAGAATATCGTGTGCCGACA

AAGATTGATCCGTATTACTTAAGTGATGACCATGCAATAAAATTAGGTGAACATTTAA

AACATCCATTTATTTTAAAACGTATCGTAGGACAATCTGGTATGAGTTATGGCGCTTTA

GGAAAAAATGCCATTACAGCTTTATCTAAAGGTCTAGCTAAAGCGGGCACTTGGATG

A (9) *Streptococcus pneumoniae*
(SEQ ID NO: 78)
AGAAGCGGAGCTTGTCGACAAATACAAGTGATATTTCTGTAACAGCTACCAA

CGACAGTCGCCTCTATCCTGGAGCACTTCTCGTAGTGGATGAGACCTTGTTAGAGAAT

AATCCCACTCTTCTTGCGGTCGATCGTGCTCCGATGACTTATAGTATTGATTTGCCTGG

-continued

TTTGGCAAGTAGCGATAGCTTTCTCCAAGTGGAAGACCCCAGCAATTCAAGTGTTCG

CGGAGCGGTAAACGATTTGTTGGCTAAGTG

(10) *Staphylococcus epidermidis*
(SEQ ID NO: 79)
TACTTTGAAGAAAGCGGTGCTTATACTGGAGAAACTTCACCAGTAGCATTAT

CTGAATTAGGTGTTAAATATGTAGTGATTGGTCACTCAGAGCGTCGTGACTATTTCCA

CGAAACTGACGAAGAAGTAAACAAAAAAGCGCATGCTATCTTCAATCACGGTATG

(11) *Pseudomonas aeruginosa*
(SEQ ID NO: 80)
GGTGAAGGTGCCAATGGCGGCGTCGACCCGAACGCAGGCTATGGCGCCAAC

AGCGGTGCCGTTGACGGCAGCCTGAGCGACGAAGCCGCTCTGCGTGCGATCACCAC

CTTCTACTTCGAGTACGACAGCTCCGACCTGAAGCCGGAAGCCATGCGCGCTCTGGA

CGTACACGCGAAAGACCTGAAAGGCAGCGGTCAGCGCGTAGTGCTGGAAGGCCAC

ACCGACGAACGCGGCACCCGCGAGTACAACATGGCTCTGGGCGAGCGTCGTGCCAA

GGCCGTTCAGCGCTACCTGGTGCTGCA

(12) *Acinetobacter baumannii*
(SEQ ID NO: 81)
CCATAAGGCAACCACCACAGAAGTATTTAAGTGGGATGGTAAAAAAAGGTTA

TTCCCAGAATGGGAAAAGGACATGACCCTAGGCGATGCCATGAAAGCTTCCGCTATT

CCAGTTTATCAAGATTTAGCTCGTCGTATTGGACTTGAGCTCATGTCTAAGGAAGTGA

AGCGTGTTGGTTATGGCAATGCAGATATCGGTACCCAAGTCGATAATTTTTGGCTGGT

GGGTCCTTTAAAAATTACTCC

(13) *Escherichia coli*
(SEQ ID NO: 82)
GTAAACTGGCTCGGATTAGGGCCGCAAGAAAACTATCCCGACCGCCTTACTG

CCGCCTGTTTTGACCGCTGGGATCTGCCATTGTCAGACATGTATACCCCGTACGTCTT

CCCGAGCGAAAACGGTCTGCGCTGCGGGACGCGCGAATTGAATTATGGCCCACACC

AGTGGCGCGGCGACTTCCAGTTCAATATCAGTCGCTACAGCCAACAACAACTGATGG

AAACCAGCCATCGCCATCTGCTGCACGCGGAAGAA

(14) *Mycobacterium tuberculosis* complex
(SEQ ID NO: 83)
CAGGTCGAGTACGCCTTCTTGTTGGCGGGTCCAGATGGCTTGCTCGATCGCG

TCGAGGACCATGGAGGTGGCCATCGTGGAAGCGACCCGCCAGCCCAGGATCCTGCG

AGCGTAGGCGTCGGTGACAAAGGCCACGTAGGCGAACCCTGCCCAGGTCGACACAT

AGGTGAGGTCTGCTACCCACAGCCGGTTAGGTGCTGGTGGTCCGAAGCGGCGCTGG

ACGAGATCGGCGGGACGGGCTGTGGCCGGATCAGCGATCGTGGTCCTGCGGGCTTT

GCCGCGGGTGGTCCCGGACAGGCCGAGTTTGGTCATCAGCCGTTCG

(15) *Enterococcus faecalis*
(SEQ ID NO: 84)
GTCGTCAGCTCGTGTCGTGAGATGTTGGGTTAAGTCCCGCAACGAGCGCAA

CCCTTATTGTTAGTTGCCATCATTTAGTTGGGCACTCTAGCGAGACTGCCGGTGACAA

ACCGGAGGAAGGTGGGGATGACGTCAAATCATCATGCCCCTTATGACCTGGGCTACA

CACGTGCTACAATGGGAAGTACAACGAGTCGCTAGACCGCGAGGTCATGCAAATCTC

TTAAAGCTTC

(16) *Enterococcus faecium*
(SEQ ID NO: 85)
ACAGATAACGACAAAATGGAAGCTGTTCTAGAAAACCCATATATCTTGATCA -continued

CAGACAAAAAAATCTCTAACATCCAAGATATTCTGCCATTGTTAGAACAAATCTTGCA

ACAATCACGTCCATTGTTGATTATTGCTGACGATGTAGATGGTGAAGCATTGCCAACT

CTTGTATTGAACAAAATCCGTGGAACATTCAACGTAGTAGCTGTAAAAGCTCCTGGTT

TCGGCGATCGTCGTAAAGCAATGCTTGAAGAT

(17) *Clostridium difficile*
(SEQ ID NO: 86)
ACTGGGAGACTTGAGTGCAGGAGAGGAGAGTGGAATTCCTAGTGTAGCGGT

GAAATGCGTAGATATTAGGAGGAACACCAGTTGCGAAGGCGGCTCTCTGGACTGTAA

CTGACGCTGAGGCACGAAAGCGTGGGGAGCAAACAGGATTAGATACCCTGGTAGTC

CACGCTGTAAACGATGAGTACTAGGTGTCGGGGGTTACCCCCTTCGGTGCCGCAGCT

AACGCATTAAGTACTCCGCCTGGGAAGTACGCTCGCAAGAGTGAAACTCAAAGGAA

TTGA

(18) *Stenotrophomonas maltophilia*
(SEQ ID NO: 87)
CAGTGAAGACGAGTAGGGCGGGGCACGTGAAACCCTGTCTGAACATGGGG

GGACCATCCTCCAAGGCTAAATACTACTGACCGACCGATAGTGAACCAGTACCGTGA

GGGAAAGGCGAAAAGAACCCCGGAGAGGGGAGTGAAATAGAACCTGAAACCGTGT

GCGTACAAGCAGTAGGAGCTC

(19) *Haemophilus influenzae*
(SEQ ID NO: 88)
ATGACATTACTGGTGAATACGTTCAAATCTTAGACGCACACGCTGCATATTTA

AATGCAACGCCAGCTGCTAAAGTATTAGTAGAAGGTAACACTGATGAACGTGGTACA

CCAGAATACAACATCGCATTAGGCCAACGTCGTGCAGATGCAGTTAAAGGTTATTTAG

CT

(20) *Klebsiella pneumoniae*
(SEQ ID NO: 89)
AACTCGCTGTGAAGATGCAGTGTACCCGCGGCAAGACGGAAAGACCCCGTG

AACCTTTACTATAGCTTGACACTGAACATTGAGCCTTGATGTGTAGGATAGGTGGGAG

GCTTTGAAGCGTGGACGCCAGTCTGCGTGGAGCCAACCTTGAAATACCACCCTTTAA

TGTTTGATGTTCTAACGTTGGCCCCTTACCGGGGTTGCGGACAGTGTCTGGTGGGTA

GTTTGACTGGGGCGGTCTCCTCCCAA

(21) *Cryptococcus neoformans*
(SEQ ID NO: 90)
ACGGTGTCCCTGGTATAACACAGGTAAGAATCCTTAGGAACCACAGGAATCG

GTCAACTTATAAACTGCATAGTGTCCTATTCCGCCTGGAAGCTCATTTACCTACCAATT

CACCGTAAGCCATCAATCAGGCACGTTTTGGTGGCATTCCCATTATTCCAATTCCATG

GCCGACGGCATTTGGGGCCCGTCAGTTTTCCTGACTTTTGATAACAAGTTATCACAGC

TGA

(22) *Candida albicans*
(SEQ ID NO: 91)
AAGGATCATTACTGATTTGCTTAATTGCACCACATGTGTTTTTCTTTGAAACA

AACTTGCTTTGGCGGTGGGCCCAGCCTGCCGCCAGAGGTCTAAACTTACAACCAATT

TTTTATCAACTTGTCACACCAGATTATTACTTAATAGTCAAAACTTTCAACAACGGATC

TCTTGGTTCTCGCATCGATGAAGAACGCAGCGAAATGCGATACGTAATATGAATTGC

(23) *Aspergillus fumigatus*
(SEQ ID NO: 92)
AGGAATCCAGTATATGAAATAATCCCTCTTATCCATTTTCCTCCTATTCTTTTTC

ATTTCCCTCATCACTGCAACTCTAATCCTCGGGCTCACCCTCCCTGTGTCTCCTCGAA

-continued

```
ATGGTGCCGATGCTATGGCTTACGGCCTACATGGCCGTTGCGGTGCTGACGGCAATCT

TGCTCAATGTTGTTTATCAATTATTCTTTCGGCTTTGGAACCGAACAGAACCGCCAAT

GGTCTTTC
```

Example 1

For 23 pathogens such as an adenovirus type B with a high infection rate and a high lethality rate after transplantation (as shown in FIG. 1), this example provided primer and probe sets for pathogen detection of infection in a transplant patient, including the following 23 primer and probe sets:

a 1st primer and probe set for detecting an adenovirus type B, where in an adenovirus type B Hexon target gene, sequences of an upstream primer, a downstream primer, and a probe were as follows:

the upstream primer: 5'-TCAGGGATAACTTTGTAGG-3' (SEQ ID NO: 1), the downstream primer: 5'-GACAGTTCAGTAT-TTCTGTC-3' (SEQ ID NO: 2), and the probe: 5'-TCAACCACTGCATTCAGTTGTGATG-3' (SEQ ID NO: 3), with a reporter group of FAM™ at a 5'-end and a quencher group of BHQ™-1 at a 3'-end;

a 2nd primer and probe set for detecting an adenovirus type C, where in an adenovirus type C Hexon target gene, sequences of an upstream primer, a downstream primer, and a probe were as follows:

the upstream primer: 5'-CAGTGGTCTTACATGCAC-3' (SEQ ID NO:4), the downstream primer: 5'-TGGGGTTTCTAAACTTGTTA-3' (SEQ ID NO: 5), and the probe: 5'-ACGCCTCGGAGTACCTGAGC-3' (SEQ ID NO: 6), with a reporter group of FAM™ at a 5'-end and a quencher group of BHQ™-1 at a 3'-end;

a 3rd primer and probe set for detecting a VZV, where in a VZV ORF62 target gene, sequences of an upstream primer, a downstream primer, and a probe were as follows:

the upstream primer: 5'-GGTGTCTCCCTAATCTTG-3' (SEQ ID NO: 7), the downstream primer: 5'-CTCTCTTTCTGTGTGTCC-3' (SEQ ID NO: 8), and the probe: 5'-AGGCTTCTGCTCTCGACTGG-3' (SEQ ID NO: 9), with a reporter group of FAM™ at a 5'-end and a quencher group of BHQ™-1 at a 3'-end;

a 4th primer and probe set for detecting an EB virus, where in an EB virus EBNA-1 target gene, sequences of an upstream primer, a downstream primer, and a probe were as follows:

the upstream primer: 5'-CTCCCTTTACAACCTCAG-3' (SEQ ID NO: 10), the downstream primer: 5'-GACGACT-CAATGGTGTAA-3' (SEQ ID NO: 11), and the probe: 5'-CCTTGCTGTTCCACAATGTCGT-3' (SEQ ID NO: 12), with a reporter group of FAM™ at a 5'-end and a quencher group of BHQ™-1 at a 3'-end;

a 5th primer and probe set for detecting a human herpes simplex virus type 1, where in a human herpes simplex virus type 1 US4 target gene, sequences of an upstream primer, a downstream primer, and a probe were as follows:

the upstream primer: 5'-GGATGGCGAACATCTTAA-3' (SEQ ID NO: 13), the downstream primer: 5'-GTTGGGTTTGTCCTTCTC-3' (SEQ ID NO: 14), and the probe: 5'-ATGGGACCCGTGACACCCTA-3' (SEQ ID NO: 15), with a reporter group of FAM™ at a 5'-end and a quencher group of BHQ™-1 at a 3'-end;

a 6th primer and probe set for detecting a CMV, where in a CMV UL83 target gene, sequences of an upstream primer, a downstream primer, and a probe were as follows:

the upstream primer: 5'-CGTGACGTGCATAAAGAG-3' (SEQ ID NO: 16), the downstream primer: 5'-GGTGA-TAGGTGACCAGTA-3' (SEQ ID NO: 17), and the probe: 5'-CTCGCAGAAGGACTCCAGGT-3' (SEQ ID NO: 18), with a reporter group of FAM™ at a 5'-end and a quencher group of BHQ™-1 at a 3'-end;

a 7th primer and probe set for detecting a human herpes virus type 6, where in a human herpes virus type 6 hypothetical protein target gene, sequences of an upstream primer, a downstream primer, and a probe were as follows:

the upstream primer: 5'-GTGTGGTAATGGACTAAG-3' (SEQ ID NO: 19), the downstream primer: 5'-CGACCAT-CAAAATATAAAGAG-3' (SEQ ID NO: 20), and the probe: 5'-AGCTGCTACAATACACACGTAAGTAC-3' (SEQ ID NO: 21), with a reporter group of FAM™ at a 5'-end and a quencher group of BHQ™-1 at a 3'-end;

an 8th primer and probe set for detecting *Staphylococcus aureus*, where in a *Staphylococcus aureus* target gene, sequences of an upstream primer, a downstream primer, and a probe were as follows:

the upstream primer: 5'-GCGAATGAGCGTTTATTTAG-3' (SEQ ID NO: 22), the downstream primer: 5'-GACCTTTAGA-TAAAGCTGTAATG-3' (SEQ ID NO: 23), and the probe: 5'-CGCCATAACTCATACCAGAT-TGTCCTA-3' (SEQ ID NO: 24), with a reporter group of FAM™ at a 5'-end and a quencher group of BHQ™-1 at a 3'-end;

a 9th primer and probe set for detecting *Streptococcus pneumoniae*, where in a *Streptococcus pneumoniae* Ply target gene, sequences of an upstream primer, a downstream primer, and a probe were as follows:

the upstream primer: 5'-CAGCTACCAACGACAGTC-3' (SEQ ID NO: 25), the downstream primer: 5'-CGCAAGAAGAGTGGGATTA-3' (SEQ ID NO: 26), and the probe: 5'-TCTCTAACAAGGTCTCATCCAC-TACGA-3' (SEQ ID NO: 27), with a reporter group of FAM™ at a 5'-end and a quencher group of BHQ™-1 at a 3'-end;

a 10th primer and probe set for detecting *Staphylococcus epidermidis*, where in a *Staphylococcus epidermidis* target gene, sequences of an upstream primer, a downstream primer, and a probe were as follows:

the upstream primer: 5'-CGGTGCTTATACTGGAGA-3' (SEQ ID NO: 28),
the downstream primer: 5'-TCGTCAGTTTCGTGGAAA-3' (SEQ ID NO: 29), and
the probe: 5'-ACGACGCTCTGAGTGACCAAT-3' (SEQ ID NO: 30), with a reporter group of FAM™ at a 5'-end and a quencher group of BHQ™-1 at a 3'-end;
an 11th primer and probe set for detecting *Pseudomonas aeruginosa*, where in a *Pseudomonas aeruginosa* pal target gene, sequences of an upstream primer, a downstream primer, and a probe were as follows:
the upstream primer: 5'-TCACCACCTTCTACTTCG-3' (SEQ ID NO: 31),
the downstream primer: 5'-CAGAGCCATGTTGTACTC-3' (SEQ ID NO: 32), and
the probe: 5'-ACGACAGCTCCGACCTGAAG-3' (SEQ ID NO: 33), with a reporter group of FAM™ at a 5'-end and a quencher group of BHQ™-1 at a 3'-end;
a 12th primer and probe set for detecting *Acinetobacter baumannii*, where in an *Acinetobacter baumannii* target gene, sequences of an upstream primer, a downstream primer, and a probe were as follows:
the upstream primer: 5'-TCCAGTTTATCAAGATTTAGC-3' (SEQ ID NO: 34),
the downstream primer: 5'-CTTGGGTACCGATATCTG-3' (SEQ ID NO: 35), and
the probe: 5'-CATAACCAACACGCTTCACTTCCTTAG-3' (SEQ ID NO: 36), with a reporter group of FAM™ at a 5'-end and a quencher group of BHQ™-1 at a 3'-end;
a 13th primer and probe set for detecting *Escherichia coli*, where in an *Escherichia coli* β-D-galactosidase target gene, sequences of an upstream primer, a downstream primer, and a probe were as follows:
the upstream primer: 5'-CCGCAAGAAAACTATCCC-3' (SEQ ID NO: 37),
the downstream primer: 5'-TAGCGACTGATATTGAACTG-3' (SEQ ID NO: 38), and
the probe: 5'-CCGCCTTACTGCCGCCTGTT-3' (SEQ ID NO: 39), with a reporter group of FAM™ at a 5'-end and a quencher group of BHQ™-1 at a 3'-end;
a 14th primer and probe set for detecting *Enterococcus faecalis*, where in an *Enterococcus faecalis* 16S rRNA target gene, sequences of an upstream primer, a downstream primer, and a probe were as follows:
the upstream primer: 5'-TGCCATCATTTAGTTGGG-3' (SEQ ID NO: 40), the downstream primer: 5'-GAAGCTTTTAAGAGATTTGCATG-3' (SEQ ID NO: 41), and
the probe: 5'-CGGTCTAGCGACTCGTTGTACTTC-3' (SEQ ID NO: 42), with a reporter group of FAM™ at a 5'-end and a quencher group of BHQ™-1 at a 3'-end;
a 15th primer and probe set for detecting a *Mycobacterium tuberculosis* complex, where in a *Mycobacterium tuberculosis* complex target gene, sequences of an upstream primer, a downstream primer, and a probe were as follows:
the upstream primer: 5'-GTCGAGTACGCCTTCTTG-3' (SEQ ID NO: 43),
the downstream primer: 5'-CACCTATGTGTCGACCTG-3' (SEQ ID NO: 44), and
the probe: 5'-CCTTTGTCACCGACGCCTACG-3' (SEQ ID NO: 45), with a reporter group of FAM™ at a 5'-end and a quencher group of BHQ™-1 at a 3'-end;
a 16th primer and probe set for detecting *Enterococcus faecium*, where in an *Enterococcus faecium* GroL target gene, sequences of an upstream primer, a downstream primer, and a probe were as follows:
the upstream primer: 5'-CATCCAAGATATTCTGCC-3' (SEQ ID NO: 46),
the downstream primer: 5'-CGGATTTTGTTCAATACAAG-3' (SEQ ID NO: 47), and
the probe: 5'-CACCATCTACATCGTCAGCAATAATCA-3' (SEQ ID NO: 48), with a reporter group of FAM™ at a 5'-end and a quencher group of BHQ™-1 at a 3'-end;
a 17th primer and probe set for detecting *Clostridium difficile*, where in a *Clostridium difficile* 16SRNA target gene, sequences of an upstream primer, a downstream primer, and a probe were as follows:
the upstream primer: 5'-GCGTAGATATTAGGAGGAA-3' (SEQ ID NO: 49),
the downstream primer: 5'-GGAGTACTTAATGCGTTAG-3' (SEQ ID NO: 50), and
the probe: 5'-TCTCTGGACTGTAACTGACGCTG-3' (SEQ ID NO: 51), with a reporter group of FAM™ at a 5'-end and a quencher group of BHQ™-1 at a 3'-end;
an 18th primer and probe set for detecting *Stenotrophomonas maltophilia*, where in a *Stenotrophomonas maltophilia* 23S rRNA target gene, sequences of an upstream primer, a downstream primer, and a probe were as follows:
the upstream primer: 5'-TCCTCCAAGGCTAAATAC-3' (SEQ ID NO: 52),
the downstream primer: 5'-CGGTTTCAGGTTCTATTTC-3' (SEQ ID NO: 53), and
the probe: 5'-TGACCGACCGATAGTGAACCAG-3' (SEQ ID NO: 54), with a reporter group of FAM™ at a 5'-end and a quencher group of BHQ™-1 at a 3'-end;
a 19th primer and probe set for detecting *Haemophilus influenzae*, where in a *Haemophilus influenzae* target gene, sequences of an upstream primer, a downstream primer, and a probe were as follows:
the upstream primer: 5'-CGTTCAAATCTTAGACGC-3' (SEQ ID NO: 55),
the downstream primer: 5'-CGATGTTGTATTCTGGTG-3' (SEQ ID NO: 56), and
the probe: 5'-CGTTCATCAGTGTTACCTTCTACTAAT-3' (SEQ ID NO: 57), with a reporter group of FAM™ at a 5'-end and a quencher group of BHQ™-1 at a 3'-end;
a 20th primer and probe set for detecting *Klebsiella pneumoniae*, where in a *Klebsiella pneumoniae* 23S rRNA target gene, sequences of an upstream primer, a downstream primer, and a probe were as follows:
the upstream primer: 5'-CCCGTGAACCTTTACTATA-3' (SEQ ID NO: 58),
the downstream primer: 5'-AAGGTGGTATTTCAAGG-3' (SEQ ID NO: 59), and
the probe: 5'-TGACACTGAACATTGAGCCTTGAT-3' (SEQ ID NO: 60), with a reporter group of FAM™ at a 5'-end and a quencher group of BHQ™-1 at a 3'-end;
a 21st primer and probe set for detecting *Cryptococcus neoformans*, where in a *Cryptococcus neoformans* LACI target gene, sequences of an upstream primer, a downstream primer, and a probe were as follows:
the upstream primer: 5'-CTGGAAGCTCATTTACCTA-3' (SEQ ID NO: 61),
the downstream primer: 5'-GGCCATGGAATTGGAATA-3' (SEQ ID NO: 62), and
the probe: 5'-ATTCACCGTAAGCCATCAATCAGG-3' (SEQ ID NO: 63), with a reporter group of FAM™ at a 5'-end and a quencher group of BHQ™-1 at a 3'-end;

a 22nd primer and probe set for detecting *Candida albicans*, where in a *Candida albicans* 18S rRNA target gene, sequences of an upstream primer, a downstream primer, and a probe were as follows:

the upstream primer: 5'-GAGGTCTAAACTTACAACC-3' (SEQ ID NO: 64), the downstream primer: 5'-CGTTGTT-GAAAGTTTTGAC-3' (SEQ ID NO: 65), and the probe: 5'-TCAACTTGTCACACCAGATTAT-TACTT-3' (SEQ ID NO: 66), with a reporter group of FAM™ at a 5'-end and a quencher group of BHQ™-1 at a 3'-end; and a 23rd primer and probe set for detecting *Aspergillus fumigatus*, where in an *Aspergillus fumigatus* Cyp51a target gene, sequences of an upstream primer, a downstream primer, and a probe were as follows:

the upstream primer: 5'-TCCCTCTTATCCATTTTCC-3' (SEQ ID NO: 67), the downstream primer: 5'-GTTC-CAAAGCCGAAAGAATA-3' (SEQ ID NO: 68), and the probe: 5'-CCTCATCACTGCAACTCTAATCCTCG-3' (SEQ ID NO: 69), with a reporter group of FAM™ at a 5'-end and a quencher group of BHQ™-1 at a 3'-end.

Example 2

This example provided a real-time fluorescence quantitative PCR kit for pathogen detection of infection in a transplant patient, including the primer and probe sets, a pathogen plasmid standard, a fluorescence quantitative PCR reaction solution, and sterile deionized water.

In a PCR amplification system, the primers and the probes for detecting the adenovirus type B, the VZV, the EB virus, the human herpes simplex virus type 1, the CMV, the human herpes virus type 6, the *Streptococcus pneumoniae*, the *Pseudomonas aeruginosa*, the *Escherichia coli*, the *Enterococcus faecalis*, and the *Klebsiella pneumoniae* had final concentrations of 0.9 μm and 0.25 μm, respectively.

In the PCR amplification system, the primers and the probes for detecting the adenovirus type C, the *Enterococcus faecium*, the *Staphylococcus aureus*, the *Staphylococcus epidermidis*, *Acinetobacter baumannii*, the *Mycobacterium tuberculosis* complex, the *Stenotrophomonas maltophilia*, the *Haemophilus influenzae*, the *Clostridium difficile*, the *Cryptococcus neoformans*, the *Candida albicans*, and the *Aspergillus fumigatus* had final concentrations of 3.6 μm and 0.25 μm, respectively.

The kit had a detection sample of blood.

Target genes in the pathogen plasmid standard included an adenovirus type B Hexon target gene, an adenovirus type C Hexon target gene, a VZV ORF62 target gene, an EB virus EBNA-1 target gene, a human herpes simplex virus type 1 US4 target gene, a CMV UL83 target gene, a human herpes virus type 6 hypothetical protein target gene, a *Staphylococcus aureus* target gene, a *Streptococcus pneumoniae* Ply target gene, a *Staphylococcus epidermidis* target gene, a *Pseudomonas aeruginosa* pal target gene, an *Acinetobacter baumannii* target gene, an *Escherichia coli* β-D-galactosidase target gene, an *Enterococcus faecalis* 16SrRNA target gene, a *Mycobacterium tuberculosis* complex target gene, an *Enterococcus faecium* GroL target gene, a *Clostridium difficile* 16SRNA target gene, a *Stenotrophomonas maltophilia* 23SrRNA target gene, a *Haemophilus influenzae* target gene, a *Klebsiella pneumoniae* 23SrRNA target gene, a *Cryptococcus neoformans* LACI target gene, a *Candida albicans* 18SrRNA target gene, and an *Aspergillus fumigatus* Cyp51a target gene.

The kit adopted a 96-well plate or a TAC microfluidic chip when conducting PCR.

Example 3

This example provided use of the 23 primer and probe sets in preparation of a kit for pathogen detection of infection in a transplant patient.

Example 4

Based on Example 2, in this example, pathogens infected by a transplant patient were detected using a real-time fluorescence quantitative PCR kit, thereby further illustrating the technical solution.

A method for using a kit for pathogen detection of infection in a transplant patient specifically included the following steps:

Y1: Extraction of a Sample DNA

The blood of a transplant patient to be tested as a sample was separated and purified, to obtain a template DNA, namely the sample DNA.

Y2: Preparation of a PCR System

A PCR amplification system was 15 μL, including an upstream primer, a downstream primer, a probe, a Master Mix, a 2× conc (purchased from Roche), and sterile deionized water, where the probes had a final concentration of 0.25 μm; the sterile deionized water was used a negative control, which was combined with the sample DNA, and other interferences were eliminated in an amplification reaction of the PCR system and other steps.

Y3: PCR Amplification Reaction reaction was conducted at 95° C. for 10 min for 1 cycle, at 95° C. for 15 sec for 40 cycles, and at 60° C. for 1 min.

Y4: an experimental result was determined in combination with an amplification curve.

Example 5

In this example, for primer and probe sets (23 sets of primers and probes) for pathogen detection of infection in a transplant patient, corresponding amplification kinetic curve acquisition and standard curve acquisition are conducted. The corresponding $R^2$, amplification efficiency and LOD were discussed to further illustrate this technical solution.

1. Construction of a Standard Plasmid

By searching a conserved sequence of each pathogen on NCBI, a standard plasmid (namely a pathogen marker standard) was synthesized for the conserved sequence of each pathogen, a concentration was determined, and the copy number was calculated; where The standard plasmid had a concentration of 4 ng/μL.

2. Real-Time Fluorescence Quantitative PCR

The pathogen marker standard was serially diluted from $10^5$ to $10^1$ times, and initial copy numbers corresponding to the standard at different concentrations were calculated; using different concentrations of pathogen marker standards as DNA templates, the real-time fluorescence quantitative PCR was conducted with the primer and probe sets, to obtain corresponding amplification kinetic curves (FIGS. 2, 4, 6, 8, 10, 12, 14, 16, 18, 20, 22, 24, 26, 28, 30, 32, 34, 36, 38, 40, 42, 44, and 46). Taking a logarithm of the initial copy numbers corresponding to the pathogen marker standards at different concentrations as an abscissa, and a cycle number threshold as an ordinate, standard curves were plotted (FIGS. 3, 5, 7, 9, 11, 13, 15, 17, 19, 21, 23, 25, 27, 29, 31, 33, 35, 37, 39, 41, 43, 45 and 47), to obtain corresponding standard curve equations; where each plasmid was dissolved with 1 mL of ddH$_2$O, with a copy number of $10^9$ copies/μL; $10^9$ copies/μL was diluted to $10^5$ copies/μL, $10^4$ copies/μL, $10^3$ copies/μL, $10^2$ copies/μL, and $10^1$ copies/μL; and a real-time fluorescence quantitative PCR system was shown in Table 1:

TABLE 1

| PCR system | |
| --- | --- |
| Component | Volume (μL) |
| PCR reaction mix (Master Mix, 2× conc) | 10 |
| Probe (25 μm) | 0.2 |
| Upstream primer (90 μM) | 0.2 |
| Downstream primer (90 μM) | 0.2 |
| Sterile deionized water | 4.4 |
| Total volume | 15 |

5 μL of each pathogen marker standard (DNA template) was used; and

The conditions of real-time fluorescence quantitative PCR were shown in Table 2:

TABLE 2

| PCR conditions | | |
| --- | --- | --- |
| Number of cycles | Reaction temperature (° C.) | Retention time |
| 1 | 95 | 10 min |
| 40 | 95 | 15 sec |
| | 60 | 1 min |

3. Statistical Analysis of Results

Combined with the results for each pathogen (Table 3), $R^2$, amplification efficiency and LOD were calculated. It can be seen that the standard synthesized by PCR amplification primers provided by this technical solution has a desirable $R^2$ value and amplification efficiency of the prepared standard curves, and a minimum LOD is as low as $10^1$ copies, which can better detect pathogens.

TABLE 3

| Results for 23 pathogens | | | |
| --- | --- | --- | --- |
| Target pathogen | Linear R$^2$ efficiency | LOD (Copies/μL) | Ct value |
| ADV-B | 0.999 | $10^1$ | 34.08 |
| ADV-C | 0.995 | $10^1$ | 35.35 |
| E. faecalis | 0.994 | $10^1$ | 36.40 |
| M. tuberculosis | 0.997 | $10^1$ | 37.94 |
| HSV-1 | 0.999 | $10^1$ | 38.34 |
| C. difficile | 0.998 | $10^1$ | 35.43 |
| S. maltophilia | 0.998 | $10^1$ | 35.43 |
| P. aeruginosa | 0.998 | $10^1$ | 34.87 |
| E. coil | 0.999 | $10^1$ | 36.75 |
| HHV-3 | 0.998 | $10^1$ | 34.58 |
| HHV-4 | 0.999 | $10^1$ | 35.39 |
| HHV-5 | 0.996 | $10^1$ | 36.46 |
| S. aureus | 0.997 | $10^1$ | 36.68 |
| C. neoformant | 0.993 | $10^1$ | 37.26 |
| A. fumigatus | 0.998 | $10^1$ | 32.89 |
| S. epidermidis | 0.998 | $10^1$ | 35.77 |
| C. albicans | 0.997 | $10^1$ | 35.80 |
| HHV-6 | 0.999 | $10^1$ | 35.07 |

TABLE 3-continued

| Results for 23 pathogens | | | |
| --- | --- | --- | --- |
| Target pathogen | Linear R$^2$ efficiency | LOD (Copies/μL) | Ct value |
| A. baumannii | 0.997 | $10^1$ | 35.75 |
| K. pneumoniae | 0.996 | $10^1$ | 36.12 |
| H. influenzae | 0.994 | $10^1$ | 36.44 |
| E. faecium | 0.993 | $10^1$ | 38.19 |
| S. pneumoniae | 0.999 | $10^1$ | 36.08 |

Example 6

Based on Example 2, in this example, corresponding discussions were made for a final concentration of primers and a final concentration of probes in the real-time fluorescence quantitative PCR kit, thereby further illustrating the technical solution.

*Staphylococcus aureus* was taken as an example.

1) The final concentrations of primers and probes were 0.9 μm and 0.25 μm, respectively. CT value results corresponding to each concentration were shown in Table 1:

TABLE 1

| Concentration (Copies/μL) | $10^5$ | $10^4$ | $10^3$ | $10^2$ | $10^1$ |
| --- | --- | --- | --- | --- | --- |
| CT value | 29.42 | 34.69 | 36.85 | NA | NA |

2) The final concentrations of primers and probes were 1.8 μm and 0.25 μm, respectively. CT value results corresponding to each concentration were shown in Table 2:

TABLE 2

| Concentration (Copies/μL) | $10^5$ | $10^4$ | $10^3$ | $10^2$ | $10^1$ |
| --- | --- | --- | --- | --- | --- |
| CT value | 27.93 | 29.65 | 34.69 | 37.45 | NA |

3) The final concentrations of primers and probes were 2.7 μm and 0.25 μm, respectively. CT value results corresponding to each concentration were shown in Table 3:

TABLE 3

| Concentration (Copies/μL) | $10^5$ | $10^4$ | $10^3$ | $10^2$ | $10^1$ |
| --- | --- | --- | --- | --- | --- |
| CT value | 26.64 | 28.89 | 32.09 | 36.43 | NA |

4) The final concentrations of primers and probes were 3.6 μm and 0.25 μm, respectively. CT value results corresponding to each concentration were shown in Table 4:

TABLE 4

| Concentration (Copies/μL) | $10^5$ | $10^4$ | $10^3$ | $10^2$ | $10^1$ |
| --- | --- | --- | --- | --- | --- |
| CT value | 23.43 | 27.36 | 29.00 | 32.85 | 37.59 |

5) The final concentrations of primers and probes were 4.5 μm and 0.25 μm, respectively. CT value results corresponding to each concentration were shown in Table 5:

TABLE 5

| Concentration (Copies/μL) | $10^5$ | $10^4$ | $10^3$ | $10^2$ | $10^1$ |
| --- | --- | --- | --- | --- | --- |
| CT value | 23.49 | 27.45 | 29.22 | 33.02 | 36.99 |

As can be seen from *Staphylococcus aureus*, 2-fold and 3-fold increase in primer concentration does not have a desirable effect. When concentrations are increased to 4 times, that is, when final concentrations of the primer and the probe are 3.6 µm and 0.25 µm, respectively, the LOD can reach 10^1, and the CT value of each concentration can also achieve a desirable detection effect. However, when the primer concentration is increased, the CT value hardly changes.

Similarly, when the primers and the probes for detecting the adenovirus type C, the *Enterococcus faecium*, the *Staphylococcus aureus*, the *Staphylococcus epidermidis*, *Acinetobacter baumannii*, the *Mycobacterium tuberculosis* complex, the *Stenotrophomonas maltophilia*, the *Haemophilus influenzae*, the *Clostridium difficile*, the *Cryptococcus neoformans*, the *Candida albicans*, and the *Aspergillus fumigatus* have final concentrations of 3.6 µm and 0.25 µm, respectively, there is an optimal detection effect.

Meanwhile, when the primers and the probes for detecting the adenovirus type B, the VZV, the EB virus, the human herpes simplex virus type 1, the CMV, the human herpes virus type 6, the *Streptococcus pneumoniae*, the *Pseudomonas aeruginosa*, the *Escherichia coli*, the *Enterococcus faecalis*, and the *Klebsiella pneumoniae* have final concentrations of 0.9 µm and 0.25 µm, respectively, there is an optimal detection effect.

Therefore, the primers and the probes for detecting the adenovirus type B, the VZV, the EB virus, the human herpes simplex virus type 1, the CMV, the human herpes virus type 6, the *Streptococcus pneumoniae*, the *Pseudomonas aeruginosa*, the *Escherichia coli*, the *Enterococcus faecalis*, and the *Klebsiella pneumoniae* have final concentrations of 0.9 µm and 0.25 µm, respectively; and the primers and the probes for detecting the adenovirus type C, the *Enterococcus faecium*, the *Staphylococcus aureus*, the *Staphylococcus epidermidis*, *Acinetobacter baumannii*, the *Mycobacterium tuberculosis* complex, the *Stenotrophomonas maltophilia*, the *Haemophilus influenzae*, the *Clostridium difficile*, the *Cryptococcus neoformans*, the *Candida albicans*, and the *Aspergillus fumigatus* have final concentrations of 3.6 µm and 0.25 µm, respectively.

The foregoing are merely descriptions of the preferred embodiments of the present disclosure. It should be noted that various variations and modifications can be made by those skilled in the art without departing from the concept of the 23 primer and probe sets, and these shall fall within the protection scope of the present disclosure.

---

What is claimed is:

1. Primer and probe sets for pathogen detection of infection in a transplant patient, comprising the following 23 primer and probe sets, with each probe having a reporter group at a 5' end and a quencher group at a 3' end:

a 1st primer and probe set for detecting an adenovirus type B, wherein sequences of an upstream primer, a downstream primer, and a probe are as follows:

the upstream primer: 5'-TCAGGGATAACTTTGTAGG-3' (SEQ ID NO: 1),
the downstream primer: 5'-GACAGTTCAGTATTTCTGTC-3' (SEQ ID NO: 2), and
the probe: 5'-TCAACCACTGCATTCAGTTGTGATG-3' (SEQ ID NO: 3);

a 2nd primer and probe set for detecting an adenovirus type C, wherein sequences of an upstream primer, a downstream primer, and a probe are as follows:

the upstream primer: 5'-CAGTGGTCTTACATGCAC-3' (SEQ ID NO: 4),
the downstream primer: 5'-TGGGGTTTCTAAACTTGTTA-3' (SEQ ID NO: 5), and the probe: 5'-ACGCCTCGGAGTACCT-GAGC-3' (SEQ ID NO: 6);
a 3rd primer and probe set for detecting a varicella-zoster virus (VZV), wherein sequences of an upstream primer, a downstream primer, and a probe are as follows:
the upstream primer: 5'-GGTGTCTCCCTAATCTTG-3' (SEQ ID NO: 7),
the downstream primer: 5'-CTCTCTTTCTGTGTGTCC-3' (SEQ ID NO: 8), and
the probe: 5'-AGGCTTCTGCTCTCGACTGG-3' (SEQ ID NO: 9);
a 4th primer and probe set for detecting an Epstein-Barr virus (EB virus), wherein sequences of an upstream primer, a downstream primer, and a probe are as follows:
the upstream primer: 5'-CTCCCTTTACAACCTCAG-3' (SEQ ID NO: 10),
the downstream primer: 5'-GACGACT-CAATGGTGTAA-3' (SEQ ID NO: 11), and
the probe: 5'-CCTTGCTGTTCCACAATGTCGT-3' (SEQ ID NO: 12);
a 5th primer and probe set for detecting a human herpes simplex virus type 1, wherein sequences of an upstream primer, a downstream primer, and a probe are as follows:
the upstream primer: 5'-GGATGGCGAACATCTTAA-3' (SEQ ID NO: 13),
the downstream primer: 5'-GTTGGGTTTGTCCTTCTC-3' (SEQ ID NO: 14), and
the probe: 5'-ATGGGACCCGTGACACCCTA-3' (SEQ ID NO: 15);
a 6th primer and probe set for detecting a cytomegalovirus (CMV), wherein sequences of an upstream primer, a downstream primer, and a probe are as follows:
the upstream primer: 5'-CGTGACGTGCATAAAGAG-3' (SEQ ID NO: 16),
the downstream primer: 5'-GGTGA-TAGGTGACCAGTA-3' (SEQ ID NO: 17), and
the probe: 5'-CTCGCAGAAGGACTCCAGGT-3' (SEQ ID NO: 18);
a 7th primer and probe set for detecting a human herpes virus type 6, wherein sequences of an upstream primer, a downstream primer, and a probe are as follows:
the upstream primer: 5'-GTGTGGTAATGGACTAAG-3' (SEQ ID NO: 19),
the downstream primer: 5'-CGACCAT-CAAAATATAAAGAG-3' (SEQ ID NO: 20), and
the probe: 5'-AGCTGCTACAATACACACGTAAGTAC-3' (SEQ ID NO: 21);
an 8th primer and probe set for detecting Staphylococcus aureus, wherein sequences of an upstream primer, a downstream primer, and a probe are as follows:
the upstream primer: 5'-GCGAATGAGCGTTTATTTAG-3' (SEQ ID NO: 22),
the downstream primer: 5'-GACCTTTAGA-TAAAGCTGTAATG-3' (SEQ ID NO: 23), and
the probe: 5'-CGCCATAACTCATACCAGAT-TGTCCTA-3' (SEQ ID NO: 24);
a 9th primer and probe set for detecting Streptococcus pneumoniae, wherein sequences of an upstream primer, a downstream primer, and a probe are as follows:
the upstream primer: 5'-CAGCTACCAACGACAGTC-3' (SEQ ID NO: 25), the downstream primer: 5'-CGCAAGAAGAGTGG-GATTA-3' (SEQ ID NO: 26), and
the probe: 5'-TCTCTAACAAGGTCTCATCCAC-TACGA-3' (SEQ ID NO: 27);
a 10th primer and probe set for detecting Staphylococcus epidermidis, wherein sequences of an upstream primer, a downstream primer, and a probe are as follows:
the upstream primer: 5'-CGGTGCTTATACTGGAGA-3' (SEQ ID NO: 28),
the downstream primer: 5'-TCGTCAGTTTCGTG-GAAA-3' (SEQ ID NO: 29), and
the probe: 5'-ACGACGCTCTGAGTGACCAAT-3' (SEQ ID NO: 30);
an 11th primer and probe set for detecting Pseudomonas aeruginosa, wherein sequences of an upstream primer, a downstream primer, and a probe are as follows:
the upstream primer: 5'-TCACCACCTTCTACTTCG-3' (SEQ ID NO: 31),
the downstream primer: 5'-CAGAGCCATGTTGTACTC-3' (SEQ ID NO: 32), and
the probe: 5'-ACGACAGCTCCGACCTGAAG-3' (SEQ ID NO: 33);
a 12th primer and probe set for detecting Acinetobacter baumannii, wherein sequences of an upstream primer, a downstream primer, and a probe are as follows:
the upstream primer: 5'-TCCAGTTTATCAAGATT-TAGC-3' (SEQ ID NO: 34),
the downstream primer: 5'-CTTGGGTACCGATATCTG-3' (SEQ ID NO: 35), and
the probe: 5'-CATAACCAACACGCTTCACTTCCT-TAG-3' (SEQ ID NO: 36);
a 13th primer and probe set for detecting Escherichia coli, wherein sequences of an upstream primer, a downstream primer, and a probe are as follows:
the upstream primer: 5'-CCGCAAGAAAACTATCCC-3' (SEQ ID NO: 37),
the downstream primer: 5'-TAGCGACTGATATT-GAACTG-3' (SEQ ID NO: 38), and
the probe: 5'-CCGCCTTACTGCCGCCTGTT-3' (SEQ ID NO: 39);
a 14th primer and probe set for detecting Enterococcus faecalis, wherein sequences of an upstream primer, a downstream primer, and a probe are as follows:
the upstream primer: 5'-TGCCATCATTTAGTTGGG-3' (SEQ ID NO: 40),
the downstream primer: 5'-GAAGCTTTTAAGAGAT-TTGCATG-3' (SEQ ID NO: 41), and
the probe: 5'-CGGTCTAGCGACTCGTTGTACTTC-3' (SEQ ID NO: 42);
a 15th primer and probe set for detecting a Mycobacterium tuberculosis complex, wherein sequences of an upstream primer, a downstream primer, and a probe are as follows:
the upstream primer: 5'-GTCGAGTACGCCTTCTTG-3' (SEQ ID NO: 43),
the downstream primer: 5'-CACCTATGTGTCGACCTG-3' (SEQ ID NO: 44), and
the probe: 5'-CCTTTGTCACCGACGCCTACG-3' (SEQ ID NO: 45);
a 16th primer and probe set for detecting Enterococcus faecium, wherein sequences of an upstream primer, a downstream primer, and a probe are as follows:
the upstream primer: 5'-CATCCAAGATATTCTGCC-3' (SEQ ID NO: 46),
the downstream primer: 5'-CGGATTTTGTTCAATA-CAAG-3' (SEQ ID NO: 47), and the probe: 5'-CACCATCTA-CATCGTCAGCAATAATCA-3' (SEQ ID NO: 48);

a 17th primer and probe set for detecting *Clostridium difficile*, wherein sequences of an upstream primer, a downstream primer, and a probe are as follows:
the upstream primer: 5'-GCGTAGATATTAGGAGGAA-3' (SEQ ID NO: 49),
the downstream primer: 5'-GGAGTACTTAATGCGT-TAG-3' (SEQ ID NO: 50), and
the probe: 5'-TCTCTGGACTGTAACTGACGCTG-3' (SEQ ID NO: 51);

an 18th primer and probe set for detecting *Stenotrophomonas maltophilia*, wherein sequences of an upstream primer, a downstream primer, and a probe are as follows:
the upstream primer: 5'-TCCTCCAAGGCTAAATAC-3' (SEQ ID NO: 52),
the downstream primer: 5'-CGGTTTCAGGTTCTAT-TTC-3' (SEQ ID NO: 53), and
the probe: 5'-TGACCGACCGATAGTGAACCAG-3' (SEQ ID NO: 54);

a 19th primer and probe set for detecting *Haemophilus influenzae*, wherein sequences of an upstream primer, a downstream primer, and a probe are as follows:
the upstream primer: 5'-CGTTCAAATCTTAGACGC-3' (SEQ ID NO: 55),
the downstream primer: 5'-CGATGTTGTATTCTGGTG-3' (SEQ ID NO: 56), and
the probe: 5'-CGTTCATCAGTGTTACCTTCTACTAAT-3' (SEQ ID NO: 57);

a 20th primer and probe set for detecting *Klebsiella pneumoniae*, wherein sequences of an upstream primer, a downstream primer, and a probe are as follows:
the upstream primer: 5'-CCCGTGAACCTTTACTATA-3' (SEQ ID NO: 58),
the downstream primer: 5'-AAGGTGGTATTTCAAGG-3' (SEQ ID NO: 59), and
the probe: 5'-TGACACTGAACATTGAGCCTTGAT-3' (SEQ ID NO: 60);

a 21st primer and probe set for detecting *Cryptococcus neoformans*, wherein sequences of an upstream primer, a downstream primer, and a probe are as follows:
the upstream primer: 5'-CTGGAAGCTCATTTACCTA-3' (SEQ ID NO: 61),
the downstream primer: 5'-GGCCATGGAATTG-GAATA-3' (SEQ ID NO: 62), and
the probe: 5'-ATTCACCGTAAGCCATCAATCAGG-3' (SEQ ID NO: 63);

a 22nd primer and probe set for detecting *Candida albicans*, wherein sequences of an upstream primer, a downstream primer, and a probe are as follows:
the upstream primer: 5'-GAGGTCTAAACTTACAACC-3' (SEQ ID NO: 64),
the downstream primer: 5'-CGTTGTT-GAAAGTTTTGAC-3' (SEQ ID NO: 65), and
the probe: 5'-TCAACTTGTCACACCAGATTAT-TACTT-3' (SEQ ID NO: 66); and a 23rd primer and probe set for detecting *Aspergillus fumigatus*, wherein sequences of an upstream primer, a downstream primer, and a probe are as follows:
the upstream primer: 5'-TCCCTCTTATCCATTTTCC-3' (SEQ ID NO: 67),
the downstream primer: 5'-GTTC-CAAAGCCGAAAGAATA-3' (SEQ ID NO: 68), and
the probe: 5'-CCTCATCACTGCAACTCTAATCCTCG-3' (SEQ ID NO: 69).

2. A real-time fluorescence quantitative PCR kit for pathogen detection of infection in a transplant patient, comprising the 23 primer and probe sets of the pathogens according to claim 1, a pathogen plasmid standard, a fluorescence quantitative PCR reaction solution, and sterile deionized water.

3. The real-time fluorescence quantitative PCR kit for pathogen detection of infection in a transplant patient according to claim 2, wherein in a PCR amplification system, the primers and the probes for detecting the adenovirus type B, the VZV, the EB virus, the human herpes simplex virus type 1, the CMV, the human herpes virus type 6, the *Streptococcus pneumoniae*, the *Pseudomonas aeruginosa*, the *Escherichia coli*, the *Enterococcus faecalis*, and the *Klebsiella pneumoniae* have final concentrations of 0.9 µm and 0.25 µm, respectively.

4. The real-time fluorescence quantitative PCR kit for pathogen detection of infection in a transplant patient according to claim 2, wherein in the PCR amplification system, the primers and the probes for detecting the adenovirus type C, the *Enterococcus faecium*, the *Staphylococcus aureus*, the *Staphylococcus epidermidis*, *Acinetobacter baumannii*, the *Mycobacterium tuberculosis* complex, the *Stenotrophomonas maltophilia*, the *Haemophilus influenzae*, the *Clostridium difficile*, the *Cryptococcus neoformans*, the *Candida albicans*, and the *Aspergillus fumigatus* have final concentrations of 3.6 µm and 0.25 µm, respectively.

5. The real-time fluorescence quantitative PCR kit for pathogen detection of infection in a transplant patient according to claim 3, wherein in the PCR amplification system, the primers and the probes for detecting the adenovirus type C, the *Enterococcus faecium*, the *Staphylococcus aureus*, the *Staphylococcus epidermidis*, *Acinetobacter baumannii*, the *Mycobacterium tuberculosis* complex, the *Stenotrophomonas maltophilia*, the *Haemophilus influenzae*, the *Clostridium difficile*, the *Cryptococcus neoformans*, the *Candida albicans*, and the *Aspergillus fumigatus* have final concentrations of 3.6 µm and 0.25 µm, respectively.

6. The real-time fluorescence quantitative PCR kit for pathogen detection of infection in a transplant patient according to claim 2, wherein the kit has a detection sample of blood.

7. The real-time fluorescence quantitative PCR kit for pathogen detection of infection in a transplant patient according to claim 2, wherein the kit comprises a 96-well plate or a TAC microfluidic chip.

8. A method for detecting a pathogen in a transplant patient, comprising:
contacting the primer and probe sets according to claim 1 with a nucleic acid sample obtained from the transplant patient, and
performing fluorescence quantitative PCR to detect the presence or absence of the pathogen.

* * * * *

SEQUENCE LISTING

```
Sequence total quantity: 92
SEQ ID NO: 1            moltype = DNA  length = 19
FEATURE                 Location/Qualifiers
source                  1..19
                        mol_type = other DNA
                        note = Upstream primer of the 1st primer and probe set
                        organism = synthetic construct
SEQUENCE: 1
tcagggataa ctttgtagg                                                  19

SEQ ID NO: 2            moltype = DNA  length = 20
FEATURE                 Location/Qualifiers
source                  1..20
                        mol_type = other DNA
                        note = Downstream primer of the 1st primer and probe set
                        organism = synthetic construct
SEQUENCE: 2
gacagttcag tatttctgtc                                                 20

SEQ ID NO: 3            moltype = DNA  length = 25
FEATURE                 Location/Qualifiers
source                  1..25
                        mol_type = other DNA
                        note = probe  of the 1st primer and probe set
                        organism = synthetic construct
SEQUENCE: 3
tcaaccactg cattcagttg tgatg                                           25

SEQ ID NO: 4            moltype = DNA  length = 18
FEATURE                 Location/Qualifiers
source                  1..18
                        mol_type = other DNA
                        note = Upstream primer of the 2nd primer and probe set
                        organism = synthetic construct
SEQUENCE: 4
cagtggtctt acatgcac                                                   18

SEQ ID NO: 5            moltype = DNA  length = 20
FEATURE                 Location/Qualifiers
source                  1..20
                        mol_type = other DNA
                        note = Downstream primer of the 2nd primer
                        organism = synthetic construct
SEQUENCE: 5
tggggttct aaacttgtta                                                  20

SEQ ID NO: 6            moltype = DNA  length = 20
FEATURE                 Location/Qualifiers
```

```
                        source             1..20
                                           mol_type = other DNA
                                           note = Probe of the 2nd primer and probe set
                                           organism = synthetic construct
SEQUENCE: 6
acgcctcgga gtacctgagc                                                              20

SEQ ID NO: 7            moltype = DNA  length = 18
FEATURE                 Location/Qualifiers
source                  1..18
                        mol_type = other DNA
                        note = Upstream primer of the 3rd primer and probe set
                        organism = synthetic construct
SEQUENCE: 7
ggtgtctccc taatcttg                                                                18

SEQ ID NO: 8            moltype = DNA  length = 18
FEATURE                 Location/Qualifiers
source                  1..18
                        mol_type = other DNA
                        note = Downstream primer of the 3rd primer and probe set
                        organism = synthetic construct
SEQUENCE: 8
ctctctttct gtgtgtcc                                                                18

SEQ ID NO: 9            moltype = DNA  length = 20
FEATURE                 Location/Qualifiers
source                  1..20
                        mol_type = other DNA
                        note = Probe of the 3rd primer and probe set
                        organism = synthetic construct
SEQUENCE: 9
aggcttctgc tctcgactgg                                                              20

SEQ ID NO: 10           moltype = DNA  length = 18
FEATURE                 Location/Qualifiers
source                  1..18
                        mol_type = other DNA
                        note = Upstream primer of the 4th primer and probe set
                        organism = synthetic construct
SEQUENCE: 10
ctccctttac aacctcag                                                                18

SEQ ID NO: 11           moltype = DNA  length = 18
FEATURE                 Location/Qualifiers
source                  1..18
                        mol_type = other DNA
                        note = Downstream primer of the 4th primer and probe set
                        organism = synthetic construct
SEQUENCE: 11
gacgactcaa tggtgtaa                                                                18

SEQ ID NO: 12           moltype = DNA  length = 22
FEATURE                 Location/Qualifiers
source                  1..22
                        mol_type = other DNA
                        note = Probe of the 4th primer and probe set
                        organism = synthetic construct
SEQUENCE: 12
ccttgctgtt ccacaatgtc gt                                                           22

SEQ ID NO: 13           moltype = DNA  length = 18
FEATURE                 Location/Qualifiers
source                  1..18
                        mol_type = other DNA
                        note = Upstream primer of the 5th primer and probe set
                        organism = synthetic construct
SEQUENCE: 13
ggatggcgaa catcttaa                                                                18

SEQ ID NO: 14           moltype = DNA  length = 18
FEATURE                 Location/Qualifiers
source                  1..18
                        mol_type = other DNA
                        note = Downstream primer of the 5th primer and probe set
                        organism = synthetic construct
SEQUENCE: 14
gttgggtttg tccttctc                                                                18
```

-continued

```
SEQ ID NO: 15            moltype = DNA   length = 20
FEATURE                  Location/Qualifiers
source                   1..20
                         mol_type = other DNA
                         note = Probe of the 5th primer and probe set
                         organism = synthetic construct
SEQUENCE: 15
atgggacccg tgacaccta                                                  20

SEQ ID NO: 16            moltype = DNA   length = 18
FEATURE                  Location/Qualifiers
source                   1..18
                         mol_type = other DNA
                         note = Upstream primer of the 6th primer and probe set
                         organism = synthetic construct
SEQUENCE: 16
cgtgacgtgc ataaagag                                                   18

SEQ ID NO: 17            moltype = DNA   length = 18
FEATURE                  Location/Qualifiers
source                   1..18
                         mol_type = other DNA
                         note = Downstream primer of the 6th primer and probe set
                         organism = synthetic construct
SEQUENCE: 17
ggtgataggt gaccagta                                                   18

SEQ ID NO: 18            moltype = DNA   length = 20
FEATURE                  Location/Qualifiers
source                   1..20
                         mol_type = other DNA
                         note = Probe of the 6th primer and probe set
                         organism = synthetic construct
SEQUENCE: 18
ctcgcagaag gactccaggt                                                 20

SEQ ID NO: 19            moltype = DNA   length = 18
FEATURE                  Location/Qualifiers
source                   1..18
                         mol_type = other DNA
                         note = Upstream primer of the 7th primer and probe set
                         organism = synthetic construct
SEQUENCE: 19
gtgtggtaat ggactaag                                                   18

SEQ ID NO: 20            moltype = DNA   length = 21
FEATURE                  Location/Qualifiers
source                   1..21
                         mol_type = other DNA
                         note = Downstream primer of the 7th primer and probe set
                         organism = synthetic construct
SEQUENCE: 20
cgaccatcaa aatataaaga g                                               21

SEQ ID NO: 21            moltype = DNA   length = 26
FEATURE                  Location/Qualifiers
source                   1..26
                         mol_type = other DNA
                         organism = synthetic construct
SEQUENCE: 21
agctgctaca atacacacgt aagtac                                          26

SEQ ID NO: 22            moltype = DNA   length = 20
FEATURE                  Location/Qualifiers
source                   1..20
                         mol_type = other DNA
                         note = Upstream primer of the 8th primer and probe set
                         organism = synthetic construct
SEQUENCE: 22
gcgaatgagc gtttatttag                                                 20

SEQ ID NO: 23            moltype = DNA   length = 23
FEATURE                  Location/Qualifiers
source                   1..23
                         mol_type = other DNA
                         note = Downstream primer of the 8th primer and probe set
                         organism = synthetic construct
SEQUENCE: 23
gacctttaga taaagctgta atg                                             23
```

```
SEQ ID NO: 24            moltype = DNA   length = 27
FEATURE                  Location/Qualifiers
source                   1..27
                         mol_type = other DNA
                         note = Probe of the 8th primer and probe
                         organism = synthetic construct
SEQUENCE: 24
cgccataact cataccagat tgtccta                                          27

SEQ ID NO: 25            moltype = DNA   length = 18
FEATURE                  Location/Qualifiers
source                   1..18
                         mol_type = other DNA
                         note = Upstream primer of the 9th primer and probe set
                         organism = synthetic construct
SEQUENCE: 25
cagctaccaa cgacagtc                                                    18

SEQ ID NO: 26            moltype = DNA   length = 19
FEATURE                  Location/Qualifiers
source                   1..19
                         mol_type = other DNA
                         note = Downstream primer of the 9th primer and probe set
                         organism = synthetic construct
SEQUENCE: 26
cgcaagaaga gtgggatta                                                   19

SEQ ID NO: 27            moltype = DNA   length = 27
FEATURE                  Location/Qualifiers
source                   1..27
                         mol_type = other DNA
                         note = Probe of the 9th primer and probe set
                         organism = synthetic construct
SEQUENCE: 27
tctctaacaa ggtctcatcc actacga                                          27

SEQ ID NO: 28            moltype = DNA   length = 18
FEATURE                  Location/Qualifiers
source                   1..18
                         mol_type = other DNA
                         note = Upstream primer of the 10th primer and probe set
                         organism = synthetic construct
SEQUENCE: 28
cggtgcttat actggaga                                                    18

SEQ ID NO: 29            moltype = DNA   length = 18
FEATURE                  Location/Qualifiers
source                   1..18
                         mol_type = other DNA
                         note = Downstream primer of the 10th primer and probe set
                         organism = synthetic construct
SEQUENCE: 29
tcgtcagttt cgtggaaa                                                    18

SEQ ID NO: 30            moltype = DNA   length = 21
FEATURE                  Location/Qualifiers
source                   1..21
                         mol_type = other DNA
                         note = Probe of the 10th primer and probe set
                         organism = synthetic construct
SEQUENCE: 30
acgacgctct gagtgaccaa t                                                21

SEQ ID NO: 31            moltype = DNA   length = 18
FEATURE                  Location/Qualifiers
source                   1..18
                         mol_type = other DNA
                         note = Upstream primer of the 11th primer and probe set
                         organism = synthetic construct
SEQUENCE: 31
tcaccacctt ctacttcg                                                    18

SEQ ID NO: 32            moltype = DNA   length = 18
FEATURE                  Location/Qualifiers
source                   1..18
                         mol_type = other DNA
                         note = Downstream primer of the 11th primer and probe set
                         organism = synthetic construct
```

```
SEQUENCE: 32
cagagccatg ttgtactc                                                 18

SEQ ID NO: 33           moltype = DNA  length = 20
FEATURE                 Location/Qualifiers
source                  1..20
                        mol_type = other DNA
                        note = Probe of the 11th primer and probe set
                        organism = synthetic construct
SEQUENCE: 33
acgacagctc cgacctgaag                                               20

SEQ ID NO: 34           moltype = DNA  length = 21
FEATURE                 Location/Qualifiers
source                  1..21
                        mol_type = other DNA
                        note = Upstream primer of the 12th primer and probe set
                        organism = synthetic construct
SEQUENCE: 34
tccagtttat caagatttag c                                             21

SEQ ID NO: 35           moltype = DNA  length = 18
FEATURE                 Location/Qualifiers
source                  1..18
                        mol_type = other DNA
                        note = Downstream primer of the 12th primer and probe set
                        organism = synthetic construct
SEQUENCE: 35
cttgggtacc gatatctg                                                 18

SEQ ID NO: 36           moltype = DNA  length = 27
FEATURE                 Location/Qualifiers
source                  1..27
                        mol_type = other DNA
                        note = Probe of the 12th primer and probe set
                        organism = synthetic construct
SEQUENCE: 36
cataaccaac acgcttcact tccttag                                       27

SEQ ID NO: 37           moltype = DNA  length = 18
FEATURE                 Location/Qualifiers
source                  1..18
                        mol_type = other DNA
                        note = Upstream primer of the 13th primer and probe set
                        organism = synthetic construct
SEQUENCE: 37
ccgcaagaaa actatccc                                                 18

SEQ ID NO: 38           moltype = DNA  length = 20
FEATURE                 Location/Qualifiers
source                  1..20
                        mol_type = other DNA
                        note = Downstream primer of the 13th primer and probe set
                        organism = synthetic construct
SEQUENCE: 38
tagcgactga tattgaactg                                               20

SEQ ID NO: 39           moltype = DNA  length = 20
FEATURE                 Location/Qualifiers
source                  1..20
                        mol_type = other DNA
                        note = Probe of the 13th primer and probe set
                        organism = synthetic construct
SEQUENCE: 39
ccgccttact gccgcctgtt                                               20

SEQ ID NO: 40           moltype = DNA  length = 18
FEATURE                 Location/Qualifiers
source                  1..18
                        mol_type = other DNA
                        note = Upstream primer of the 14th primer and probe set
                        organism = synthetic construct
SEQUENCE: 40
tgccatcatt tagttggg                                                 18

SEQ ID NO: 41           moltype = DNA  length = 23
FEATURE                 Location/Qualifiers
source                  1..23
                        mol_type = other DNA
```

```
                        note = Downstream primer of the 14th primer and probe set
                        organism = synthetic construct
SEQUENCE: 41
gaagcttttta agagatttgc atg                                              23

SEQ ID NO: 42           moltype = DNA   length = 24
FEATURE                 Location/Qualifiers
source                  1..24
                        mol_type = other DNA
                        note = Probe of the 14th primer and probe set
                        organism = synthetic construct
SEQUENCE: 42
cggtctagcg actcgttgta cttc                                              24

SEQ ID NO: 43           moltype = DNA   length = 18
FEATURE                 Location/Qualifiers
source                  1..18
                        mol_type = other DNA
                        note = Upstream primer of the 15th primer and probe set
                        organism = synthetic construct
SEQUENCE: 43
gtcgagtacg ccttcttg                                                     18

SEQ ID NO: 44           moltype = DNA   length = 18
FEATURE                 Location/Qualifiers
source                  1..18
                        mol_type = other DNA
                        note = Downstream primer of the 15th primer and probe set
                        organism = synthetic construct
SEQUENCE: 44
cacctatgtg tcgacctg                                                     18

SEQ ID NO: 45           moltype = DNA   length = 21
FEATURE                 Location/Qualifiers
source                  1..21
                        mol_type = other DNA
                        note = Probe of the 15th primer and probe set
                        organism = synthetic construct
SEQUENCE: 45
cctttgtcac cgacgcctac g                                                 21

SEQ ID NO: 46           moltype = DNA   length = 18
FEATURE                 Location/Qualifiers
source                  1..18
                        mol_type = other DNA
                        note = Upstream primer of the 16th primer and probe set
                        organism = synthetic construct
SEQUENCE: 46
catccaagat attctgcc                                                     18

SEQ ID NO: 47           moltype = DNA   length = 20
FEATURE                 Location/Qualifiers
source                  1..20
                        mol_type = other DNA
                        note = Downstream primer of the 16th primer and probe set
                        organism = synthetic construct
SEQUENCE: 47
cggattttgt tcaatacaag                                                   20

SEQ ID NO: 48           moltype = DNA   length = 27
FEATURE                 Location/Qualifiers
source                  1..27
                        mol_type = other DNA
                        note = Probe of the 16th primer and probe set
                        organism = synthetic construct
SEQUENCE: 48
caccatctac atcgtcagca ataatca                                           27

SEQ ID NO: 49           moltype = DNA   length = 19
FEATURE                 Location/Qualifiers
source                  1..19
                        mol_type = other DNA
                        note = Upstream primer of the 17th primer and probe set
                        organism = synthetic construct
SEQUENCE: 49
gcgtagatat taggaggaa                                                    19

SEQ ID NO: 50           moltype = DNA   length = 19
FEATURE                 Location/Qualifiers
```

```
source                    1..19
                          mol_type = other DNA
                          note = Downstream primer of the 17th primer and probe set
                          organism = synthetic construct
SEQUENCE: 50
ggagtactta atgcgttag                                                    19

SEQ ID NO: 51             moltype = DNA  length = 23
FEATURE                   Location/Qualifiers
source                    1..23
                          mol_type = other DNA
                          note = Probe of the 17th primer and probe set
                          organism = synthetic construct
SEQUENCE: 51
tctctggact gtaactgacg ctg                                               23

SEQ ID NO: 52             moltype = DNA  length = 18
FEATURE                   Location/Qualifiers
source                    1..18
                          mol_type = other DNA
                          note = Upstream primer of the 18th primer and probe set
                          organism = synthetic construct
SEQUENCE: 52
tcctccaagg ctaaatac                                                     18

SEQ ID NO: 53             moltype = DNA  length = 19
FEATURE                   Location/Qualifiers
source                    1..19
                          mol_type = other DNA
                          note = Downstream primer of the 18th primer and probe set
                          organism = synthetic construct
SEQUENCE: 53
cggtttcagg ttctatttc                                                    19

SEQ ID NO: 54             moltype = DNA  length = 22
FEATURE                   Location/Qualifiers
source                    1..22
                          mol_type = other DNA
                          note = Probe of the 18th primer and probe set
                          organism = synthetic construct
SEQUENCE: 54
tgaccgaccg atagtgaacc ag                                                22

SEQ ID NO: 55             moltype = DNA  length = 18
FEATURE                   Location/Qualifiers
source                    1..18
                          mol_type = other DNA
                          note = Upstream primer of the 19th primer and probe set
                          organism = synthetic construct
SEQUENCE: 55
cgttcaaatc ttagacgc                                                     18

SEQ ID NO: 56             moltype = DNA  length = 18
FEATURE                   Location/Qualifiers
source                    1..18
                          mol_type = other DNA
                          note = Downstream primer of the 19th primer and probe set
                          organism = synthetic construct
SEQUENCE: 56
cgatgttgta ttctggtg                                                     18

SEQ ID NO: 57             moltype = DNA  length = 27
FEATURE                   Location/Qualifiers
source                    1..27
                          mol_type = other DNA
                          note = Probe of the 19th primer and probe set
                          organism = synthetic construct
SEQUENCE: 57
cgttcatcag tgttaccttc tactaat                                           27

SEQ ID NO: 58             moltype = DNA  length = 19
FEATURE                   Location/Qualifiers
source                    1..19
                          mol_type = other DNA
                          note = Upstream primer of the 20th primer and probe set
                          organism = synthetic construct
SEQUENCE: 58
cccgtgaacc tttactata                                                    19
```

| | |
|---|---|
| SEQ ID NO: 59<br>FEATURE<br>source | moltype = DNA   length = 17<br>Location/Qualifiers<br>1..17<br>mol_type = other DNA<br>note = Downstream primer of the 20th primer and probe set<br>organism = synthetic construct |

SEQUENCE: 59
aaggtggtat ttcaagg                                                17

| | |
|---|---|
| SEQ ID NO: 60<br>FEATURE<br>source | moltype = DNA   length = 24<br>Location/Qualifiers<br>1..24<br>mol_type = other DNA<br>note = Probe of the 20th primer and probe set<br>organism = synthetic construct |

SEQUENCE: 60
tgacactgaa cattgagcct tgat                                        24

| | |
|---|---|
| SEQ ID NO: 61<br>FEATURE<br>source | moltype = DNA   length = 19<br>Location/Qualifiers<br>1..19<br>mol_type = other DNA<br>note = Upstream primer of the 21th primer and probe set<br>organism = synthetic construct |

SEQUENCE: 61
ctggaagctc atttaccta                                              19

| | |
|---|---|
| SEQ ID NO: 62<br>FEATURE<br>source | moltype = DNA   length = 18<br>Location/Qualifiers<br>1..18<br>mol_type = other DNA<br>note = Downstream primer of the 21th primer and probe set<br>organism = synthetic construct |

SEQUENCE: 62
ggccatggaa ttggaata                                               18

| | |
|---|---|
| SEQ ID NO: 63<br>FEATURE<br>source | moltype = DNA   length = 24<br>Location/Qualifiers<br>1..24<br>mol_type = other DNA<br>note = Probe of the 21th primer and probe set<br>organism = synthetic construct |

SEQUENCE: 63
attcaccgta agccatcaat cagg                                        24

| | |
|---|---|
| SEQ ID NO: 64<br>FEATURE<br>source | moltype = DNA   length = 19<br>Location/Qualifiers<br>1..19<br>mol_type = other DNA<br>note = Upstream primer of the 22th primer and probe set<br>organism = synthetic construct |

SEQUENCE: 64
gaggtctaaa cttacaacc                                              19

| | |
|---|---|
| SEQ ID NO: 65<br>FEATURE<br>source | moltype = DNA   length = 19<br>Location/Qualifiers<br>1..19<br>mol_type = other DNA<br>note = Downstream primer of the 22th primer and probe set<br>organism = synthetic construct |

SEQUENCE: 65
cgttgttgaa agttttgac                                              19

| | |
|---|---|
| SEQ ID NO: 66<br>FEATURE<br>source | moltype = DNA   length = 27<br>Location/Qualifiers<br>1..27<br>mol_type = other DNA<br>note = Probe of the 22th primer and probe set<br>organism = synthetic construct |

SEQUENCE: 66
tcaacttgtc acaccagatt attactt                                     27

| | |
|---|---|
| SEQ ID NO: 67<br>FEATURE<br>source | moltype = DNA   length = 19<br>Location/Qualifiers<br>1..19<br>mol_type = other DNA<br>note = Upstream primer of the 23th primer and probe set<br>organism = synthetic construct |

SEQUENCE: 67

-continued

```
tccctcttat ccatttcc                                                    19

SEQ ID NO: 68           moltype = DNA  length = 20
FEATURE                 Location/Qualifiers
source                  1..20
                        mol_type = other DNA
                        note = Downstream primer of the 23th primer and probe set
                        organism = synthetic construct
SEQUENCE: 68
gttccaaagc cgaaagaata                                                  20

SEQ ID NO: 69           moltype = DNA  length = 26
FEATURE                 Location/Qualifiers
source                  1..26
                        mol_type = other DNA
                        note = Probe of the 23th primer and probe set
                        organism = synthetic construct
SEQUENCE: 69
cctcatcact gcaactctaa tcctcg                                           26

SEQ ID NO: 70           moltype = DNA  length = 169
FEATURE                 Location/Qualifiers
source                  1..169
                        mol_type = other DNA
                        note = Conserved DNA sequence of adenovirus type B
                        organism = synthetic construct
SEQUENCE: 70
atttgggtca acaagccatg cctaacagac ccaattacat tggattcagg gataactttg      60
taggcctaat gtactacaac agtactggaa atatgggagt tttggctggc caagcatcac     120
aactgaatgc agtggttgac ttgcaggaca gaaatactga actgtcata                 169

SEQ ID NO: 71           moltype = DNA  length = 152
FEATURE                 Location/Qualifiers
source                  1..152
                        mol_type = other DNA
                        note = Conserved DNA sequence of adenovirus type C
                        organism = synthetic construct
SEQUENCE: 71
atggctaccc cttcgatgat gccgcagtgg tcttacatgc acatctcggg ccaggacgcc      60
tcggagtacc tgagccccgg gctggtgcag tttgcccgcg ccaccgagac gtacttcagc     120
ctgaataaca agtttagaaa ccccacggtg gc                                   152

SEQ ID NO: 72           moltype = DNA  length = 190
FEATURE                 Location/Qualifiers
source                  1..190
                        mol_type = other DNA
                        note = Conserved DNA sequence of varicella-zoster virus
                        organism = synthetic construct
SEQUENCE: 72
cgcctcttgg ccttggaaac cacatgatcg tctgcaaccc gggcgtccgc gacgggtgtc      60
tccctaatct tgtcgaggag gcttctgctc tcgactggct gggactttgcg cttgcgcgga    120
gttcgtaaac gatcatccgg tggacacaca gaaagagagc gtgcggcggc cgacggctga    180
gggtcgggag                                                            190

SEQ ID NO: 73           moltype = DNA  length = 171
FEATURE                 Location/Qualifiers
source                  1..171
                        mol_type = other DNA
                        note = Conserved DNA sequence of EB virus
                        organism = synthetic construct
SEQUENCE: 73
cacgtagaaa ggactaccga ggaaggaaat tgggtcgccg gtgtgttcgt atatggaggt      60
agtaagacct ccctttacaa cctcaggcga ggaattgccc ttgctgttcc acaatgtcgt    120
attacaccat tgagtcgtct cccctttgga atggcccctg acccggccc a              171

SEQ ID NO: 74           moltype = DNA  length = 300
FEATURE                 Location/Qualifiers
source                  1..300
                        mol_type = other DNA
                        note = Conserved DNA sequence of human herpes simplex virus
                         type 1
                        organism = synthetic construct
SEQUENCE: 74
ggaggaagag gaggaggggg ccggggatgg cgaacatctt aagggggag atgggacccg       60
tgacaccta ccccagtccc cgggtccagc cgtcccgttg gccggggatg acgagaagga     120
caaacccaac cgtcccgtag tcccaccccc cggtcccaac aactccccg cgcgcccga      180
gaccagtcga ccgaagacac ccccaccag tatcgggccg ctggcaactc gacccacgac    240
ccaactcccc tcaaggggc gacccttggt tccgacgcct caacatacccc gctgttctc    300
```

```
SEQ ID NO: 75            moltype = DNA  length = 185
FEATURE                  Location/Qualifiers
source                   1..185
                         mol_type = other DNA
                         note = Conserved DNA sequence of cytomegalovirus
                         organism = synthetic construct
SEQUENCE: 75
agcgtgacgt gcataaagag cttgccggag ggcacgtcct cgcagaagga ctccaggtac    60
accttgacgt actggtcacc tatcacctgc atcttggttg cgcgcgtgtt ctccatggag   120
caaaccagct cgtgcgcgca caccacgtgc cgcagtgcca cgtccttggt gggaaacacg   180
aacgc                                                                185

SEQ ID NO: 76            moltype = DNA  length = 221
FEATURE                  Location/Qualifiers
source                   1..221
                         mol_type = other DNA
                         note = Conserved DNA sequence of human herpes virus type 6
                         organism = synthetic construct
SEQUENCE: 76
ttattttgtc atgtcctgtg tgtaagcgtg tggtaatgga ctaagtgtgc gttattttct    60
gtattaattt tttgtttctg aaaataaaat tgaattgata gtacttacgt gtgtattgta   120
gcagctggcg aaaagtgctg tgctctttat attttgatgg tcgattgtaa ttacattatc   180
caggcatgtg attgtctttt ctggaaacat tcggcggcat t                       221

SEQ ID NO: 77            moltype = DNA  length = 228
FEATURE                  Location/Qualifiers
source                   1..228
                         mol_type = other DNA
                         note = Conserved DNA sequence of Staphylococcus aureus
                         organism = synthetic construct
SEQUENCE: 77
ataaaatcgc gaatgagcgt ttatttagtc gtgaagaata tcgtgtgccg acaaagattg    60
atccgtatta cttaagtgat gaccatgcaa taaaattagg tgaacattta aaacatccat   120
ttatttaaa acgtatcgta ggacaatctg gtatgagtta tggcgcttta ggaaaaaatg    180
ccattacagc tttatctaaa ggtctagcta aagcgggcac ttggatga                228

SEQ ID NO: 78            moltype = DNA  length = 256
FEATURE                  Location/Qualifiers
source                   1..256
                         mol_type = other DNA
                         note = Conserved DNA sequence of Streptococcus pneumoniae
                         organism = synthetic construct
SEQUENCE: 78
agaagcggag cttgtcgaca aatacaagtg atatttctgt aacagctacc aacgacagtc    60
gcctctatcc tggagcactt ctcgtagtgg atgagacctt gttagagaat aatcccactc   120
ttcttgcggt cgatcgtgct ccgatgactt atagtattga tttgcctggt ttggcaagta   180
gcgatagctt tctccaagtg gaagaccca gcaattcaag tgttcgcgga gcggtaaacg    240
atttgttggc taagtg                                                    256

SEQ ID NO: 79            moltype = DNA  length = 165
FEATURE                  Location/Qualifiers
source                   1..165
                         mol_type = other DNA
                         note = Conserved DNA sequence of Staphylococcus epidermidis
                         organism = synthetic construct
SEQUENCE: 79
tactttgaag aaagcggtgc ttatactgga gaaacttcac cagtagcatt atctgaatta    60
ggtgttaaat atgtagtgat tggtcactca gagcgtcgtg actatttcca cgaaactgac   120
gaagaagtaa acaaaaaagc gcatgctatc ttcaatcacg gtatg                    165

SEQ ID NO: 80            moltype = DNA  length = 302
FEATURE                  Location/Qualifiers
source                   1..302
                         mol_type = other DNA
                         note = Conserved DNA sequence of Pseudomonas aeruginosa
                         organism = synthetic construct
SEQUENCE: 80
ggtgaaggtg ccaatggcgg cgtcgacccg aacgcaggct atggcgccaa cagcggtgcc    60
gttgacggca gcctgagcga cgaagccgct ctgcgtgcga tcaccaccatt ctacttcgag   120
tacgacagct ccgacctgaa gccggaagcc atgcgcgctc tggacgtaca cgcgaaagac   180
ctgaaaggca gcggtcagcg cgtagtgctg aaggccacac ccgacgaacg cggcacccgc   240
gagtacaaca tggctctggg cgagcgtcgt gccaaggccg ttcagcgcta cctggtgctg   300
ca                                                                   302

SEQ ID NO: 81            moltype = DNA  length = 246
FEATURE                  Location/Qualifiers
source                   1..246
                         mol_type = other DNA
                         note = Conserved DNA sequence of Acinetobacter baumannii
```

```
                    organism = synthetic construct
SEQUENCE: 81
ccataaggca accaccacag aagtatttaa gtgggatggt aaaaaaaggt tattcccaga    60
atgggaaaag gacatgaccc taggcgatgc catgaaagct tccgctattc cagtttatca   120
agatttagct cgtcgtattg gacttgagct catgtctaag gaagtgaagc gtgttggtta   180
tggcaatgca gatatcggta cccaagtcga taattttttg ctggtgggtc ctttaaaaat   240
tactcc                                                              246

SEQ ID NO: 82          moltype = DNA  length = 258
FEATURE                Location/Qualifiers
source                 1..258
                       mol_type = other DNA
                       note = Conserved DNA sequence of Escherichia coli
                       organism = synthetic construct
SEQUENCE: 82
gtaaactggc tcggattagg gccgcaagaa aactatcccg accgccttac tgccgcctgt    60
tttgaccgct gggatctgcc attgtcagac atgtataccc cgtacgtctt cccgagcgaa   120
aacggtctgc gctgcgggac gcgcgaattg aattatgcc cacaccagtg gcgcggcgac    180
ttccagttca atatcagtcg ctacagccaa caacaactga tggaaaccag ccatcgccat   240
ctgctgcacg cggaagaa                                                 258

SEQ ID NO: 83          moltype = DNA  length = 322
FEATURE                Location/Qualifiers
source                 1..322
                       mol_type = other DNA
                       note = Conserved DNA sequence of Mycobacterium tuberculosis
                        complex
                       organism = synthetic construct
SEQUENCE: 83
caggtcgagt acgccttctt gttggcgggt ccagatggct tgctcgatcg cgtcgaggac    60
catggaggtg gccatcgtgg aagcgacccg ccagcccagg atcctgcgag cgtaggcgtc   120
ggtgacaaag gccacgtagg cgaaccctgc ccaggtcgac acataggtga ggtctgctac   180
ccacagccga ttaggtgctg gtggtccgaa gcggcgctgg acgagatcgg cgggacgggc   240
tgtggccgga tcagcgatcg tggtcctgcg ggctttgccg cgggtggtcc cggacaggcc   300
gagtttggtc atcagccgtt cg                                            322

SEQ ID NO: 84          moltype = DNA  length = 233
FEATURE                Location/Qualifiers
source                 1..233
                       mol_type = other DNA
                       note = Conserved DNA sequence of Enterococcus faecalis
                       organism = synthetic construct
SEQUENCE: 84
gtcgtcagct cgtgtcgtga gatgttgggt taagtcccgc aacgagcgca acccttattg    60
ttagttgcca tcatttagtt gggcactcta gcgagactgc cggtgacaaa ccggaggaag   120
gtggggatga cgtcaaatca tcatgcccct tatgacctgg gctacacacg tgctacaatg   180
ggaagtacaa cgagtcgcta gaccgcgagg tcatgcaaat ctcttaaagc ttc          233

SEQ ID NO: 85          moltype = DNA  length = 258
FEATURE                Location/Qualifiers
source                 1..258
                       mol_type = other DNA
                       note = Conserved DNA sequence of Enterococcus faecium
                       organism = synthetic construct
SEQUENCE: 85
acagataacg acaaaatgga agctgttcta gaaaacccat atatcttgat cacagacaaa    60
aaatctcta acatccaaga tattctgcca ttgttagaac aaatcttgca acaatcacgt    120
ccattgttga ttattgctga cgatgtagat ggtgaagcat tgccaactct tgtattgaac   180
aaaatccgtg gaacattcaa cgtagtagct gtaaaagctc tggtttcgg cgatcgtcgt   240
aaagcaatgc ttgaagat                                                 258

SEQ ID NO: 86          moltype = DNA  length = 281
FEATURE                Location/Qualifiers
source                 1..281
                       mol_type = other DNA
                       note = Conserved DNA sequence of Clostridium difficile
                       organism = synthetic construct
SEQUENCE: 86
actgggagac ttgagtgcag gagaggagag tggaattcct agtgtagcgg tgaaatgcgt    60
agatattagg aggaacacca gttgcgaagg cggctctctg gactgtaact gacgctgagg   120
cacgaaagcg tggggagcaa acaggattag atacctgt agtccacgct gtaaacgatg    180
agtactaggt gtcggggtt acccccttcg gtgccgcagc taacgcatta agtactccgc   240
ctgggaagta cgctcgcaag agtgaaactc aaaggaattg a                       281

SEQ ID NO: 87          moltype = DNA  length = 183
FEATURE                Location/Qualifiers
source                 1..183
                       mol_type = other DNA
                       note = Conserved DNA sequence of Stenotrophomonas
```

-continued

```
                        maltophilia
                        organism = synthetic construct
SEQUENCE: 87
cagtgaagac gagtagggcg gggcacgtga aaccctgtct gaacatgggg ggaccatcct   60
ccaaggctaa atactactga ccgaccgata gtgaaccagt accgtgaggg aaaggcgaaa  120
agaaccccgg agagggagt gaaatagaac ctgaaaccgt gtgcgtacaa gcagtaggag   180
ctc                                                                183

SEQ ID NO: 88           moltype = DNA  length = 170
FEATURE                 Location/Qualifiers
source                  1..170
                        mol_type = other DNA
                        note = Conserved DNA sequence of Haemophilus influenzae
                        organism = synthetic construct
SEQUENCE: 88
atgacattac tggtgaatac gttcaaatct tagacgcaca cgctgcatat ttaaatgcaa   60
cgccagctgc taaagtatta gtagaaggta acactgatga acgtggtaca ccagaataca  120
acatcgcatt aggccaacgt cgtgcagatg cagttaaagg ttatttagct              170

SEQ ID NO: 89           moltype = DNA  length = 249
FEATURE                 Location/Qualifiers
source                  1..249
                        mol_type = other DNA
                        note = Conserved DNA sequence of Klebsiella pneumoniae
                        organism = synthetic construct
SEQUENCE: 89
aactcgctgt gaagatgcag tgtacccgcg gcaagacgga aagacccgt gaaccttac     60
tatagcttga cactgaacat tgagccttga tgtgtaggat aggtgggagg ctttgaagcg  120
tggacgccac tctgcgtgga gccaaccttg aaataccacc cttaatgtt tgatgttcta   180
acgttggccc cttaccgggg ttgcggacag tgtctggtgg gtagtttgac tggggcggtc  240
tcctcccaa                                                          249

SEQ ID NO: 90           moltype = DNA  length = 230
FEATURE                 Location/Qualifiers
source                  1..230
                        mol_type = other DNA
                        note = Conserved DNA sequence of Cryptococcus neoformans
                        organism = synthetic construct
SEQUENCE: 90
acggtgtccc tggtataaca caggtaagaa tccttaggaa ccacaggaat cggtcaactt   60
ataaactgca tagtgtccta ttccgcctgg aagctcattt acctaccaat tcaccgtaag  120
ccatcaatca ggcacgtttt ggtggcattc ccattattcc aattccatgg ccgacggcat  180
ttggggcccg tcagttttcc tgactttga taacaagtta tcacagctga               230

SEQ ID NO: 91           moltype = DNA  length = 226
FEATURE                 Location/Qualifiers
source                  1..226
                        mol_type = other DNA
                        note = Conserved DNA sequence of Candida albicans
                        organism = synthetic construct
SEQUENCE: 91
aaggatcatt actgatttgc ttaattgcac cacatgtgtt tttctttgaa acaaacttgc   60
tttggcggtg ggcccagcct gccgccagag gtctaaactt acaaccaatt ttttatcaac  120
ttgtcacacc agattattac ttaatagtca aaactttcaa caacggatct cttggttctc   180
gcatcgatga agaacgcagc gaaatgcgat acgtaatatg aattgc                  226

SEQ ID NO: 92           moltype = DNA  length = 237
FEATURE                 Location/Qualifiers
source                  1..237
                        mol_type = other DNA
                        note = Conserved DNA sequence of Aspergillus fumigatus
                        organism = synthetic construct
SEQUENCE: 92
aggaatccag tatatgaaat aatccctctt atccattttc ctcctattct ttttcatttc   60
cctcatcact gcaactctaa tcctcgggct caccctccct gtgtctcctc gaaatggtgc  120
cgatgctatg gcttacggcc tacatggccg ttgcggtgct gacggcaatc ttgctcaatg  180
ttgtttatca attattcttt cggctttgga accgaacaga accgccaatg gtctttc     237
```